US011091369B2

(12) United States Patent
Hunter et al.

(10) Patent No.: US 11,091,369 B2
(45) Date of Patent: Aug. 17, 2021

(54) COMPOSITIONS COMPRISING A PLURALITY OF DISCRETE NANOSTRUCTURES AND RELATED ARTICLES AND METHODS

(71) Applicant: Massachusetts Institute of Technology, Cambridge, MA (US)

(72) Inventors: Ian W. Hunter, Cambridge, MA (US); Timothy M. Swager, Newton, MA (US); Intak Jeon, Boston, MA (US); Gee Hoon Park, Cambridge, MA (US); Pan Wang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 42 days.

(21) Appl. No.: 16/401,563

(22) Filed: May 2, 2019

(65) Prior Publication Data

US 2019/0337806 A1    Nov. 7, 2019

Related U.S. Application Data

(60) Provisional application No. 62/665,601, filed on May 2, 2018.

(51) Int. Cl.
*C01B 32/194* (2017.01)
*C10M 103/02* (2006.01)
(Continued)

(52) U.S. Cl.
CPC .......... *C01B 32/194* (2017.08); *C01B 32/198* (2017.08); *C10M 103/02* (2013.01);
(Continued)

(58) Field of Classification Search
CPC . C01B 32/194; C01B 32/198; C01B 2204/26; C01B 2204/32; C10M 103/02;
(Continued)

(56) References Cited

U.S. PATENT DOCUMENTS

2009/0105488 A1    4/2009  Cheng et al.
2010/0247892 A1    9/2010  Lee et al.
(Continued)

FOREIGN PATENT DOCUMENTS

WO    WO 2019/090323 A1    5/2019

OTHER PUBLICATIONS

International Search Report and Written Opinion dated Jul. 22, 2019, for Application No. PCT/US2019/030393.
(Continued)

*Primary Examiner* — Taiwo Oladapo
(74) *Attorney, Agent, or Firm* — Wolf, Greenfield & Sacks, P.C.

(57) ABSTRACT

Embodiments described herein generally relate to compositions including discrete nanostructures (e.g., nanostructures including a functionalized graphene layer and a core species bound to the functionalized graphene layer), and related articles and methods. A composition may have a coefficient of friction of less than or equal to 0.02. Discrete nanostructures may have a substantially non-planar configuration. A core species may reversibly covalently bind a first portion of a functionalized graphene layer to a second portion of the functionalized graphene layer. Articles, e.g., articles including a plurality of discrete nanostructures and a means for depositing the plurality of discrete nanostructures on a surface, are also provided. Methods (e.g., methods of forming a layer) are also provided, including depositing a composition onto a substrate surface and/or applying a mechanical force to the composition, e.g., such that the composition exhibits a coefficient of friction of less than or equal to 0.02.

23 Claims, 47 Drawing Sheets

(51) Int. Cl.
C10M 105/64 (2006.01)
C10M 111/02 (2006.01)
C01B 32/198 (2017.01)
C10N 50/08 (2006.01)

(52) U.S. Cl.
CPC ......... *C10M 105/64* (2013.01); *C10M 111/02* (2013.01); *C01B 2204/26* (2013.01); *C01B 2204/32* (2013.01); *C01P 2002/01* (2013.01); *C01P 2002/82* (2013.01); *C01P 2002/85* (2013.01); *C01P 2004/03* (2013.01); *C01P 2004/04* (2013.01); *C01P 2004/34* (2013.01); *C01P 2006/12* (2013.01); *C10M 2201/0413* (2013.01); *C10M 2201/14* (2013.01); *C10M 2215/265* (2013.01); *C10N 2050/08* (2013.01)

(58) Field of Classification Search
CPC .............. C10M 105/64; C10M 111/02; C10M 2201/0413; C10M 2215/265; C10M 2201/14; C10M 2201/041; C10N 2050/08; C10N 2040/02; C10N 2020/061; C10N 2020/06; C10N 2050/025; C01P 2002/01; C01P 2002/82; C01P 2002/85; C01P 2004/03; C01P 2004/04; C01P 2004/34; C01P 2006/12
See application file for complete search history.

(56) References Cited

U.S. PATENT DOCUMENTS

| | | | |
|---|---|---|---|
| 2013/0344392 A1 | 12/2013 | Huang et al. | |
| 2014/0107326 A1* | 4/2014 | Swager | C25B 1/00 534/558 |
| 2015/0367381 A1* | 12/2015 | Sumant | C10M 103/04 508/105 |
| 2017/0088788 A1 | 3/2017 | Huang et al. | |
| 2019/0135637 A1 | 5/2019 | Jeon et al. | |

OTHER PUBLICATIONS

Balankin et al., Entropic rigidity of a crumpling network in a randomly folded thin sheet. Phys Rev E. May 23, 2008;77:051124, 8 pages.
Bekyarova et al., Chemical Modification of Epitaxial Graphene: Spontaneous Grafting of Aryl Groups. J Am Chem Soc. Feb. 4, 2009;131(4):1336-7. Epub Jan. 9, 2009.
Berman et al., Graphene: a new emerging lubricant. Mater Today. Jan.-Feb. 2014;17(1):31-42.
Berman et al., Macroscale superlubricity enabled by graphene nanoscroll formation. Science. Jun. 5, 2015;348(6239):1118-22. doi: 10.1126/science.1262024.
Brader et al., Nonlinear rheology of colloidal dispersions. J Phys-Condens Mat. Aug. 18, 2010;22(36):1-38. doi: 10.1088/0953-8984/22/36/363101.
Burke et al., Batteries and Ultracapacitors for Electric, Hybrid, and Fuel Cell Vehicles. Proc IEEE. Apr. 30, 2007;95(4):806-20. doi: 10.1109/JPROC.2007.892490.
Cambou et al., Three-dimensional structure of a sheet crumpled into a ball. Proc Natl Acad Sci USA. Sep. 6, 2011;108(36):14741-5. doi: 10.1073/pnas.1019192108. Epub Aug. 22, 2011.
Chhowalla et al., Thin films of fullerene-like $MoS_2$ nanoparticles with ultra-low friction and wear. Nature. 2000;407:164-7.
Chen, Novel triptycene-derived hosts: synthesis and their applications in supramolecular chemistry. Chem Commun. 2011;47:1674-88. doi: 10.1039/C0CC04852F.
Cheng et al., Imaging the microscopic structure of shear thinning and thickening colloidal suspensions. Science. Sep. 2, 2011;333(6047):1276-9. doi: 10.1126/science.1207032.
Choi et al., Friction anisotropy-driven domain imaging on exfoliated monolayer graphene. Science. Jul. 29, 2011;333(6042):607-10. doi: 10.1126/science.1207110. Epub Jun. 30, 2011.
Chou et al., Triptycene derivatives as high-Tg host materials for various electrophosphorescent devices. J Mater Chem. 2010;20(4):798-805. doi: 10.1039/B918188A.
Dienwiebel et al., Model experiments of superlubricity of graphite. Surf Sci. Feb. 2005;576(1-3):197-211. doi: 10.1016/j.susc.2004.12.011.
Felts et al., Direct mechanochemical cleavage of functional groups from graphene. Nat Commun. Mar. 5, 2015;6:6467. 7pages. doi: 10.1038/ncomms7467.
Feng et al., Superlubric sliding of graphene nanoflakes on graphene. ACS Nano. Feb. 26, 2013;7(2):1718-24. doi: 10.1021/nn305722d. Epub Jan. 24, 2013.
Ferrari et al., Raman spectrum of graphene and graphene layers. Phys Rev Lett. Nov. 3, 2006;97(18):187401, 4 pages. Epub Oct. 30, 2006.
Ferrari et al., Raman spectroscopy of graphene and graphite: Disorder, electron-phonon coupling, doping and nonadiabatic effects. Solid State Commun. Jul. 2007;143(1-2):45-57.
Frank et al., Compression behavior of single-layer graphenes. ACS Nano. Jun. 22, 2010;4(6):3131-8. doi: 10.1021/nn100454w.
Georgakilas et al., Broad Family of Carbon Nanoallotropes: Classification, Chemistry, and Applications of Fullerenes, Carbon Dots, Nanotubes, Graphene, Nanodiamonds, and Combined Superstructures. Chem Rev. Jun. 10, 2015;115(11):4744-822. Epub May 27, 2015.
Del Giudice et al., Shear rheology of graphene oxide dispersions. Curr Opin Chem Eng. May 2017;16:23-30. doi: 10.1016/j.coche.2017.04.003. Epub Apr. 24, 2017.
Gong et al., Graphene nano scrolls responding to superlow friction of amorphous carbon. Carbon. May 2017;116:310-7.
Gosvami et al., Mechanisms of antiwear tribofilm growth revealed in situ by single-asperity sliding contacts. Science. Apr. 3, 2015;348(6230):102-6. doi: 10.1126/science.1258788.
Hart, Iptycenes, Cuppendophanes, and Cappedophanes. Pure Appl Chem. 1993;65(1):27-34.
Heshmat, The Quasi-Hydrodynamic Mechanism of Powder Lubrication: Part II: Lubricant Film Pressure Profile. Lubr Eng. 1992;48(5):373-83. Presented Oct. 14, 1991.
Hod, Interlayer commensurability and superlubricity in rigid layered materials. Phys Rev B. Aug. 20, 2012;86(7):075444, 8 pages. doi:https://doi.org/10.1103/PhysRevB.86.075444.
Holmberg et al., Global energy consumption due to friction in passenger cars. Tribol Int. Mar. 2012;47:221-34. doi: 10.1016/j.triboint.2011.11.022.
James et al., Mechanochemistry: opportunities for new and cleaner synthesis. Chem Soc Rev. Jan. 7, 2012;41(1):413-47. doi: 10.1039/c1cs15171a. Epub Sep. 5, 2011. Accepted Version Deposited Mar. 27, 2013, 79 pages.
Jeon et al., Hyperstage Graphite: Electrochemical Synthesis and Spontaneous Reactive Exfoliation. Adv Mater. Dec. 1, 2017;30(3):1704538, 13 pages. doi:10.1002/adma.201704538 Epub Jan. 15, 2018.
Johns et al., Atomic Covalent Functionalization of Graphene. Acc Chem Res. Jan. 15, 2013;46(1):77-86. Epub Oct. 2, 2012.
Kawai et al., Superlubricity of graphene nanoribbons on gold surfaces. Science. Feb. 26, 2016;351(6276):957-61. doi: 10.1126/science.aad3569.
Kim et al., Chemical vapor deposition-grown graphene: the thinnest solid lubricant. ACS Nano. Jun. 28, 2011;5(6):5107-14. doi: 10.1021/nn2011865. Epub May 12, 2011.
Kharchenko et al., Flow-induced properties of nanotube-filled polymer materials. Nat Mater. Aug. 2004;3(8):564-8. Epub Jul. 25, 2004.
Kwon et al., Enhanced Nanoscale Friction on Fluorinated Graphene. Nano Lett. Dec. 12, 2012;12(12):6043-8. Epub Jun. 25, 2012.
Lee et al., Frictional characteristics of atomically thin sheets. Science. Apr. 2, 2010;328(5974):76-80. doi: 10.1126/science.1184167.
Li et al., A covalently cross-linked reduced functionalized graphene oxide/polyurethane composite based on Diels-Alder chemistry and

(56) References Cited

OTHER PUBLICATIONS its potential application in healable flexible electronics. J Mat Chem C. Nov. 22, 2016;5(1):220-8. doi: 10.1039/C6TC04715G. Epub 2017.

Li et al., In situ polymerization of mechanically reinforced, thermally healable graphene pride/polyurethane composites based on Diels-Adler chemistry. J Mat Chem A. Oct. 17, 2014;2:20642-9.

Li et al., Fluorination of graphene enhances friction due to increased corrugation. Nano Lett. Sep. 10, 2014;14(9):5212-7. doi: 10.1021/nl502147t. Epub Aug. 6, 2014.

Li et al., Organic Light-Emitting Materials and Devices. 1st Edition. Boca Raton: Taylor & Francis Group. 2006. 673 pages. doi: https://doi.org/10.1201/9781420017069. Epub Sep. 12, 2006.

Li et al., The evolving quality of frictional contact with graphene. Nature. Nov. 24, 2016;539(7630):541-545. doi: 10.1038/nature20135.

Long et al., Minimization of Free Volume: Alignment of Triptycenes in Liquid Crystals and Stretched Polymers. Adv Mater. Apr. 18, 2001;13(8):601-4.

Matan et al., Crumpling a Thin Sheet. Phys Rev Lett. Jan. 30, 2002;88(7):076101, 4 pages. Epub Feb. 18, 2002.

Mohrig et al., Hydroplaning of subaqueous debris flows. Geol Soc Am Bull. Mar. 1998;110(3):387-94. doi: 10.1130/0016-7606(1998)110<0387:HOSDF>2.3.CO.

Mokha et al., Teflon Bearings in Base Isolation I: Testing. J Structural Engineering. 1990;116:438-54.

Mungse et al., Chemically functionalized reduced graphene oxide as a novel material for reduction of friction and wear. J Phys Chem C. Jun. 17, 2014;118:14394-402.

Pei et al., A molecular dynamics study of the mechanical properties of hydrogen functionalized graphene. Carbon. Mar. 2010;48(3):898-904. doi: 10.1016/j.carbon.2009.11.014.

Peters et al., Direct observation of dynamic shear jamming in dense suspensions. Nature. Apr. 14, 2016;532:214-7. doi: 10.1038/nature17167.

Qi et al., Wear Resistance Limited by Step Edge Failure: The Rise and Fall of Graphene as an Atomically Thin Lubricating Material. ACS Appl Mater Interfaces. Jan. 11, 2017;9(1):1099-106. doi: 10.1021/acsami.6b12916. Epub Dec. 6, 2016.

Schmidt et al., Occurrence, biogenesis, and synthesis of biologically active carbazole alkaloids. Chem Rev. Jun. 13, 2012;112(6):3193-328. doi: 10.1021/cr200447s. Epub Apr. 5, 2012.

Shahlai et al., Synthesis of supertriptycene and two related iptycenes. J Org Chem. Nov. 1, 1991;56(24):6905-12. Epub May 1, 2002.

Shim et al., Two-Minute Assembly of Pristine Large-Area Graphene Based Films. Nano Lett. Mar. 12, 2014;14(3):1388-93. Epub Feb. 17, 2014.

Sun et al., Large-Area Bernal-Stacked Bi-, Tri-, and Tetralayer Graphene. ACS Nano. Nov. 27, 2012;6(11):9790-6. Epub Nov. 7, 2012.

Terrier et al., Rate and equilibrium studies in Jackson-Meisenheimer complexes. Chem Rev. Apr. 1, 1982;82(2):77-152.

Tie et al., A review of energy sources and energy management system in electric vehicles. Renew Sust Energ Rev. Apr. 2013;20:82-102. doi: 10.1016/j.rser.2012.11.077.

Trappe et al., Jamming phase diagram for attractive particles. Nature. Jun. 14, 20001;411(6839):772-5.

Tung et al., Automotive tribology overview of current advances and challenges for the future. Tribol Int. Jul. 2004;37(7):517-36. doi: 10.1016/j.triboint.2004.01.013.

Vermant et al., Flow-induced structure in colloidal suspensions. J Phys-Condens Mat. 2005;17:R187-R216, 30 pages. doi: 10.1088/0953-8984/17/4/R02.

Wang et al., Measuring Interlayer Shear Stress in Bilayer Graphene. Phys Rev Lett. Jul. 17, 2017;119:036101, 7 pages.

Wang et al., Atomic-scale friction in graphene oxide: An interfacial interaction perspective from first-principles calculations. Phys Rev B. Sep. 20, 2012;86:125436, 9 pages.

Webb et al., A simple method to produce almost perfect graphene on highly oriented pyrolytic graphite. Carbon. Mar. 2011;49(10):3242-9. doi: 10.1016/j.carbon.2011.03.050.

Won et al., Durability and degradation mechanism of graphene coatings deposited on Cu substrates under dry contact sliding. Carbon. 2013;54:472-81. doi: 10.1016/j.carbon.2012.12.007.

Wu et al., Selective surface functionalization at regions of high local curvature in graphene. Chem Commun. 2013;49(7):677-9.

Zhou et al., A general strategy toward graphene@metal oxide core-shell nanostructures for high-performance lithium storage. Energy Environ Sci. Sep. 5, 2011;4:4954-61.

PCT/US2019/030393, Jul. 22, 2019, International Search Report and Written Opinion.

Jeon et al., Hyperstage Graphite: Electrochemical Synthesis and Spontaneous Reactive Exfoliation. Adv Materials. Jan. 2018;30(3):1704538. doi:10.1002/adma.201704538. Epub Dec. 1, 2017. Author Manuscript, 13 pages.

Swager, Iptycenes in the Design of High Performance Polymers. Acc Chem Res. Sep. 2008;41(9):1181-9. doi: 10.1021/ar800107v. Epub Aug. 30, 2008.

\* cited by examiner

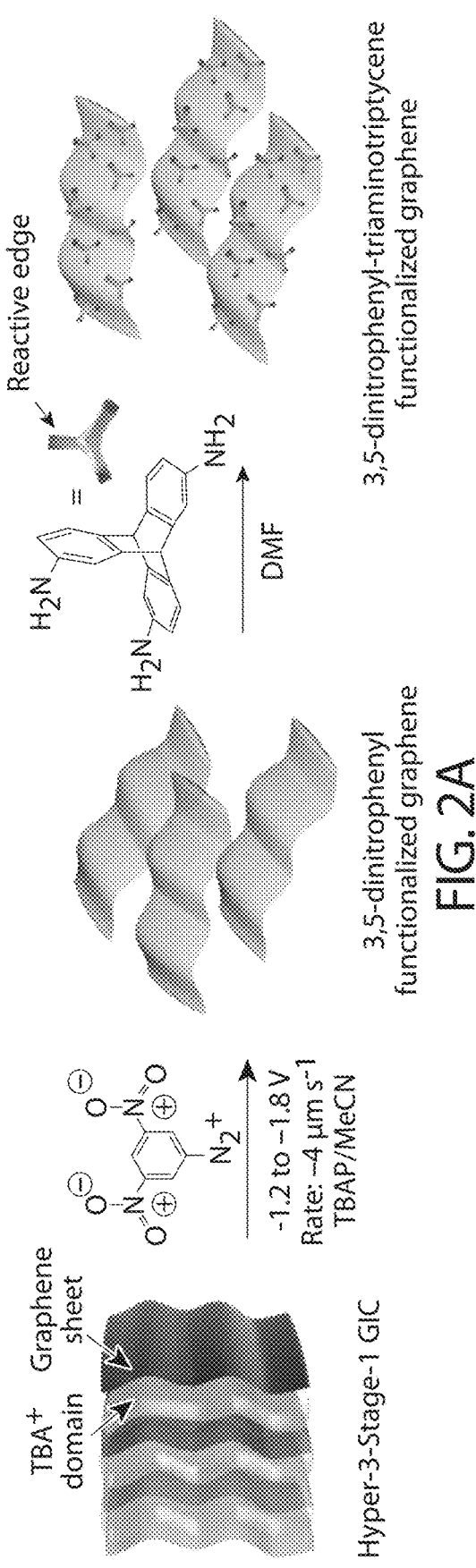
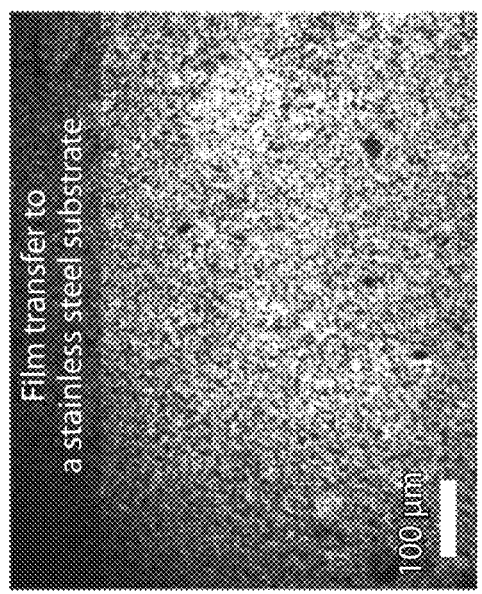
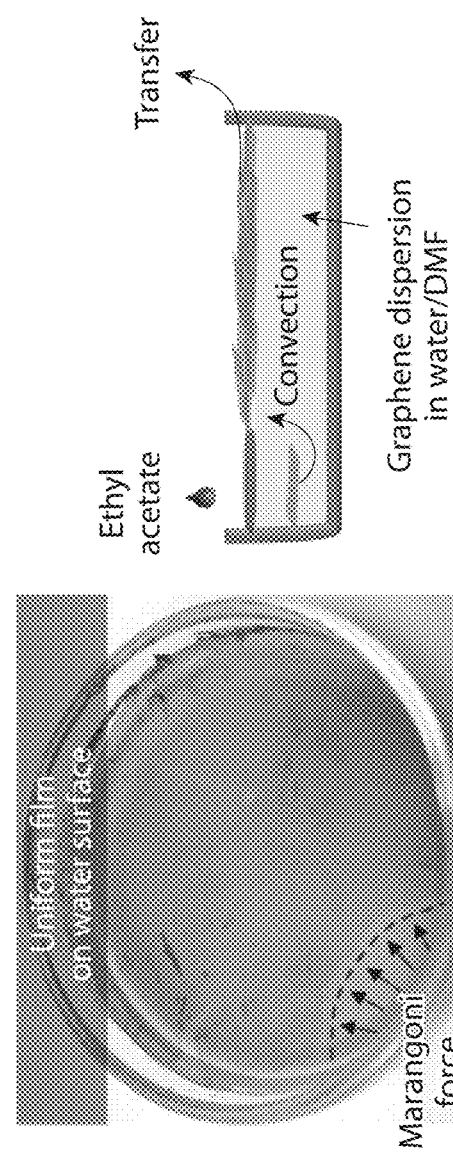
FIG. 2A
FIG. 2B
FIG. 2C

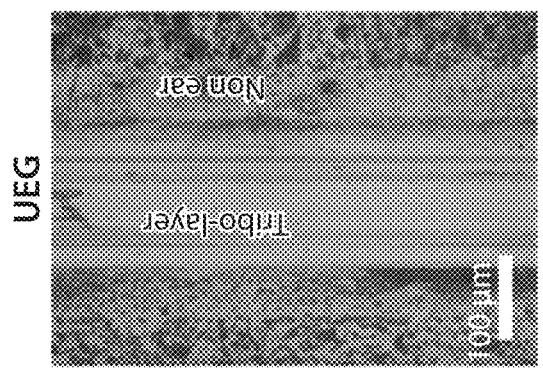
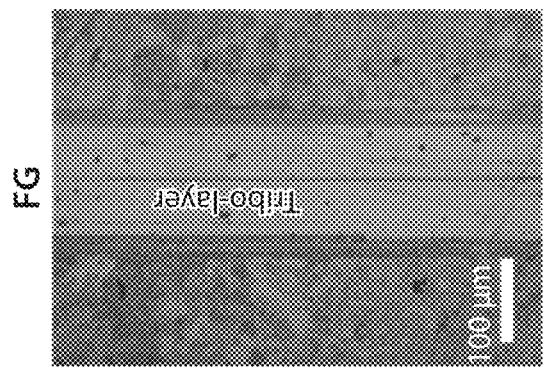
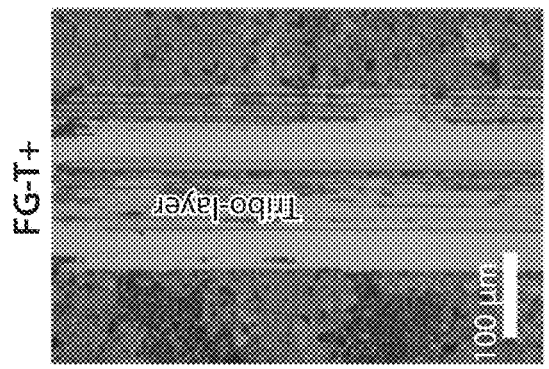
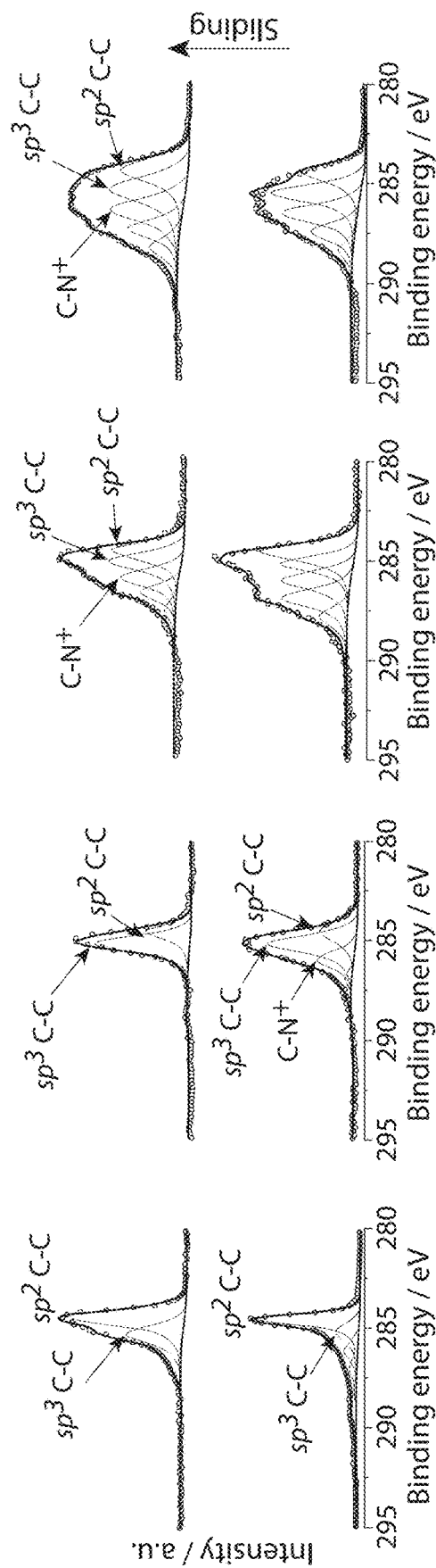
FIG. 31A  FIG. 31B  FIG. 31C  FIG. 31D

COMPOSITIONS COMPRISING A PLURALITY OF DISCRETE NANOSTRUCTURES AND RELATED ARTICLES AND METHODS

CROSS REFERENCE TO RELATED APPLICATIONS

This application claims priority under 35 U.S.C. § 119(e) to U.S. Provisional Patent Application Ser. No. 62/665,601 filed May 2, 2018, and entitled "MACROSCOPIC SUPER-LUBRICITY OF CRUMPLED GRAPHENE NANOBALLS," which is incorporated herein by reference in its entirety for all purposes.

STATEMENT REGARDING FEDERALLY SPONSORED RESEARCH OR DEVELOPMENT

This invention was made with Government support under Grant No. DMR1410718 awarded by the National Science Foundation (NSF). The Government has certain rights in the invention.

FIELD

Embodiments described herein generally relate to compositions comprising a plurality of discrete nanostructures and related articles and methods.

BACKGROUND

Reduction of mechanical friction in mechanical processes improves energy efficiency and thereby can lower environmental impact. Superlubricity, defined by a coefficient of friction (COF) on the order of or near or lower than 0.01, significantly reduces the dissipation of mechanical energy in general mechanical assemblies, such as automotive engines, motors, and turbines. The development of advanced superlubricant materials is therefore useful for the sustainability and achieving higher performance from mechanical devices. Graphene has a desirable incommensurability in its lattice plane with other materials and can suppress mechanical wear. However, creating stable graphene films and promoting incommensurate contact at macroscale interfaces still pose fundamental challenges.

Accordingly, improved compositions and methods are needed.

SUMMARY

Embodiments described herein generally relate to compositions comprising a plurality of discrete nanostructures (e.g., nanostructures comprising a functionalized graphene layer and a core species bound to the functionalized graphene layer), and related articles and methods.

In one aspect, compositions are provided. In some embodiments, the composition comprises a plurality of discrete nano structures, each nanostructure comprising a functionalized graphene layer and a core species bound to the functionalized graphene layer; wherein the composition has a coefficient of friction of less than or equal to 0.02.

In some embodiments, the composition comprises a plurality of discrete nanostructures, each nanostructure comprising a functionalized graphene layer and a core species bound to the functionalized graphene layer; wherein the plurality of discrete nanostructures have a substantially non-planar configuration.

In some embodiments, the composition comprises a plurality of discrete nanostructures, each nanostructure comprising a functionalized graphene layer and a core species bound to the functionalized graphene layer; wherein the core species reversibly covalently binds a first portion of the functionalized graphene layer to a second portion of the functionalized graphene layer.

In another aspect, articles are provided. In some embodiments, the article comprises a plurality of discrete nanostructures, each nanostructure comprising a functionalized graphene layer and a core species bound to the functionalized graphene layer; and a means for depositing the plurality of discrete nanostructures on a surface. In another aspect, methods are provided. In some embodiments, methods of forming a layer are provided. In some embodiments, a method comprises depositing, onto a substrate surface, a composition comprising: a plurality of discrete nanostructures, each nanostructure comprising a functionalized graphene layer and a core species bound to the functionalized graphene layer; and applying a mechanical force to the composition such that the composition exhibits a coefficient of friction of less than or equal to 0.02.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 2A is a schematic illustration of the synthesis of functionalized graphene with 3,5-dinitrophenyl groups anchoring triaminotriptycene groups, according to one set of embodiments;

FIG. 2B is a photograph (left) and schematic illustration (right) of graphene assembly on a water surface, according to one set of embodiments;

FIG. 2C is an optical micrograph of a functionalized graphene film on a stainless steel (SS) substrate, according to one set of embodiments;

FIG. 31A is an optical image (top) and high resolution X-ray photoelectron spectroscopy (XPS) C is spectra of UEG before (bottom) and after (middle) sliding cycles, according to one set of embodiments;

FIG. 31B is an optical image (top) and high resolution XPS C is spectra of FG before (bottom) and after (middle) sliding cycles, according to one set of embodiments;

FIG. 31C is an optical image (top) and high resolution XPS C is spectra of FG-T before (bottom) and after (middle) sliding cycles, according to one set of embodiments;

FIG. 31D is an optical image (top) and high resolution XPS C is spectra of FG-T+ before (bottom) and after (middle) sliding cycles, according to one set of embodiments;

DETAILED DESCRIPTION

Figure 1A:
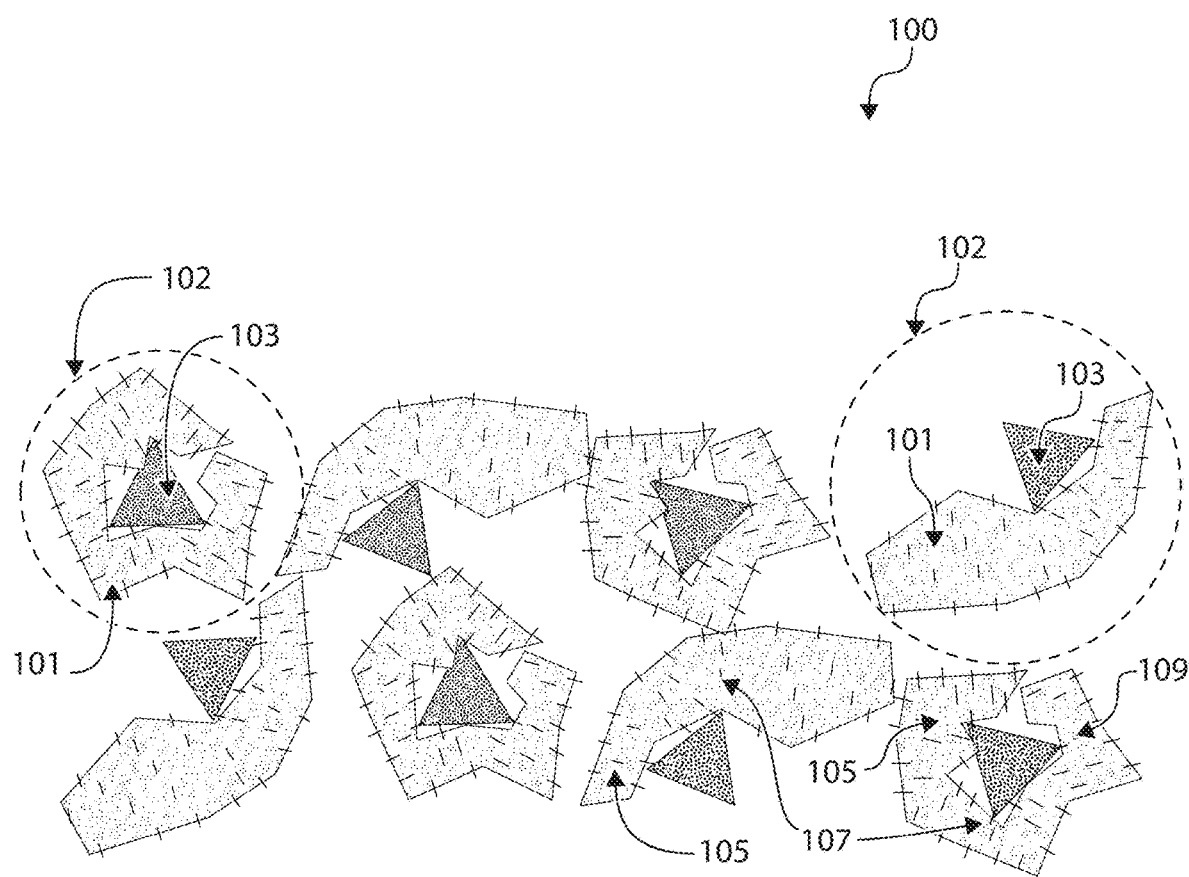
FIG. 1A is a schematic illustration of a composition 100 comprising a plurality of discrete nanostructures 102, according to one set of embodiments.

Embodiments described herein generally relate to compositions comprising a plurality of discrete nanostructures (e.g., nanostructures comprising a functionalized graphene layer and a core species bound to the functionalized graphene layer), and related articles and methods. The compositions and articles described herein may be useful for, for example, for use as tribo-layers (e.g., for reducing friction between two surfaces, as a lubricant). In some embodiments, use of the compositions and articles may provide superlubricity between two surfaces. In some embodiments, a composition described herein provides a coefficient of friction of less than or equal to 0.02 (e.g., where the composition is present between a first surface and a second surface, the coefficient of friction measured between the first and second surfaces). In some embodiments, the composition comprises graphene (e.g., folded graphene, crumpled graphene). Advantageously, some compositions described herein include a fluid-like reconfigurable graphene matrix that shows quasi-hydrodynamic and superlubricant behavior. In some embodiments, mechanical sliding generates complex folded and/or crumpled graphene structures. In some such embodiments, and without wishing to be bound by theory, covalent chemical linkages within the graphene structures impart rigidity and stability to films comprising the composition.

In some embodiments, the plurality of discrete nanostructures have a substantially non-planar configuration (e.g., folded, crumpled). In some embodiments, a core species reversibly covalently binds a first portion of a functionalized graphene layer to a second portion of the functionalized graphene layer. Articles, e.g., articles including a plurality of discrete nanostructures and a means for depositing the plurality of discrete nanostructures on a surface, are also provided. Methods (e.g., methods of forming a layer) are also provided, including depositing a composition onto a substrate surface and/or applying a mechanical force to the composition, e.g., such that the composition exhibits a coefficient of friction of less than or equal to 0.02.

In some embodiments, a composition described herein may behave advantageously such that after the composition has been deposited onto a first surface, moving a second surface across the first surface (e.g., for a mechanical purpose) under a compressive force and/or in the presence of friction-producing movement with the composition disposed between the first surface and the second surface results in a coefficient of friction (COF) that decreases with wear or use of the parts (e.g., parts of a machine) including the first surface and the second surface.

In some embodiments, the compositions described herein are configured for use as a tribo-layer. In some embodiments, compositions described herein may be used as a tribo-layer and/or lubricant. For example, compositions described herein may reduce friction and wear in a macroscopic device such as a bearing, shaft, piston, gear, motor or other mechanical device. Compositions described herein may have utility in industrial, automotive, manufacturing, transportation, and aerospace applications.

In some embodiments, a composition comprises a plurality of discrete nanostructures, wherein each nanostructure comprises a functionalized graphene layer and a core species bound to the functionalized graphene layer. In certain embodiments, the core species (e.g., comprising a triptycene) is covalently bound to the functionalized graphene layer. This covalent binding may be reversible, such that a compressive and/or frictional force applied to the nanostructure or a composition comprising the nanostructure may break or form a covalent bond between a core species and a functionalized graphene layer. In some embodiments, a composition (e.g., tribo-layer) described herein is bound (e.g., bound strongly, bound reversibly) to a substrate surface (e.g., by binding between functionalized graphene layer(s) and the substrate surface and/or binding between core species and the substrate surface). In some embodiments, a composition described herein has a fluid-like property, e.g., imparted by reversible covalent binding between core species and functionalized graphene layers and/or by reversible covalent binding between core species and the substrate surface and/or by reversible covalent binding between functionalized graphene layers and the substrate surface.

In certain embodiments, a composition comprising a plurality of discrete nanostructures, in which each nanostructure comprises a functionalized graphene layer and a core species bound to the functionalized graphene layer, is configured as an interconnected network of nanostructures in which the core species act as cross-linkers between adjacent functionalized graphene layers. In certain embodiments, a composition comprising a plurality of discrete nanostructures, in which each nanostructure comprises a functionalized graphene layer and a core species reversibly covalently bound to the functionalized graphene layer, is configured as a reconfigurable interconnected network of nanostructures in which the core species act as cross-linkers between adjacent functionalized graphene layers. In some embodiments, the reconfigurable interconnected network is reconfigurable by compressive and/or frictional forces applied to the network.

While some embodiments of this disclosure are directed to a core species covalently bound to a functionalized graphene layer, it should be understood that other binding means between the core species and the functionalized graphene layer are also possible. For example, in some embodiments, the core species is bound to the functionalized graphene layer ionically, by Van der Waals interactions, by dipole-dipole interactions, by hydrogen bonding, by pi-pi stacking interactions, or by another suitable bonding means.

In some embodiments, each nanostructure of a plurality of discrete nanostructures comprises a functionalized graphene layer.

As used herein, the term "functionalized" in characterizing a graphene layer will be understood by those of ordinary skill in the art and refers to a graphene layer which has been chemically modified by attachment of one or more species (e.g., core species) via a bond (e.g., a covalent bond). In some embodiments, a graphene layer is functionalized on both major surfaces (as opposed to, e.g., edge functionalization) of the graphene layer.

Turning now to the figures, several non-limiting embodiments are described in further detail. However, it should be understood that the current disclosure is not limited to only those specific embodiments described herein. Instead, the various disclosed components, features, and methods may be arranged in any suitable combination as the disclosure is not so limited.

Figure 1B:
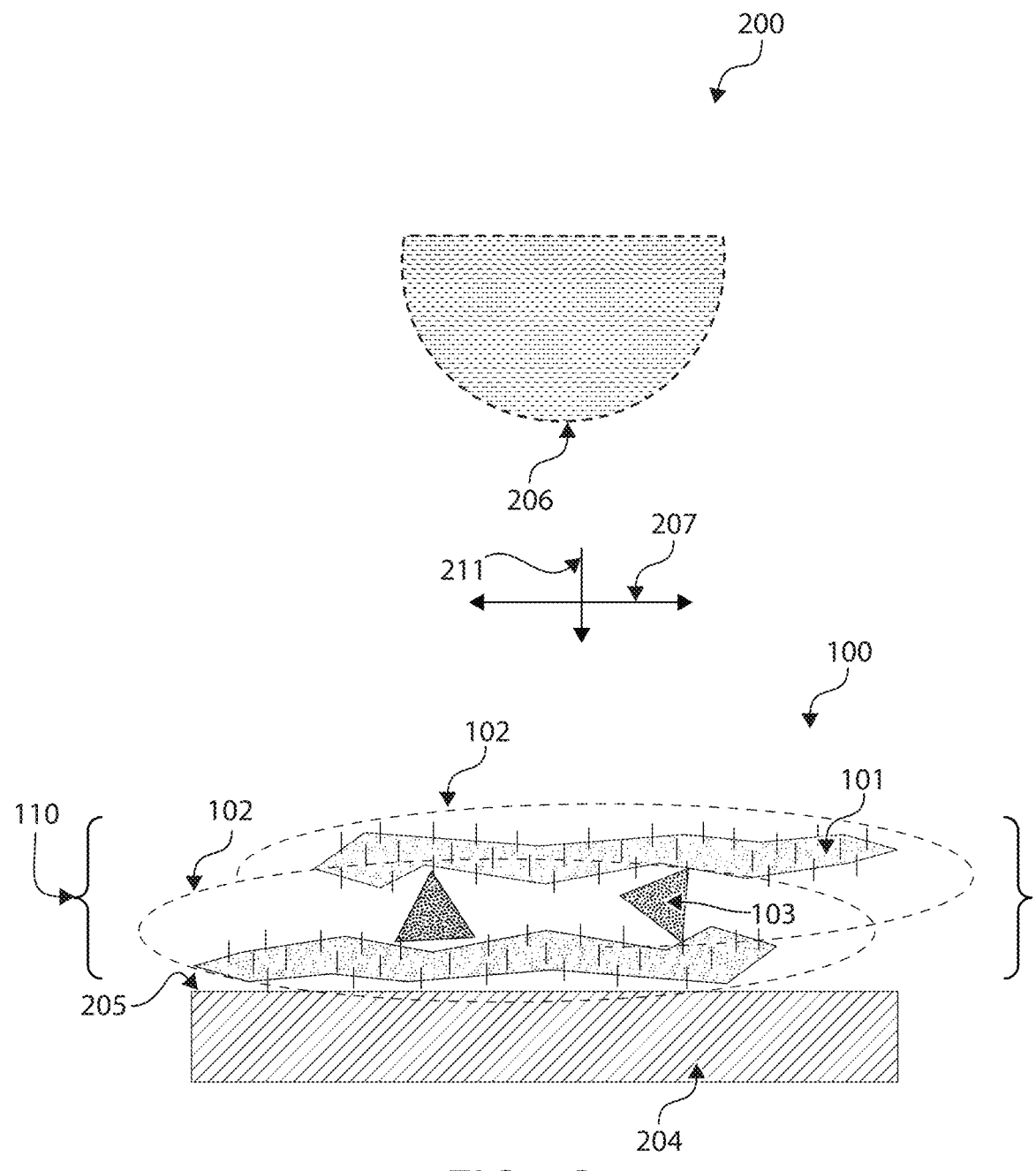
FIG. 1B is a schematic illustration of a system 200 comprising a composition 100 comprising a plurality of discrete nanostructures 102, according to one set of embodiments.
Figure 1C:
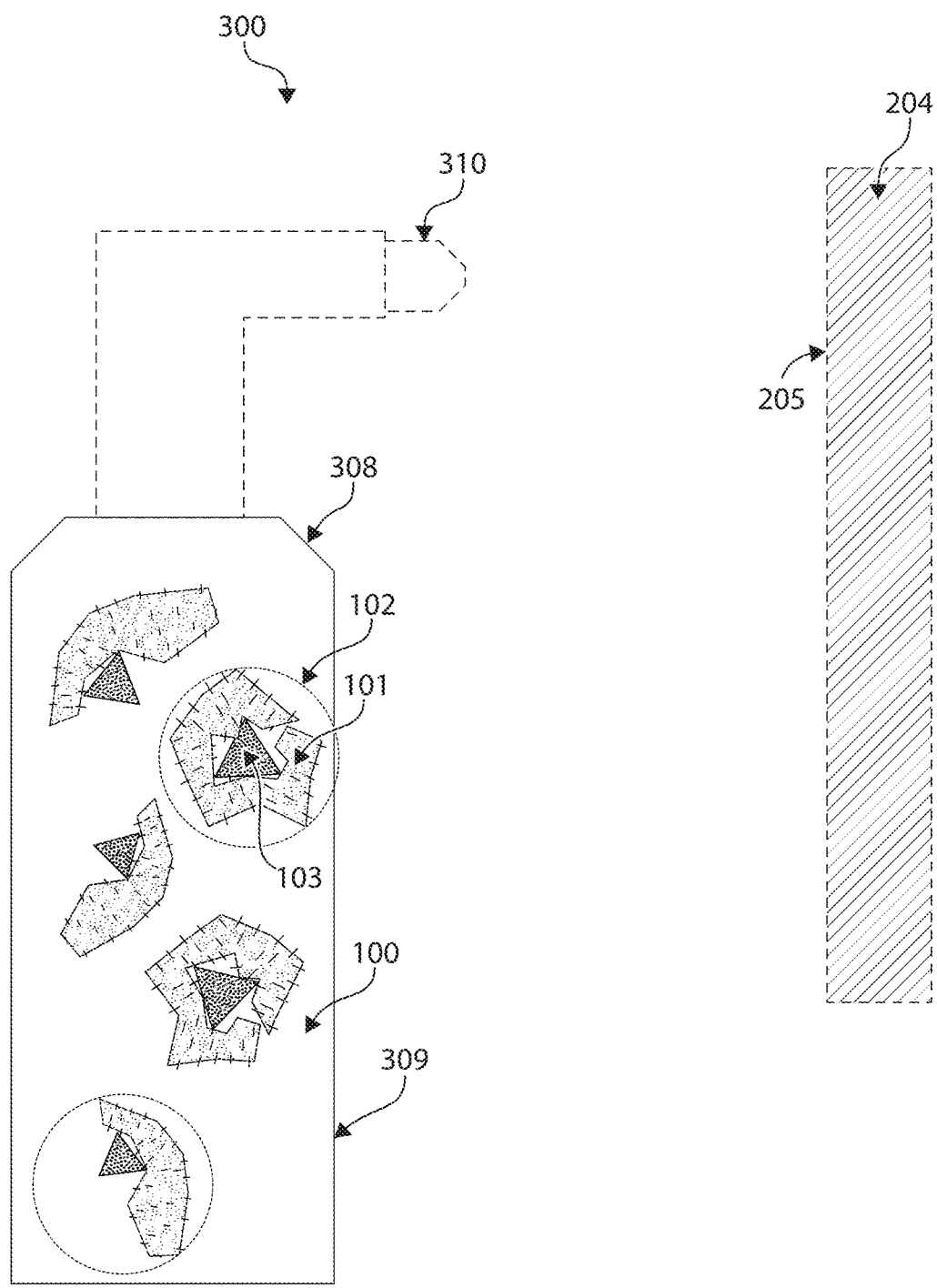
FIG. 1C is a schematic illustration of an article 300 comprising a plurality of discrete nanostructures 102, according to one set of embodiments.

FIG. 1A is a schematic illustration of a composition comprising a plurality of discrete nanostructures, according to one set of embodiments. FIG. 1A illustrates an exemplary composition 100, comprising a plurality (e.g., eight as depicted) of discrete nanostructures 102. Eight nanostructures are depicted. However, it should be understood that any suitable number of nanostructures may be present. In FIG. 1A, each nanostructure 102 comprises a functionalized graphene layer 101 and a core species 103 bound to the functionalized graphene layer 101. The binding sites of the core species 103 in FIG. 1A-FIG. 1C are represented by vertices of a triangle; therefore, the core species are depicted as having three binding sites. However, it should be understood that any suitable number of binding sites (e.g., 2, 3, 4, 5, or more) is possible. In some embodiments, the composition 100 has a coefficient of friction of less than or equal to 0.02 (e.g., less than or equal to 0.008). In some embodiments, e.g. as depicted in FIG. 1A, at least some (e.g., each, as depicted) of the plurality of discrete nanostructures 102 have a substantially non-planar configuration (e.g., a crumpled configuration). In some embodiments, e.g. as depicted in FIG. 1A, core species 103 binds (e.g., reversibly covalently binds) a first portion 105 of functionalized graphene layer 101 to a second portion 107 of functionalized graphene layer 101. In some embodiments, e.g. as depicted in FIG. 1A, core species 103 binds (e.g., reversibly covalently binds) a first portion 105 of functionalized graphene layer 101 to a second portion 107 of functionalized graphene layer 101 and a third portion 109 of functionalized graphene layer 101.

FIG. 1B is a schematic illustration of a system 200 comprising a composition 100 comprising a plurality of discrete nanostructures 102, a substrate 204 on which is disposed the composition 100, and optionally second surface 206, according to one set of embodiments. In some embodiments, e.g., as shown in FIG. 1B, at least some of the plurality of discrete nanostructures 102 have a substantially planar configuration. For example, at least some of the plurality of discrete nanostructures 102 may obtain a substantially planar configuration upon applying a mechanical force to a composition 100, e.g., exposing the composition 100 to a compressive force (e.g., along direction 211) and/or frictional force (e.g., along direction 207, e.g., cycling along direction 207) between substrate surface 205 and second surface 206. In some embodiments, a method of forming a layer 110 on a substrate 204 comprises applying a mechanical force (e.g., compression along direction 211 and/or friction along direction 207) to the composition 100 (e.g., the deposited composition), e.g., such that the composition 100 exhibits a coefficient of friction of less than or equal to 0.02 (e.g., less than or equal to 0.008). FIG. 1C is a schematic illustration of an article 300 comprising a plurality of discrete nanostructures 102 and a means 308 for depositing the plurality of discrete nanostructures 102 on a surface 205 (e.g., a surface 205 of a substrate 204), according to one set of embodiments. In some embodiments as in FIG. 1C, at least some nanostructures 102 (e.g., each nanostructure 102) comprise a functionalized graphene layer 101 and a core species 103 bound to the functionalized graphene layer 101. In some embodiments, as depicted in FIG. 1C, the plurality of discrete nanostructures 102 are disposed in the means 308 for depositing the plurality of discrete nanostructures 102 on surface 205. In some embodiments, the means 308, for depositing the plurality of discrete nanostructures 102 on a surface 205, comprises a spray nozzle 310. In other embodiments, the means 308 does not comprise a spray nozzle. In some embodiments, the means 308 comprises a container 309 in which at least some of the plurality of discrete nanostructures 102 are disposed. In some embodiments, a method of forming a layer (not depicted in FIG. 1C) on a substrate 204 comprises depositing (e.g., using means 308), onto a surface 205 of a substrate 204, a composition 100 comprising a plurality of discrete nanostructures 102 (e.g., each nanostructure 102 comprising a functionalized graphene layer 101 and a core species 103 bound to the functionalized graphene layer 101). In some embodiments, a method of forming a layer (e.g., layer 110 depicted in FIG. 1B) on a substrate 204 comprises applying a mechanical force (e.g., compression along direction 211 and/or friction along direction 207) to the composition (e.g., the deposited composition) on the substrate, e.g., such that the composition on the substrate exhibits a coefficient of friction of less than or equal to 0.02.

In some embodiments, the functionalized graphene layers have an average surface area that is relatively large and relevant to reducing friction and wear in a macroscopic device such as a bearing, shaft, piston, gear, motor or other mechanical device. For example, in some embodiments, the functionalized graphene layers have an average surface area of greater than or equal to 0.0001 microns$^2$, greater than or equal to 0.0004 microns$^2$, greater than or equal to 0.001 microns$^2$, or greater than or equal to 0.01 microns$^2$. In some embodiments, the functionalized graphene layers have an average surface area of less than or equal to 40 microns$^2$, less than or equal to 20 microns$^2$, less than or equal to 4 microns$^2$, or less than or equal to 1 microns$^2$. Combinations of the above-referenced ranges are also possible (e.g., greater than or equal to 0.0001 microns$^2$ and less than or equal to 40 microns$^2$, greater than or equal to 0.01 microns$^2$ and less than or equal to 40 microns$^2$, greater than or equal to 0.01 microns$^2$ and less than or equal to 1 microns$^2$). Other ranges are also possible.

In some embodiments, at least some of a plurality of discrete nanostructures comprise a chemically reversible linkage.

In some embodiments, at least some of a plurality of discrete nanostructures has a chemical bond configured for mechanical energy dissipation.

In some embodiments, at least some of a plurality of discrete nanostructures form and/or are formed from a molecular bearing. In some embodiments, the application of friction to a plurality of discrete nanostructures forms molecular bearings. In some embodiments, the molecular bearing both has a large resistance against compression and facilitates superlubricity. A molecular bearing may have any suitable diameter. For example, in some embodiments, a molecular bearing has a diameter of less than 5 nm, less than 4 nm, less than 3 nm, or less than 2.5 nm. In some embodiments, a molecular bearing has a diameter of greater than or equal to 1 nm, greater than or equal to 1.5 nm, or greater than or equal to 2 nm. Combinations of the above-referenced ranges are also possible (e.g., greater than or equal to 1 nm and less than 5 nm, greater than or equal to 1.5 nm and less than 4 nm, greater than or equal to 2 nm and less than 3 nm). Other ranges are also possible. In certain embodiments, a molecular bearing has a diameter of less than 3 nm.

In some embodiments, at least some of (e.g., each of) a plurality of discrete nanostructures have a substantially non-planar configuration. For example, in certain embodiments, at least some of (e.g., each of) the plurality of discrete nanostructures have a crumpled configuration. In certain embodiments, the plurality of discrete nanostructures have a rolled configuration.

In some embodiments, at least some of (e.g., all of) a plurality of discrete nanostructures have a substantially planar configuration.

In some embodiments, at least some of (e.g., all of) a plurality of discrete nanostructures have a substantially non-planar configuration and/or at least some of (e.g., all of) the plurality of discrete nanostructures have a substantially planar configuration. In some embodiments, a plurality of discrete nano structures is configured such that, under the application of mechanical force, at least a portion of (e.g., all of) the plurality of discrete nanostructures obtain a substantially non-planar configuration (e.g., a crumpled configuration). In some embodiments, a plurality of discrete nanostructures is configured such that, under the application of mechanical force, at least a portion of (e.g., all of) the plurality of discrete nanostructures obtain a substantially planar configuration.

In some embodiments, a composition described herein has a coefficient of friction of less than or equal to 0.02, less than or equal to 0.015, less than or equal to 0.014, less than or equal to 0.013, less than or equal to 0.012, less than or equal to 0.01, less than or equal to 0.009, or less than or equal to 0.008. In some embodiments, a composition described herein has a coefficient of friction of greater than or equal to $1\times10^{-5}$, greater than or equal to $1\times10^{-4}$, or greater than or equal to $1\times10^{-3}$. Combinations of the above-referenced ranges are also possible (e.g., greater than or equal to $1\times10^{-5}$ and less than or equal to 0.02, greater than or equal to $1\times10^{-4}$ and less than or equal to 0.01, greater than or equal to $1\times10^{-3}$ and less than or equal to 0.008). Other ranges are also possible. In certain embodiments, a composition described herein has a coefficient of friction of greater than or equal to $1\times10^{-5}$ and less than or equal to 0.008.

In some embodiments, a coefficient of friction is determined according to a friction measurement between two objects, with a finite pressure exerted between respective surfaces of the two objects, with a contact area of greater than or equal to $4.8\times10^{-8}$ m$^2$ and less than or equal to $1.4\times10^{-7}$ m$^2$. In some embodiments, a coefficient of friction of a composition described herein is determined according to a friction measurement where the composition is disposed directly between two objects, with a finite pressure exerted between respective surfaces of the two objects onto the composition, with a contact area of greater than or equal to $4.8\times10^{-8}$ m$^2$ and less than or equal to $1.4\times10^{-7}$ m$^2$.

In some embodiments, a composition described herein is configured, upon application of a mechanical force to the composition, to maintain a coefficient of friction of less than or equal to 0.02, less than or equal to 0.015, less than or equal to 0.014, less than or equal to 0.013, less than or equal to 0.012, less than or equal to 0.01, less than or equal to 0.009, or less than or equal to 0.008. In some embodiments, a composition described herein is configured, upon application of a mechanical force to the composition, to maintain a coefficient of friction of greater than or equal to $1\times10^{-5}$, greater than or equal to $1\times10^{-4}$, or greater than or equal to $1\times10^{-3}$. Combinations of the above-referenced ranges are also possible (e.g., greater than or equal to $1\times10^{-5}$ and less than or equal to 0.02, greater than or equal to $1\times10^{-4}$ and less than or equal to 0.01, greater than or equal to $1\times10^{-3}$ and less than or equal to 0.008). Other ranges are also possible. In certain embodiments, a composition described herein is configured, upon application of a mechanical force to the composition, to maintain a coefficient of friction of greater than or equal to $1\times10^{-5}$ and less than or equal to 0.008.

In some embodiments, a composition described herein exhibits superlubricity.

In some embodiments, a composition (e.g., tribo-layer) described herein is bound (e.g., bound strongly, bound reversibly) to a substrate surface. Non-limiting examples of materials which a substrate surface may comprise include a metal (e.g., stainless steel), diamond-like carbon (DLC), an alloy, a mineral, a glass, a ceramic, diamond, a form of carbon, and/or a plastic. In some embodiments, the composition is bound to a substrate surface covalently (e.g., reversibly covalently), ionically, by Van der Waals interactions, by dipole-dipole interactions, by hydrogen bonding, by pi-pi stacking interactions, or by another suitable bonding means. A composition described herein may be bound to a substrate surface by means of binding core species and/or functionalized graphene layers with the substrate surface.

In some embodiments, a composition described herein comprises a graphene layers having any suitable functionalization. In some embodiments, the nanostructure is functionalized with a functional group.

The functional group may be any species capable of forming a bond with a graphene molecule, including graphene molecules within an activated graphite material. For example, the functional group may be selected to contain an electrophile, such as a carbonyl group. In some cases, the functional group contains a diazonium group (e.g., an aryldiazonium group), a transition metal having a formal charge of +1 or greater, a main group atom substituted with an electronegative group, an aryl group optionally substituted with one or more halogens (e.g., benzyl halide), or an alkyl group optionally substituted with one or more halogens. The main group atom may be, for example, B, Al, Sn, Si, Ga, P, Sn, As, Sb, or Pb.

In some cases, the functional group may be selected to include a polymerizable group. The polymerizable group may be any functional group capable of undergoing polymerization, for example, exposure to high temperature, electromagnetic radiation, a particular chemical reagent, or other polymerization conditions. The polymerizable group may be polymerized according to known methods, including, but not limited to, cationic polymerization, anionic polymerization, radical polymerization, condensation polymerization, Wittig polymerization, ring-opening polymerization, cross-coupling polymerization, addition polymerization, chain polymerization, or the like. Those of ordinary skill in the art would be able to select the appropriate polymerizable group and/or polymerization reaction conditions suitable for use in a particular application. For example, the polymerizable group may include, for example, an olefinic group, acrylate group, or other group capable of forming radicals upon exposure to, for example, electromagnetic radiation. In one set of embodiments, the functional group comprises styrene sulfonic acid.

In one set of embodiments, the functional group comprises an aryldiazonium group (e.g., an aryldiazonium salt). A graphite material may be treated, as described herein, to form an expanded, activated graphene species including intercalated species and/or separation layers between graphene sheets. Subsequently, the activated graphene species may be covalently functionalized via the electrochemical reduction and attachment of an aryldiazonium salt.

In an illustrative embodiment, the method may involve the electrochemical expansion of graphite in an electrolyte containing a propylene carbonate and lithium salts, followed by another electrochemical expansion of graphite in an electrolyte containing a propylene carbonate and tetrabutylammonium cations. Subsequently, the electrochemically expanded graphite can be subjected to in situ functionalization (e.g., electrochemical functionalization, chemical functionalization) with a functional group such as an aryldiazonium salt. This expansion-functionalization method may effectively yield functionalized graphene molecules, including single-layer and multi-layer graphene molecules. In some embodiments, functionalized graphene layers are functionalized with 3,5-dinitrophenyl groups. In some embodiments, functionalized graphene layers comprise graphene oxide.

In some embodiments, a functionalized graphene layer has a substantially non-planar configuration. For example, in some embodiments, a functionalized graphene layer is at least partially wrapped around a core species.

In some embodiments, each nanostructure of a plurality of discrete nanostructures comprises a core species. In some embodiments, the core species is bound to a functionalized discrete nanostructure such as a graphene layer (e.g., bound to a functional group bound to the graphene layer).

In some embodiments, the core species is configured as a center or core of a nanostructure comprising a graphene layer having a substantially non-planar configuration.

In some embodiments, the core species is bound to the functionalized graphene via formation of a bond, such as an ionic bond, a covalent bond (e.g., a reversible covalent bond), a hydrogen bond, Van der Waals interactions, dipole-dipole interactions, pi-pi stacking interactions, or by another suitable bonding means. The covalent bond may be, for example, carbon-carbon, carbon-oxygen, oxygen-silicon, sulfur-sulfur, phosphorus-nitrogen, carbon-nitrogen, metal-oxygen, or other covalent bonds. The hydrogen bond may be, for example, between hydroxyl, amine, carboxyl, thiol, and/or similar functional groups.

Non-limiting examples of chemical compounds which a core species may comprise include an amine (e.g., a primary amine), a triptycene (e.g., triaminotriptycene), an alcohol, a phosphorus compound, an aminated triptycene, an aminated higher order iptycene, [1.1.1]propellane, [2.2.2]propellane, 1,3-dehydroadamantane, norbornane, bicyclo[3,3,3]undecane, bicyclo[3,3,1]nonane, bicyclo[3,3,2]decane, bicyclo[4,3,1]decane, bicyclo[4,3,2]undecane, and/or bicyclo[4,3,3]dodecane. In certain embodiments, the core species comprises triaminotriptycene.

In some embodiments, a core species described herein reversibly covalently binds a first portion of a functionalized graphene layer to a second portion of the functionalized graphene layer. In some embodiments, a core species described herein reversibly covalently binds a portion of a first functionalized graphene layer to a portion of a second functionalized graphene layer. In certain embodiments, a core species has two or more binding sites (e.g., three binding sites), each with the capacity to bind to a functionalized graphene layer and/or to a substrate surface. In some embodiments, a core species described herein reversibly covalently binds a first portion of a functionalized graphene layer to a second portion of the functionalized graphene layer and a third portion of the functionalized graphene layer. In some embodiments, a core species described herein reversibly covalently binds a portion of a first functionalized graphene layer to a portion of a second functionalized graphene layer and a portion of a third functionalized graphene layer. In some embodiments, a core species described herein reversibly covalently binds a first portion of a first functionalized graphene layer to a second portion of the first functionalized graphene layer and a portion of a second functionalized graphene layer.

In some embodiments, a core species described herein is configured to maintain a discrete nanostructure in a substantially non-planar configuration.

In some embodiments, a core species described herein is configured to bind to a surface. In such embodiments, the core species described herein is configured to bind to the surface covalently (e.g., reversibly covalently), ionically, by Van der Waals interactions, by dipole-dipole interactions, by hydrogen bonding, by pi-pi stacking interactions, or by another suitable bonding means. In some embodiments, the surface comprises a metal (e.g., stainless steel), diamond-like carbon (DLC), an alloy, a mineral, a glass, a ceramic, diamond, a form of carbon, and/or a plastic. In certain embodiments, a core species described herein is configured to bind to a metal surface.

In another aspect, an article is provided. In some embodiments, the article comprises a composition described herein (e.g., a composition comprising a plurality of discrete nanostructures described herein), and a means for depositing the composition on a surface. In some embodiments, the article comprises a plurality of discrete nanostructures described herein, and a means for depositing the plurality of discrete nanostructures on a surface. In some embodiments, the means for depositing the plurality of discrete nanostructures on the surface comprises a container in which at least some of the plurality of discrete nanostructures are disposed. In some embodiments, the means for depositing the plurality of discrete nanostructures on a surface comprises a spray nozzle.

In another aspect, methods are provided, e.g., methods of forming a nanostructure, a composition, and/or a layer.

In some embodiments, a method comprises adding a functionalized graphene layer described herein and a core species described herein to a solvent (e.g., an organic solvent, e.g., dimethylformamide). In some embodiments, a method comprises adding a functionalized graphene layer described herein and a core species described herein to a solvent (e.g., an organic solvent, e.g., dimethylformamide) to form a nanostructure comprising the functionalized graphene layer and the core species. In some embodiments, a method comprises adding functionalized graphene layers described herein and core species described herein to a solvent (e.g., an organic solvent, e.g., dimethylformamide) to form a plurality of nanostructures, at least some nanostructures (e.g., each nanostructure) comprising a functionalized graphene layer and a core species.

In some embodiments, a method comprises filtering a suspension comprising functionalized graphene layer(s), core species, and a solvent (e.g., an organic solvent, e.g., dimethylformamide) to form a composition.

In some embodiments, a method comprises adding a functionalized graphene layer described herein and a core species described herein to a liquid lubricant to form the composition. Non-limiting examples of liquid lubricant include polyalpha-olefins (PAO), synthetic esters, polyalkylene glycols (PAG), phosphate esters, alkylated naphthalenes (AN), silicate esters, ionic fluids, and/or multiply alkylated cyclopentanes (MAC).

In some embodiments, a method comprises depositing, onto a substrate surface, a composition described herein. In some embodiments, depositing the composition onto the substrate surface comprises spraying, drop-casting, brushing, layer-by-layer assembling, and/or water transfer printing the composition onto the substrate surface. In some embodiments, the method comprises depositing a composition described herein in the form of a coating on a substrate surface described herein.

In some embodiments, a method comprises applying a mechanical force to a composition (e.g., a deposited composition) described herein. In some embodiments, the method comprises applying a mechanical force to a composition (e.g., a deposited composition) described herein such that the composition exhibits a coefficient of friction of less than or equal to 0.02, less than or equal to 0.015, less than or equal to 0.014, less than or equal to 0.013, less than or equal to 0.012, less than or equal to 0.01, less than or equal to 0.009, or less than or equal to 0.008. In some embodiments, the method comprises applying a mechanical force to a composition (e.g., a deposited composition) described herein such that the composition exhibits a coefficient of friction of greater than or equal to $1 \times 10^{-5}$, greater than or equal to $1 \times 10^{-4}$, or greater than or equal to $1 \times 10^{-3}$. Combinations of the above-referenced ranges are also possible (e.g., greater than or equal to $1 \times 10^{-5}$ and less than or equal to 0.02, greater than or equal to $1 \times 10^{-4}$ and less than or equal to 0.01, greater than or equal to $1 \times 10^{-3}$ and less than or equal to 0.008). Other ranges are also possible. In certain embodiments, the method comprises applying a mechanical force to a composition (e.g., a deposited composition) described herein such that the composition exhibits a coefficient of friction of greater than or equal to $1 \times 10^{-5}$ and less than or equal to 0.008.

In some embodiments, a method comprises applying a mechanical force to a composition described herein, comprising a plurality of discrete nanostructures described herein, such that the plurality of discrete nanostructures of the composition obtain a substantially non-planar configuration. In some embodiments, a method comprises applying a mechanical force to a composition described herein, comprising a plurality of discrete nanostructures described herein, such that the plurality of discrete nanostructures of the composition obtain a substantially planar configuration.

In some embodiments, applying a mechanical force to a composition described herein comprises exposing the composition to a compressive and/or frictional force between a substrate surface described herein and a second surface. Non-limiting examples of materials which a second surface may comprise include a metal (e.g., stainless steel), diamond-like carbon (DLC), an alloy, a mineral, a glass, a ceramic, diamond, a form of carbon, and/or a plastic. In certain embodiments, the substrate surface comprises stainless steel and the second surface comprises diamond-like carbon. In certain embodiments, the substrate surface is a surface of stainless steel and the second surface is a surface of diamond-like carbon. In some embodiments, applying a mechanical force to a composition described herein comprises exposing the composition to a compressive and/or frictional force between a substrate surface and a second surface such that the composition exhibits a coefficient of friction of less than or equal to 0.02.

In some embodiments, a core species comprises a bridged bicyclic compound (e.g., an iptycene-based compound, extended iptycene structure).

Bridged bicyclic compounds described herein generally have the structure as in Formula (I):

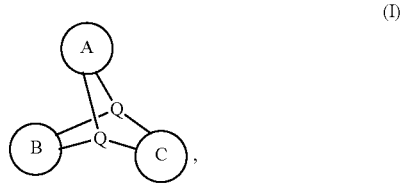

(I)

wherein A, B, and C are the same or different and at least two of A, B, and C include pi-electron groups (e.g., an electron donating group, an electron accepting group) and Q is a tetrahedral bridgehead group. For example, in some embodiments, the bridged bicyclic compound is a [2.2.1] bridged bicyclic compound having a structure as in Formula (I) wherein A and B are different and include pi-electron groups (e.g., A comprises an electron donating group, B comprises an electron accepting group), and C is oxygen, NR, or CR$_2$, where R is H or phenyl. In certain embodiments, the bridged bicyclic compound is a [2.2.2] bridged bicyclic compound having a structure as in Formula (I) wherein A, B, and C are the same or different and include pi-electron groups (e.g., A and B comprise electron donating groups and C comprises an electron accepting group, A and B comprise electron accepting groups and C comprises an electron donating group).

Some embodiments provide bridged bicyclic compounds such as an iptycene-based compound comprising an iptycene core and one or more optionally substituted heterocyclyl or optionally substituted heteroaryl moieties rigidly bonded to the iptycene-based core. In some cases, a group may be rigidly bonded to a core such that the group does not easily rotate about a bond axis, e.g., a bond that binds the group to the core. In one embodiment, the group rotates no more than about 180°, no more than about 120°, no more than about 60°, no more than about 30°, or less, about a bond that binds the group to the core. In some cases, a group may be rigidly bound to the core via two covalent bonds. For example, a group may be fused to the core via covalent bonds to two adjacent atoms of the core. In some embodiments, the heterocyclyl or heteroaryl groups may be substituted with one or more electron-withdrawing groups.

In some cases, the heterocyclyl or heteroaryl moiety may be rigidly bonded to the iptycene core and/or may define at least a portion of the iptycene core. For example, the iptycene core may include one or more phenyl rings that may be extended or functionalized so as to form a heterocyclyl or heteroaryl moiety (e.g., a pyridine, a parazine, an indazole group, a carbazole group, a benzothiphene group, a dibenzothiophene group) which includes one or more phenyl rings of the iptycene core.

Some embodiments may involve an iptycene-based structure containing one or more indole moieties, carbazole moieties, benzothiophene moieties, or dibenzothiophene moieties, optionally substituted, as electron donor groups. In some embodiments, the iptycene-based structure includes an indole and/or carbazole moiety substituted with an N-aryl group (e.g., a phenyl group) at the nitrogen atom (e.g., and may be used to tune electronic properties of the bridged bicyclic compound). In some embodiments, the indole, carbazole, benzothiophene, or dibenzothiophene moiety may be attached to the iptycene-based structure. In some embodiments, the indole, carbazole, benzothiophene, or dibenzothiophene moiety may rigidly bonded to an iptycene core and may define at least a portion of the iptycene core.

In some embodiments, the bridged bicyclic compound includes a triptycene core. In some embodiments, the bridged bicyclic compound includes a pentiptycene core. It should be understood that the compound may include other, extended iptycene cores which have, for example, additional numbers of branches, arene planes, and/or extended bridgehead structures. For example, the central phenyl ring of a pentiptycene core may have an extended structure such as a central anthracene ring system. The synthesis of iptycenes and like molecules is described in, for example, Hart, "Iptycenes, Cuppendophanes and Cappedophanes," Pure and Applied Chemistry, 65(1):27-34 (1993); and Shahlia et al., "Synthesis of Supertriptycene and Two Related Iptycenes," Journal of Organic Chemistry, 56:6905-6912 (1991), the contents of which are incorporated herein by reference. In some embodiments, the iptycene core may be synthesized via a Diels-Alder reaction between an anthracene species and a benzyne species.

Methods for synthesizing such compounds are described, e.g., as in Chou et al., J. Mater. Chem. 2010, 20, 798-805; Schmidt et al., Chem. Rev. 2012, 112(6), 3193-3328; U.S. Publication No. 2009/0105488; and Li et al., Organic Light-Emitting Materials and Devices, Boca Raton: Taylor & Francis Group, 2007, the contents of which are incorporated herein by reference.

The term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. The alkyl groups may be optionally substituted, as described more fully herein. Examples of alkyl groups include, but are not limited to, methyl, ethyl, propyl, isopropyl, butyl, isobutyl, tert-butyl, 2-ethylhexyl, cyclopropyl, cyclobutyl, cyclopentyl, cyclohexyl, and the like. "Heteroalkyl" groups are alkyl groups wherein at least one atom is a heteroatom (e.g., oxygen, sulfur, nitrogen, phosphorus, etc.), with the remainder of the atoms being carbon atoms. Examples of heteroalkyl groups include, but are not limited to, alkoxy, poly(ethylene glycol)-, alkyl-substituted amino, tetrahydrofuranyl, piperidinyl, morpholinyl, etc. "Fluoroalkyl" groups are alkyl groups wherein at least one hydrogen is replaced with a fluoro group. In some cases, all hydrogen groups of an alkyl group are replaced with fluoro groups to form a fluoroalkyl group (e.g., CF$_3$).

The term "alkoxy" refers to —O-alkyl. A "fluoroalkoxy" group refers to —O— fluoroalkyl.

The terms "alkenyl" and "alkynyl" refer to unsaturated aliphatic groups analogous to the alkyl groups described above, but containing at least one double or triple bond respectively. The "heteroalkenyl" and "heteroalkynyl" refer to alkenyl and alkynyl groups as described herein in which one or more atoms is a heteroatom (e.g., oxygen, nitrogen, sulfur, and the like).

The term "aryl" refers to an aromatic carbocyclic group having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl), all optionally substituted. "Fluoroaryl" groups are aryl groups that are substituted with at least one fluoro group.

The terms "amine" and "amino" refer to both unsubstituted and substituted amines, e.g., a moiety that can be represented by the general formula: N(R')(R")(R''') wherein R', R", and R''' each independently represent a group permitted by the rules of valence.

The terms "acyl," "carboxyl group," or "carbonyl group" are recognized in the art and can include such moieties as can be represented by the general formula:

wherein W is H, OH, O-alkyl, O-alkenyl, or a salt thereof. Where W is O-alkyl, the formula represents an "ester." Where W is OH, the formula represents a "carboxylic acid." In general, where the oxygen atom of the above formula is replaced by sulfur, the formula represents a "thiolcarbonyl" group. Where W is a S-alkyl, the formula represents a "thiolester." Where W is SH, the formula represents a "thiolcarboxylic acid." On the other hand, where W is alkyl, aryl, or another carbon-containing substituent, the above formula represents a "ketone" group. Where W is hydrogen, the above formula represents an "aldehyde" group.

Functionalized graphene may be produced by any suitable method. Methods for producing functionalized graphene can be found, e.g., in U.S. Patent Application Publication No. US 2014/0107326 having U.S. patent application Ser. No. 13/788,819, filed Mar. 7, 2013, and entitled "METHODS INVOLVING GRAPHENE AND FUNCTIONALIZED GRAPHENE," which is incorporated herein by reference in its entirety. In some embodiments, the functionalized graphene is produced by electrochemical exfoliation. In one set of embodiments, a first graphene sheet and second, adjacent graphene sheet may be exposed to a first species under a set of conditions which facilitates intercalation (e.g., electrochemical intercalation) of the first species between the first and second graphene sheets, producing an activated graphene material. The first and second adjacent graphene sheets can refer to graphene sheets which are positioned to be substantially continuously in sufficient proximity such that they interact via pi-pi stacking interactions, rather than, for example, graphene sheets which are randomly dissolved or dispersed in a fluid carrier and which do not interact with one another substantially continuously via pi-pi stacking interactions. In some cases, the first and second adjacent graphene sheets may be arranged within a bulk graphite material, including graphite powder, graphite flakes, orientated pyrolytic graphite, graphite sheets, and the like. In some embodiments, the first and second adjacent graphene sheets are arranged as adjacent graphene layers within graphite.

In some cases, intercalation of a species (e.g., a cationic species) between the first and second adjacent graphene sheets may be carried out under electrochemical conditions. For example, intercalation may be performed by applying a voltage to a mixture containing a fluid carrier (e.g., propylene carbonate), a material containing the first and second adjacent graphene sheets, and the species. In some cases, the voltage may be negative. In some cases, a voltage of in the range of about −2.5 to about −6.0 may be applied. In some cases, a voltage of in the range of about −3.0 to about −5.0 may be applied. In some cases, a single voltage may be applied to the material and species for a period of time. In some cases, a range of voltages may be applied to the material and species over a period of time.

Typically, the species to be intercalated between the first and second adjacent graphene sheets may be a cationic species, including inorganic cations and organic cations, as described more fully herein. In some cases, one type of cationic species may be intercalated between the first and second adjacent graphene sheets. In some cases, more than one type of cationic species may be intercalated simultaneously between the first and second adjacent graphene sheets. In some cases, more than one type of cationic species may be sequentially intercalated between the first and second adjacent graphene sheets. For example, a first species may be intercalated between the first and second adjacent graphene sheets, followed by intercalation of a second, different species between the first and second adjacent graphene sheets. In some embodiments, the first species, when intercalated between the first and second adjacent graphene sheets, may facilitate intercalation of the second species between the first and second adjacent graphene sheets. In some cases, the second species may not be intercalated between the first and second adjacent graphene sheets in the absence of the first species.

For example, the first species may be a cationic species having relatively small diameter, such as a lithium ion, and a second species may be a cationic species having a relatively large diameter (e.g., greater than or equal to 3 Å), such as a tetraalkylammonium cation. Intercalation of the first species between graphene sheets of a graphite material may activate the graphite material, facilitating the intercalation of the second species. However, in the absence of the first species intercalated within the graphite material, the second species may not be successfully intercalated within the graphite material.

Methods described herein may also provide additional features which facilitate the intercalation of species between graphene sheets and, hence, enhance the expansion of materials such as graphite. In some cases, the method may involve one or more chemical or electrochemical processes (e.g., electrodecomposition, electro-polymerization) which provide a driving force for the continuous intercalation of species between graphene sheets. In some cases, the method may involve a chemical or electrochemical process that results in the formation of separation layers between graphene sheets.

For example, some embodiments may involve electrochemical intercalation of a cationic species between adjacent graphene sheets and concomitant neutralization of the cationic species upon intercalation. In some cases, electrodecomposition of the intercalated cationic species may at least partially neutralize positive charges within a graphite lattice, thereby continually maintaining a driving force for intercalation of additional cationic species within the graphite lattice. The neutralized species may, in some cases, be deposited on the surface of the graphene sheet. In some cases, an organic cationic species such as a tetraalkylammoniun cation may be intercalated within a graphite lattice and may decompose to a neutral species. As a result, additional organic cationic species may be intercalated within the graphite lattice. The organic cationic species may be any species capable of undergoing electro-decomposition or electro-polymerization under substantially the same (e.g., identical) conditions as the electrochemical intercalation of the organic cationic species. Examples of such organic cationic species include, for example, alkyl-substituted ammonium cations and pyridinium cations.

In some embodiments, a graphite material may be treated to form an activated graphene species (e.g., via expansion/intercalation methods described herein), and then reacting the activated graphene species with a functional group to form functionalized graphene molecules. In some embodiments, the activated graphene species may be reacted with the functional group chemically. In some embodiments, the activated graphene species may be reacted with the functional group precursor electrochemically, where the degree of functionalization may be controlled by varying, for example, the applied voltage or reaction time.

In some cases, the functionalized graphene molecule may be a single-layer functionalized graphene molecule. In some cases, the functionalized graphene molecule may be a multi-layer functionalized graphene molecule. Functional groups are described in more detail herein.

As used herein, exposure to a "set of conditions" may comprise, for example, exposure to a particular temperature, pH, solvent, chemical reagent, type of atmosphere (e.g., nitrogen, argon, oxygen, etc.), source of external energy (e.g., voltage), or the like. In some cases, the set of conditions may be selected to facilitate intercalation of a species within two adjacent sheets of graphene or other processing of graphene or graphite. In some cases, the set of conditions may be selected to facilitate chemical transformation of a species, for example, from a charged species to a neutral species. In some cases, the set of conditions may be selected to facilitate transformation of an organic solvent via electrodecomposition. Some embodiments may involve a set of conditions comprising exposure to a source of external energy. The source of energy may comprise, e.g., electromagnetic radiation, electrical energy, sound energy, thermal energy, or chemical energy. For example, the set of conditions may comprise application of a voltage. In some embodiments, the set of conditions comprises exposure to a particular potential, solvent, chemical species, and/or functional group precursor.

As described herein, a cationic species may be intercalated between two adjacent graphene sheets. In some cases, the cationic species is an inorganic cationic species. The inorganic cationic species may include, in some cases, a Group 1A or Group 2A metal ion. As used herein, a Group 1A metal ion refers to ions of lithium, sodium, potassium, rubidium, cesium, and francium. As used herein, a Group 2A metal ion refers to ions of beryllium, magnesium, calcium, strontium, barium, and radium. In some embodiments, the cationic species comprises $Li^+$, $Na^+$, $K^+$, $Rb^+$, $Ca^{2+}$, $Mg^{2+}$, or $Ba^{2+}$.

In some cases, the cationic species is an organic cationic species. For example, the cationic species may include an ammonium cation. The ammonium cation may be substituted with optionally substituted alkyl groups, optionally substituted aryl groups, combinations thereof, and the like. In some embodiments, the cationic species is an ammonium cation substituted with optionally substituted alkyl groups, such as C1-8 alkyl groups (e.g., methyl, ethyl, propyl, isopropyl, butyl, sec-butyl, tert-butyl, pentyl, hexy, heptyl, or octyl). In some embodiments, the cationic species is an ammonium cation substituted with optionally substituted aryl groups.

In some cases, the cationic species may have a diameter of greater than or equal to 3 Å. In some cases, the cationic species may have a diameter of greater than or equal to 5 Å. In some cases, the cationic species may have a diameter of greater than or equal to 10 Å.

As used herein, the term "nanostructure" will be understood by those of ordinary skill in the art and may refer to a structure having at least one dimension of less than 1000 nm (e.g., less than 100 nm, less than 10 nm).

As used herein, the term "tribo-layer" will be known to those of ordinary skill in the art and may refer to a tribological layer of a lubricant material between moving surfaces that is used for decreasing friction between the moving surfaces.

As used herein, the term "graphene layer" refers to a single molecular layer of graphene.

As used herein, the term "crumpled" will be known to those of ordinary skill in the art and may refer to having an appearance of having been crumpled (e.g., similar to a crumpled piece of paper). A crumpled configuration of a nanostructure may be observed, e.g., using scanning electron microscopy, atomic force microscopy, and/or transmission electron microscopy.

As used herein, the term "substantially non-planar configuration" in referring to a nanostructure or a graphene layer will be understood by those of ordinary skill in the art and may refer to topography such that the nanostructure or graphene layer has a configuration that is substantially not confined within a single spatial plane, also referred to herein as a three-dimensional structure.

As used herein, the term "substantially planar configuration" in referring to a nanostructure or a graphene layer will be understood by those of ordinary skill in the art and may refer to topography such that the nanostructure or graphene layer has a configuration that is substantially confined within a single spatial plane.

As used herein, the term "contact area" refers to an area within which there is contact between the surface of one object and either the surface of another object or a composition described herein that is disposed directly between the surface of the one object and the surface of the other object. As will be known to those of ordinary skill in the art, the coefficient of friction may scale with the contact area (as contact area increases, coefficient of friction increases).

As used herein, the term "superlubricity" will be known to those of ordinary skill in the art and may refer to a regime of motion in which the coefficient of friction is low (e.g., less than or equal to 0.02, less than or equal to 0.01, less than or equal to 0.001).

The terms "electron-withdrawing group," "electron-deficient group," and "electron-poor group" are recognized in the art and as used herein refer to a functionality which draws electrons to itself more than a hydrogen atom would at the same position. Examples of electron-withdrawing groups include carbonyl groups (e.g., ketone, esters, aldehydes), sulfonyl, fluoro, trifluoromethyl, nitro, cyano, and the like.

The terms "electron-donating group" and "electron-rich group" as used herein refer to a functionality which draws electrons to itself less than a hydrogen atom would at the same position. Exemplary electron-donating groups include amino, hydroxy, alkoxy, acylamino, acyloxy, alkyl, halides, and the like.

As used herein, the term "heterocycle" or "heterocyclyl" refers to a monocyclic or polycyclic heterocyclic ring that is either a saturated ring or an unsaturated non-aromatic ring. Typically, the heterocycle may include 3-membered to 14-membered rings. In some cases, 3-membered heterocycle can contain up to 3 heteroatoms, and a 4- to 14-membered heterocycle can contain from 1 to about 8 heteroatoms. Each heteroatom can be independently selected from nitrogen, which can be quaternized; oxygen; and sulfur, including sulfoxide and sulfone. The heterocycle may be attached via any heteroatom ring atom or carbon ring atom. Representative heterocycles include morpholinyl, thiomorpholinyl, pyrrolidinonyl, pyrrolidinyl, piperidinyl, piperazinyl, hydantoinyl, valerolactamyl, oxiranyl, oxetanyl, tetrahydrofuranyl, tetrahydropyranyl, tetrahydropyrindinyl, tetrahydropyrimidinyl, tetrahydrothiophenyl, tetrahydrothiopyranyl, and the like. A heteroatom may be substituted with a protecting group known to those of ordinary skill in the art, for example, the hydrogen on a nitrogen may be substituted with a tert-butoxycarbonyl group. Furthermore, the heterocyclyl may be optionally substituted with one or more substituents (including without limitation a halogen atom, an alkyl radical, or aryl radical). Only stable isomers of such substituted heterocyclic groups are contemplated in this definition.

As used herein, the term "heteroaromatic" or "heteroaryl" means a monocyclic or polycyclic heteroaromatic ring (or radical thereof) comprising carbon atom ring members and one or more heteroatom ring members (such as, for example, oxygen, sulfur or nitrogen). Typically, the heteroaromatic ring has from 5 to about 8 ring members in which at least 1 ring member is a heteroatom selected from oxygen, sulfur, and nitrogen. In another embodiment, the heteroaromatic ring is a 5 or 6 membered ring and may contain from 1 to about 4 heteroatoms. In another embodiment, the heteroaromatic ring system has a 7 to 8 ring members and may contain from 1 to about 6 heteroatoms. Representative heteroaryls include pyridyl, furyl, thienyl, pyrrolyl, oxazolyl, imidazolyl, indolizinyl, thiazolyl, isoxazolyl, pyrazolyl, isothiazolyl, pyridazinyl, pyrimidinyl, pyrazinyl, triazinyl, triazolyl, pyridinyl, thiadiazolyl, pyrazinyl, quinolyl, isoquniolyl, indazolyl, benzoxazolyl, benzofuryl, benzothiazolyl, indolizinyl, imidazopyridinyl, isothiazolyl, tetrazolyl, benzimidazolyl, benzoxazolyl, benzothiazolyl, benzothiadiazolyl, benzoxadiazolyl, carbazolyl, indolyl, tetrahydroindolyl, azaindolyl, imidazopyridyl, qunizaolinyl, purinyl, pyrrolo[2,3]pyrimidyl, pyrazolo[3,4]pyrimidyl, benzo(b)thienyl, and the like. These heteroaryl groups may be optionally substituted with one or more substituents.

Suitable substituents for various groups described herein, e.g., alkyl, alkoxy, alkyl sulfanyl, alkylamino, dialkylamino, alkylene, alkenyl, alkynyl, cycloalkyl, cycloalkenyl, heterocyclyl, aryl, aralkyl, heteroaryl, and heteroarylalkyl groups, include any substituent that will form a stable compound. Examples of substituents include alkyl, alkoxy, alkyl sulfanyl, alkylamino, dialkylamino, alkenyl, alkynyl, cycloalkyl, an cycloalkenyl, an heterocyclyl, an aryl, an heteroaryl, an aralkyl, an heteroaralkyl, a haloalkyl, —C(O)NR$^a$R$^b$, —NR$^c$C(O)R$^d$, halo, —OR', cyano, nitro, haloalkoxy, —C(O)R$^c$, —NR$^a$R$^b$, —SR$^c$, —C(O)OR$^c$, —OC(O)R$^c$, —NR$^c$C(O)NR$^a$R$^b$, OC(O)NR$^a$R$^b$, NR$^c$C(O)OR$^d$, S(O)$_p$R$^c$, or —S(O)$_p$NR$^a$R$^b$, wherein R$^a$ and R$^b$, for each occurrence are, independently, H, an optionally substituted alkyl, an optionally substituted alkenyl, an optionally substituted alkynyl, an optionally substituted cycloalkyl, an optionally substituted cycloalkenyl, an optionally substituted heterocyclyl, an optionally substituted aryl, an optionally substituted heteroaryl, an optionally substituted aralkyl, or an optionally substituted heteroaralkyl; or R$^a$ and R$^b$ taken together with the nitrogen to which they are attached form optionally substituted heterocyclyl or optionally substituted heteroaryl; and R$^c$ and R$^d$ for each occurrence are, independently, H, an optionally substituted alkyl, an optionally substituted alkenyl, an optionally substituted alkynyl, an optionally substituted cycloalkyl, an optionally substituted cycloalkenyl, an optionally substituted heterocyclyl, an optionally substituted aryl, an optionally substituted heteroaryl, an optionally substituted aralkyl, or an optionally substituted heteroaralkyl. In addition, alkyl, cycloalkyl, alkylene, heterocyclyl, and any saturated portion of a alkenyl, cycloalkenyl, alkynyl, aralkyl, or heteroaralkyl group, may also be substituted with =O, =S, or =NR$^c$.

EXAMPLES

The following examples illustrate embodiments of certain aspects of the invention. It should be understood that the methods and/or materials described herein may be modified and/or scaled, as known to those of ordinary skill in the art.

Advanced functional fluid-like graphenes with out-of-plane solid-like rigidity provide unique opportunities for achieving unusual physical and chemical properties to meet the high-performance demands for next generation interfacial technologies. Of particular interest in the present study are graphenes with specific chemical functionalization that can predictably promote incommensurate sliding structures. This study experimentally demonstrated superlubricity between stainless steel (SS) and diamond-like-carbon (DLC) with densely functionalized graphenes by chemically constraining sheets into three-dimensional structures. The densely functionalized graphenes displayed dynamic inter-sheet linkages and mechanically transformed into stable tribo-layers. The macroscopic lubricity evolved through the formation of rigid crumpled graphene nanoballs in a thin film of an interconnected graphene matrix that provided a coefficient of friction (COF)~0.012 or 0.008. Sliding-induced crumpling produced the graphene nanoballs in situ and the complex pattern folds were stabilized by chemical linkages to impart rigidity and stability in macroscopic friction tests. Mechanical sliding generated complex folded graphene structures in which equilibrated covalent linkages imparted rigidity and stability to the films examined in macroscopic friction tests. This facile design for the reduction of frictional sliding is scalable and has potential applications in many industrial and automotive fields. This new approach to frictional reduction has broad implications for manufacturing, transportation, and aerospace.

Graphene has a desirable incommensurability in its lattice plane with other materials and can suppress mechanical wear. In particular, graphene has exceptionally strong intralayer C=C bonds and weaker dispersive interactions with other materials, which has led to superlubricity in atomically defined experiments. S. Li et al., reported via sliding tip mechanical tests that there is more out-of-plane deformation for single layer graphene than is observed for layered graphenes (e.g. 2-5 layers), which can lead to a larger contact area and thereby a larger friction. This result suggests that the quality of the contact, manipulating wrinkling or local puckering effects in graphenes, can change the tribological process. However, creating stable graphene films and promoting incommensurate contact at macroscale interfaces still pose fundamental challenges. In particular, superior lubricant materials may have both the properties of a liquid and those of a solid. At one extreme, a thin layer of a liquid (water) can behave as a lubricant, and hydroplaning behavior may reduce frictional contact, e.g., between tires and a road. Inspired by hydroplaning and graphite, in this study was designed a fluid-like reconfigurable graphene matrix that showed quasi-hydrodynamic and superlubricant behavior. In contrast to sophisticated atomic force microscopy (AFM) experiments with one graphene nanoribbon, macroscopic sliding under high pressure degrades graphene and impedes the formation of a stable tribo-layer. Thus, this study targeted using crumpled and rolled rigidified nanostructures. It was hypothesized that chemically reinforced crumpled nanoballs of two-dimensional (2-D) graphene would have a large resistance to further compression and thereby reduce inter-material interactions to give sustained superlubricity. It was further hypothesized that the graphene matrix with chemically dynamic (le) connections could transform into molecular bearings that simultaneously had a large resistance to further compression and a stable top-surface with sustained superlubricity. To test this hypothesis for macroscopic superlubricity, a crumpled nanoball structure was designed by wrapping graphenes around covalently attached structurally rigid triptycene molecular cores. A coating was designed wherein basal plane functionalized graphenes produced by electrochemical activation were covalently attached to structurally rigid triptycene molecular cores. This unusual new class of graphenes represents an attractive design for next generation lubricants.

Crumpled graphene nanoballs and/or interconnected graphene matrices were produced by the reactive formation of Meisenheimer complexes between graphene functionalized with 3,5-dinitrophenyl groups and triaminotriptycene. Triaminotriptycene was designed as a highly stable rigid three-dimensional (3-D) interlocking group configured to reversibly covalently link reactive functionalized graphenes into an interconnected matrix that can be dynamically configured by physical sliding motions. This study made use of graphene densely functionalized with 3,5-dinitrophenyl groups that were selectively prepared using electrochemical activation and exfoliation of graphite. Triptycene is a rigid three-dimensional frame consisting of three symmetric benzene blades protruding from a single axis, and this structure has displayed broad utility in the design of advanced functional materials. Triaminotriptycene was utilized as a rigid interlocking group that chemical linked reactive and flexible functionalized graphene sheets into nanoballs when they were deformed during sliding motion. The findings of this study showed that these triaminotriptycene functionalized graphenes were crumpled into these three-dimensional low volume structures that had a high resistance to further compression. The sliding-induced graphene nanoball structure provided an incommensurate contact to slide against a mixed $sp^3/sp^2$ bonded carbon diamond-like-carbon (DLC) interface. The COF of triaminotriptycene-functionalized graphene (FG-T) reached the superlubricity regime (COF~0.013 or 0.008), whereas graphene functionalized with 3,5-dinitrophenyl groups showed a higher and erratic friction as a result of chemical interactions with contacting materials. The 3,5-dinitrophenyl functionalized graphene was reacted with triaminotriptycene (Triamino-T) to give a material, triaminotriptycene-functionalized graphenes (FG-T+), that evolved into stable tribo-layers during sliding mechanical stimulation. The structural arrangement of the graphene nanoball provides a novel pathway to achieve robust superlubricity. Additionally, the structural re-arrangement of the graphene matrix provides a mechanism to achieve robust superlubricity at both the micro- and macro-scale.

Results and Discussion

Figure 8A:
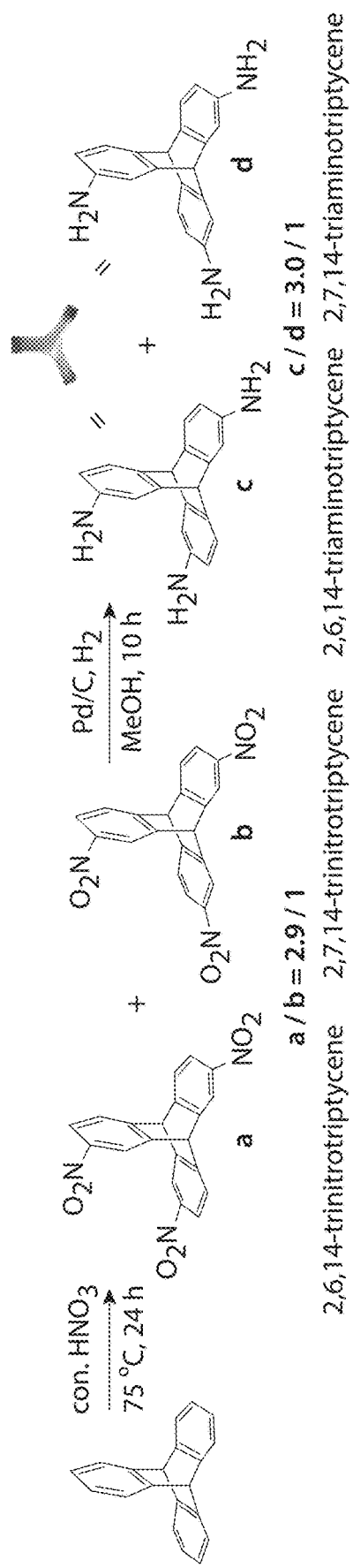
FIG. 8A is a schematic illustration of a synthesis of trinitrotriptycenes and triaminotriptycenes, according to one set of embodiments.
Figure 8B:
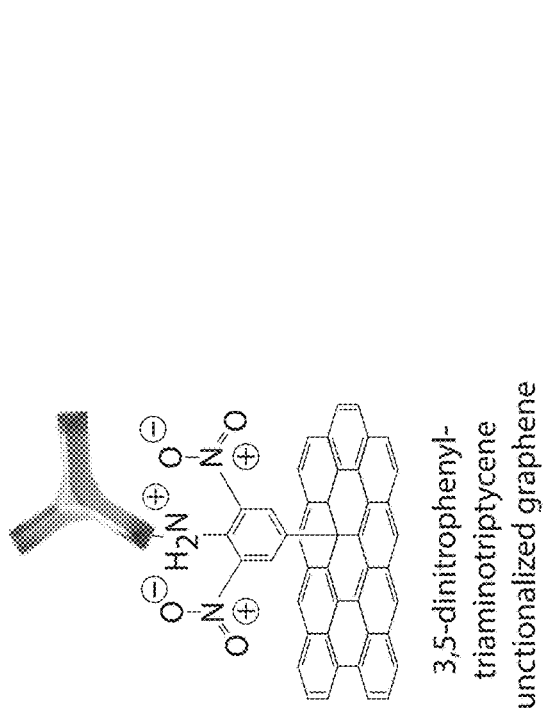
FIG. 8B is a schematic illustration of a synthesis of 3,5-dinitrophenyl-triaminotriptycene functionalized graphene, according to one set of embodiments.
Figure 8B:
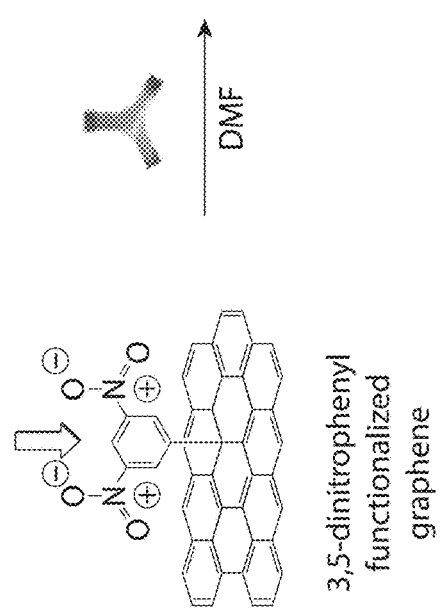

FIG. 2A and FIG. 8 illustrate the synthesis of the functionalized graphene with 3,5-dinitrophenyl groups anchoring triaminotriptycene groups. The densely functionalized graphene with 3,5-dinitrophenyl groups (C/N atomic ratio~14.87) was synthesized from Hyper-3-Stage-1 graphite intercalation compound (GIC) produced electrochemically. Meisenheimer complexes formed by the addition reaction of amines to the 3,5-dinitrophenyl groups to produce reactive graphene sheets (FIG. 8) that could be assembled into nanoballs. These graphenes assembled into uniform films on the surface of water when several drops of ethyl acetate were added to a dispersion in dimethylformamide (DMF) that had been added to water (FIG. 2B). In this process the graphene moved to the water-air surface by Rayleigh-Benard convection and then simultaneously assembled into an interconnected film driven by Marangoni forces. The film was then transferred onto a stainless steel (SS) substrate (FIG. 2C). After transfer, solvent was removed by vacuum evaporation at room temperature for 30 min. This densely covered surface was required to prevent the DLC from directly contacting the SS substrate (FIG. 3).

Figure 3A:
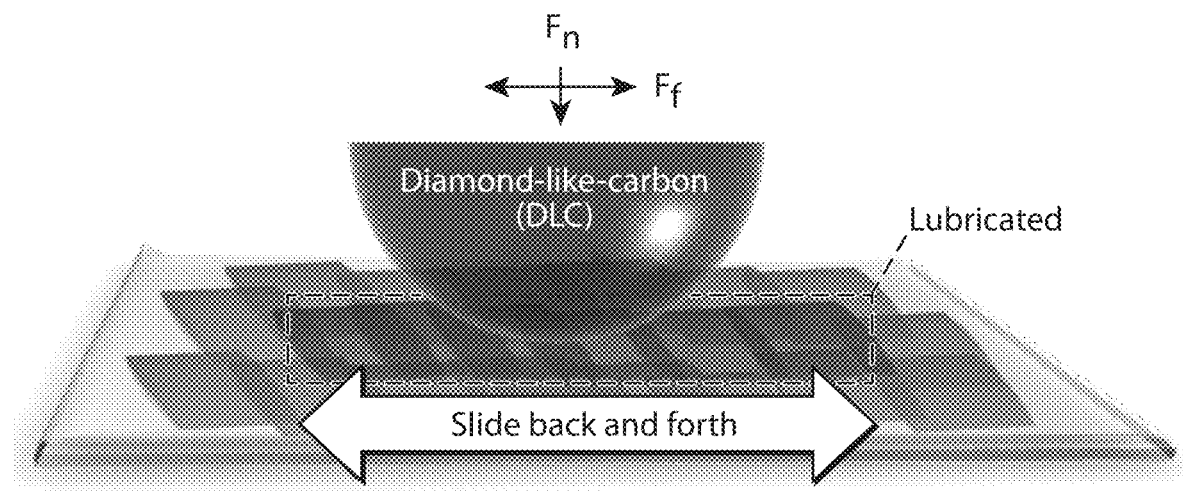
FIG. 3A is a schematic illustration showing the geometry of a linear tribometer equipped with a diamond-like carbon (DLC)-coated steel ball, according to one set of embodiments.
Figure 10:
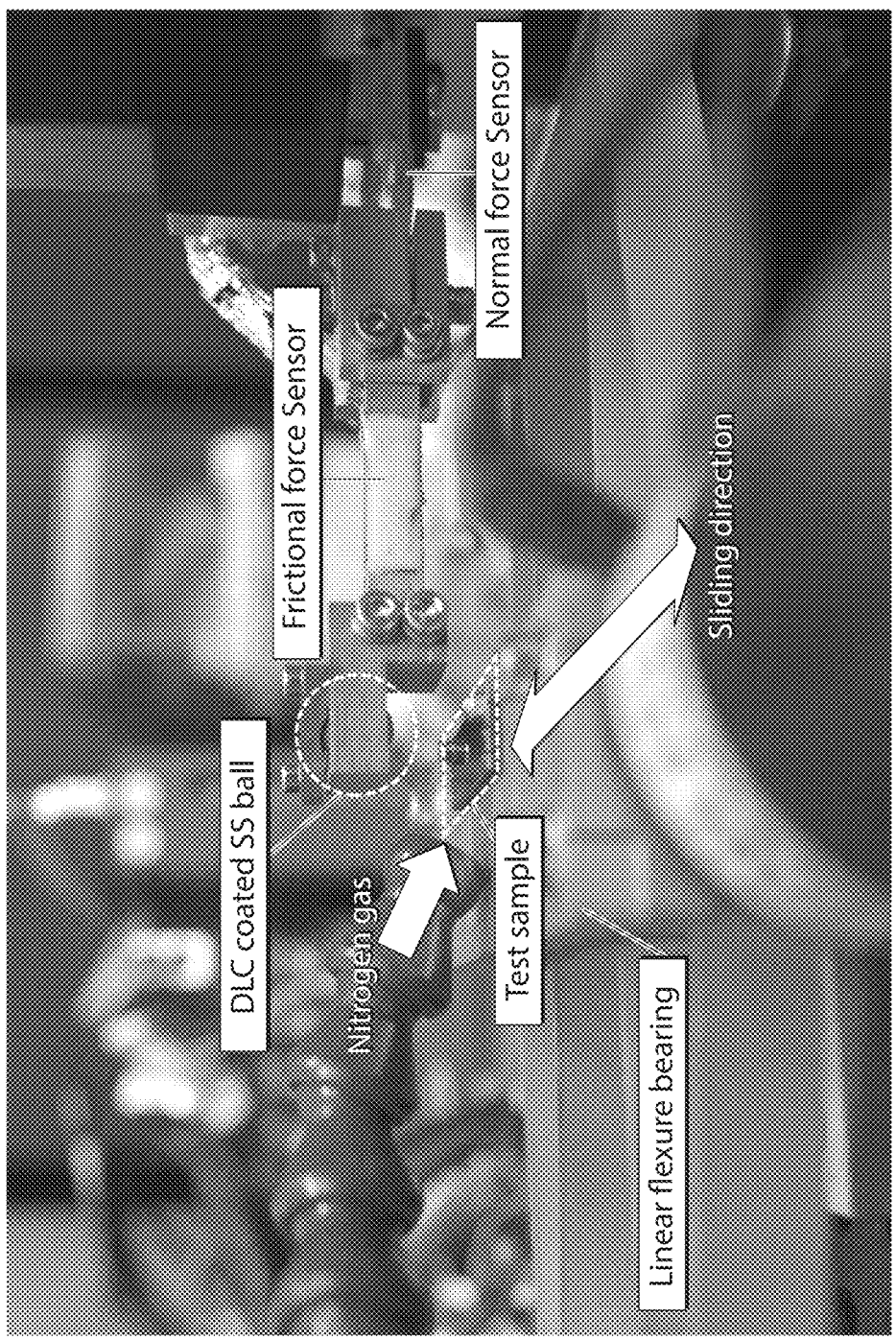
FIG. 10 is a labeled photograph of a linear tribometer equipped with a DLC-coated steel ball, according to one set of embodiments.

FIGS. 2A-2C illustrate the design of the molecular structure of superlubricant graphene. FIG. 2A illustrates the synthesis of 3,5-dinitrophenyl-triaminotriptycene functionalized graphene. The Hyper-3-Stage-1 GIC represents the expanded gallery with intercalated tetrabutylammonium ion (TBA+) domains between the basal planes of graphenes (TBAP=tetrabutylammonium perchlorate), FIG. 2B illustrates graphene assembly on water surface by Rayleigh-Benard convection and Marangoni force. FIG. 2C is an optical micrograph of a functionalized graphene film on a SS substrate. Friction tests were conducted on graphene-coated SS substrates against a DLC-coated stainless steel ball, using a custom-built linear macrotribometer (FIG. 3A and FIG. 10).

Figure 18A:
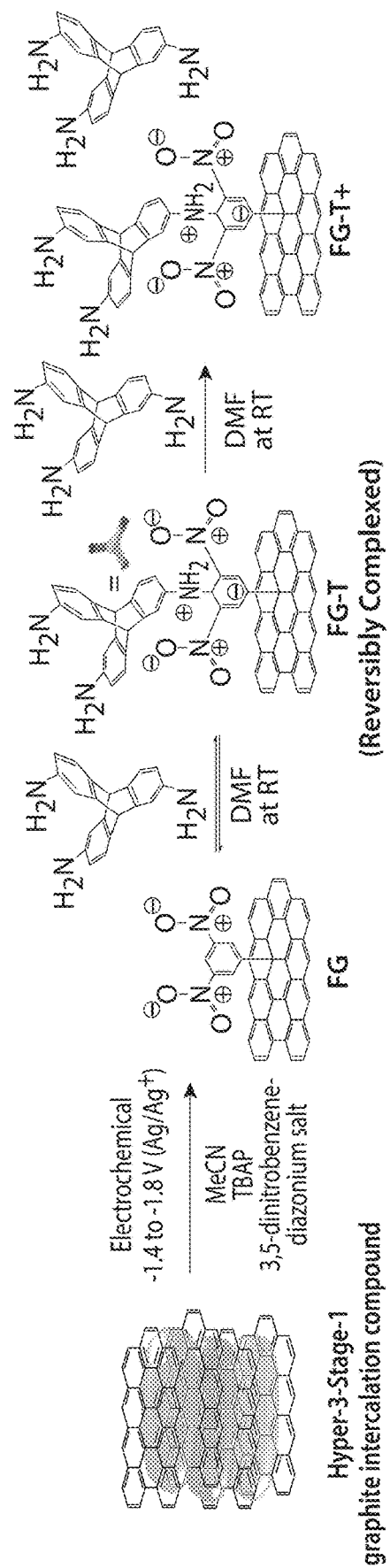
FIG. 18A is a schematic illustration of the synthesis and chemical structures of 3,5-dinitrophenyl functionalized graphene (FG), triaminotriptycene-functionalized graphene (FG-T), and excess triaminotriptycene-functionalized graphene (FG-T+), according to one set of embodiments.
Figure 22A:
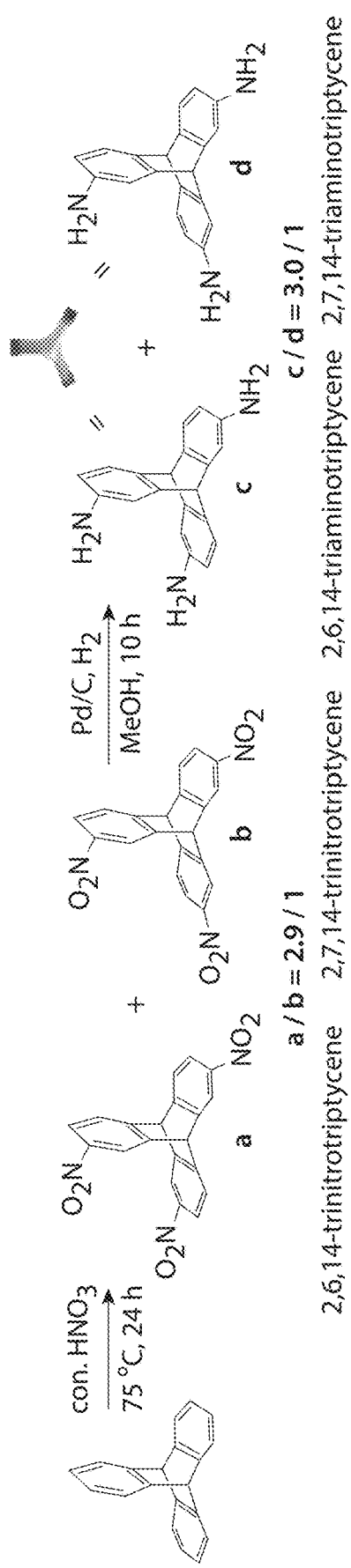
FIG. 22A is a schematic illustration of a synthesis of Triamnio-T, according to one set of embodiments.
Figure 22B:
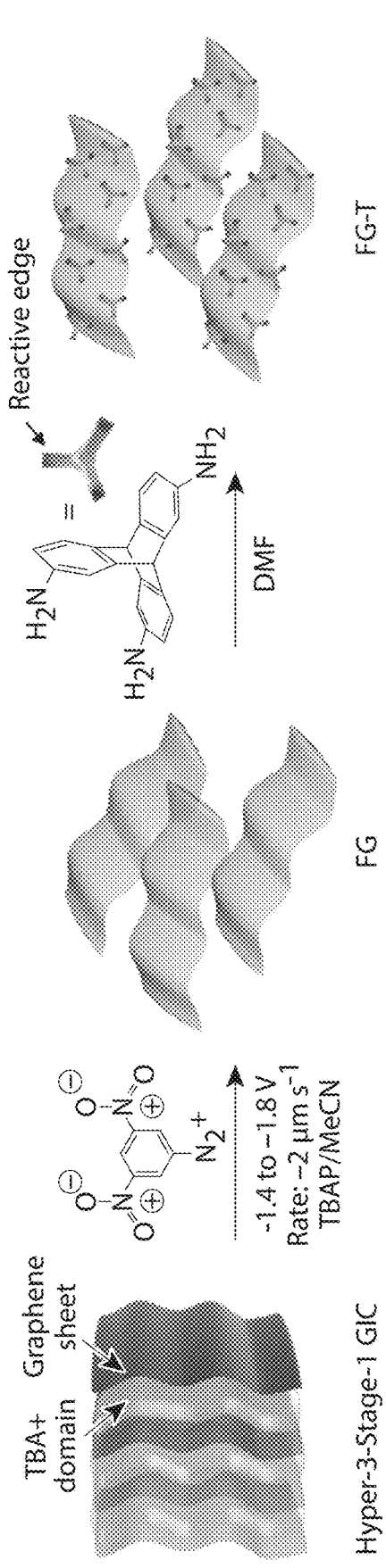
FIG. 22B is a schematic illustration of a synthesis of FG-T from Hyper-3-Stage-1 graphite intercalation compound (GIC), according to one set of embodiments.
Figure 22C:
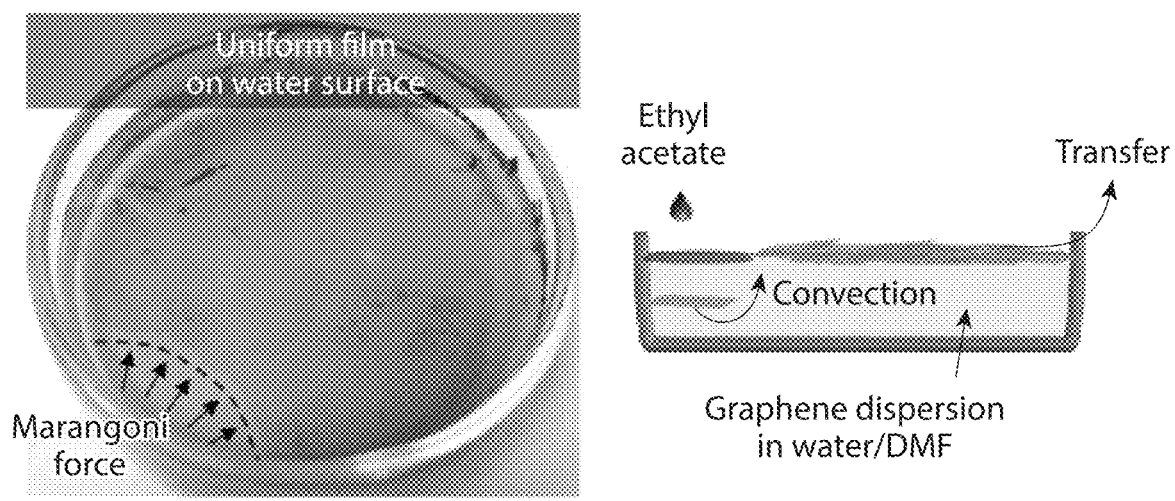
FIG. 22C is an optical micrograph (left) and a schematic illustration (right) of a graphene film on water surface, according to one set of embodiments.
Figure 23A:
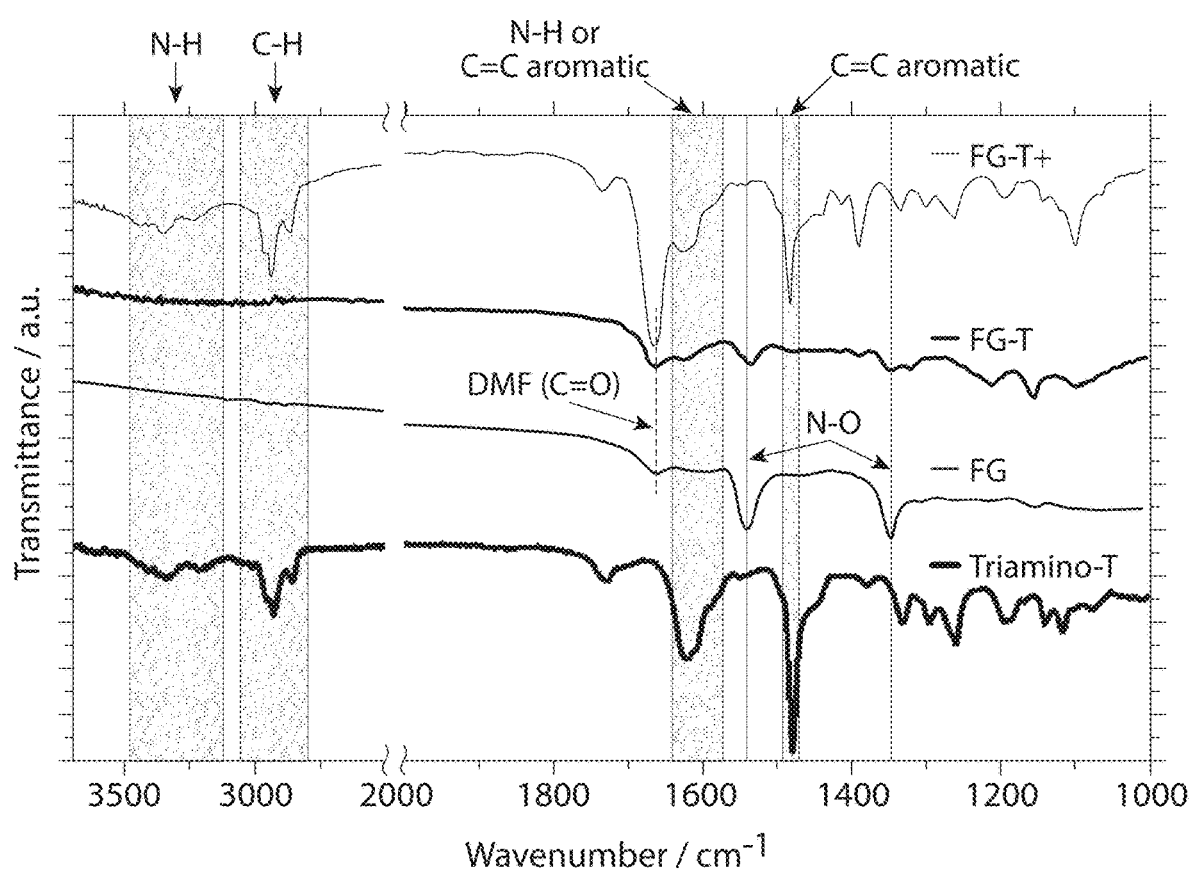
FIG. 23A is attenuated total reflectance Fourier transform infrared spectroscopy (ATR-FTIR) data of Triamino-T, FG, FG-T, and FG-T+, according to one set of embodiments.
Figure 23B:
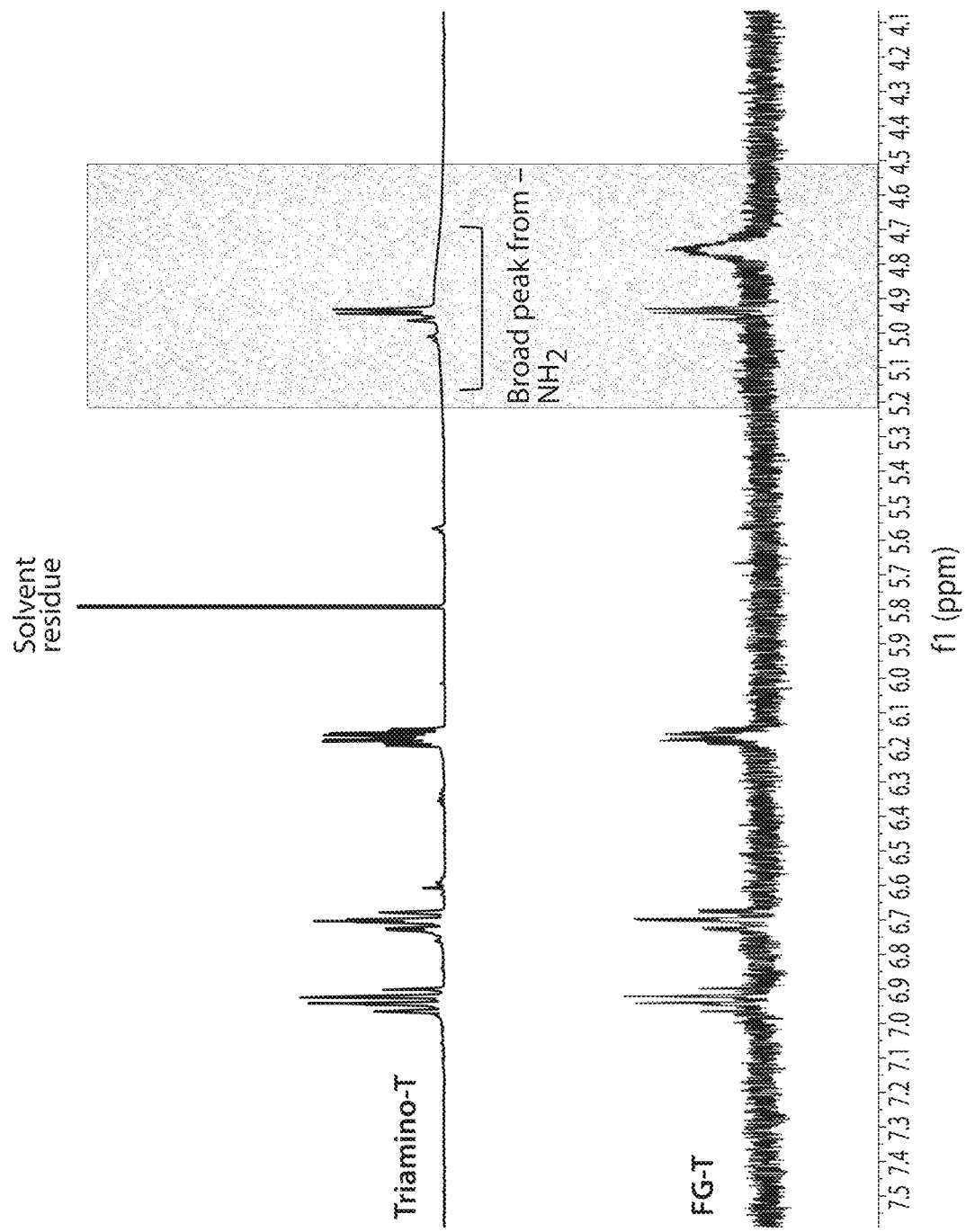
FIG. 23B is nuclear magnetic resonance spectroscopy (NMR) spectra of FG-T, and Triamino-T, according to one set of embodiments.
Figure 24:
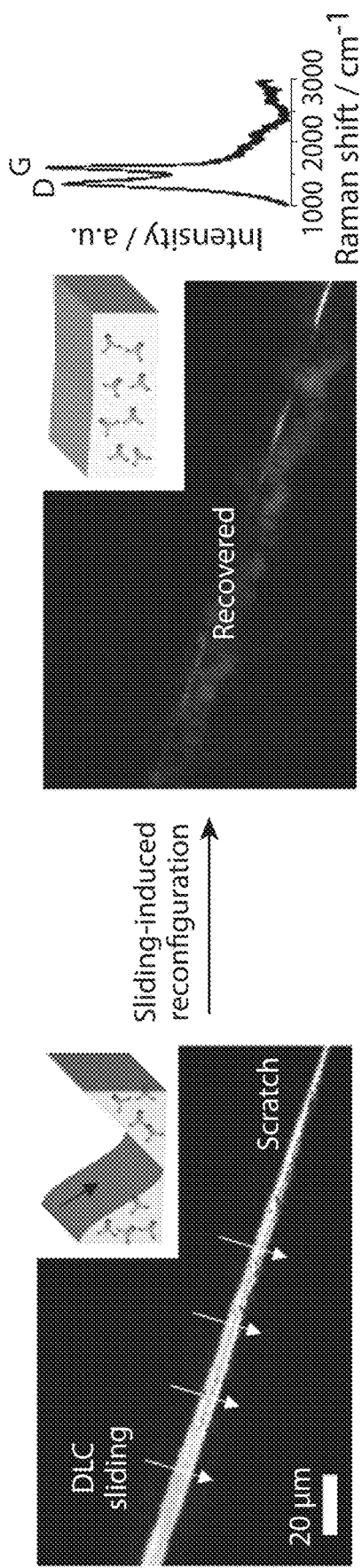
FIG. 24 is a micrograph of a scratched FG-T+ film before (left) and after (right) sliding, with corresponding inset schematic illustrations, according to one set of embodiments.
Figure 25:
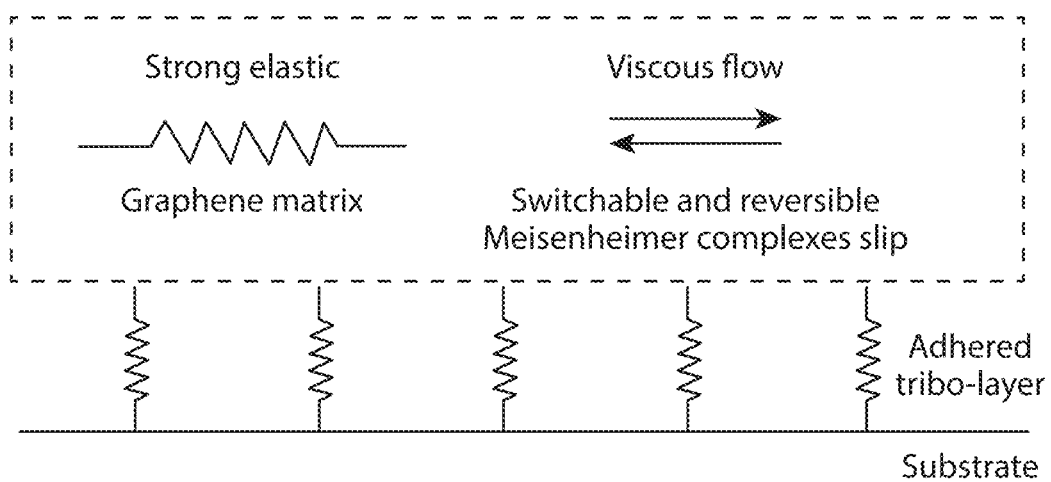
FIG. 25 is a schematic illustration of representative viscoelastic elements in a FG-T+ matrix, according to one set of embodiments.

The FG-T+ composition (FIG. 18A and FIG. 22) underwent reversible Meisenheimer complexation reactions that provided a reconfigurable interlocking component. Here the $NH_2$ groups of the Triamino-T could be bonded to up to three different 3,5-dinitrophenyl groups, and the stoichiometry of FG-T+ ensured residual reactive primary amines (FIG. 23). The FG-T+ film structure equilibrated through transient chemical configurations when mechanical energy (sliding motion) was applied to the material. The reversible reconfiguration of the films under sliding against a DLC-coated ball further enabled self-leveling (recoating) of damaged regions (FIG. 24). The final matrix contained a highly crosslinked FG-T network with 3D rigid triptycene interlocking units between graphene sheets bond in Meisenheimer complexes (FIG. 18A). It was postulated here that the FG-T+ film was segmented into viscous films on the top-surfaces, and a core connection to the substrate through the elastic graphene matrix (FIG. 25). These layers may have helped to induce viscous flow on top-surface and to guard against wear, thereby producing a quasi-hydrodynamic behavior with reduced friction.

(FIG. 23A) Attenuated total reflectance Fourier transform infrared spectroscopy (ATR-FTIR) data of Triamino-T, FG, FG-T, and FG-T+. (FIG. 23B) Nuclear magnetic resonance spectroscopy (NMR) spectra of FG-T, and Triamino-T. FG-T (major): $^1$H NMR (400 MHz, DMF-d7): δ 6.96-6.90 (m, 3H), 6.72-6.67 (m, 3H), 6.19-6.14 (m, 3H), 4.91 (s, 1H), 4.93 (s, 1H), 4.76 (br.s, 6H).

FIG. 24 depicts mechanical sliding-induced reconfiguration of a scratched FG-T+ film: The reversible Meisenheimer complexes across the cracked film were cured under mechanical shear force. Inset: Schematic illustration showing the formation of a tribo-layer against a DLC-coated SS ball. Raman signature of FG-T+ from the recovered region.

FIG. 25 depicts representative viscoelastic elements in a FG-T+ matrix: a strong elastic spring from a graphene matrix and a dashpot with reversible Meisenheimer complexes with Triamino-T.

Figure 18B:
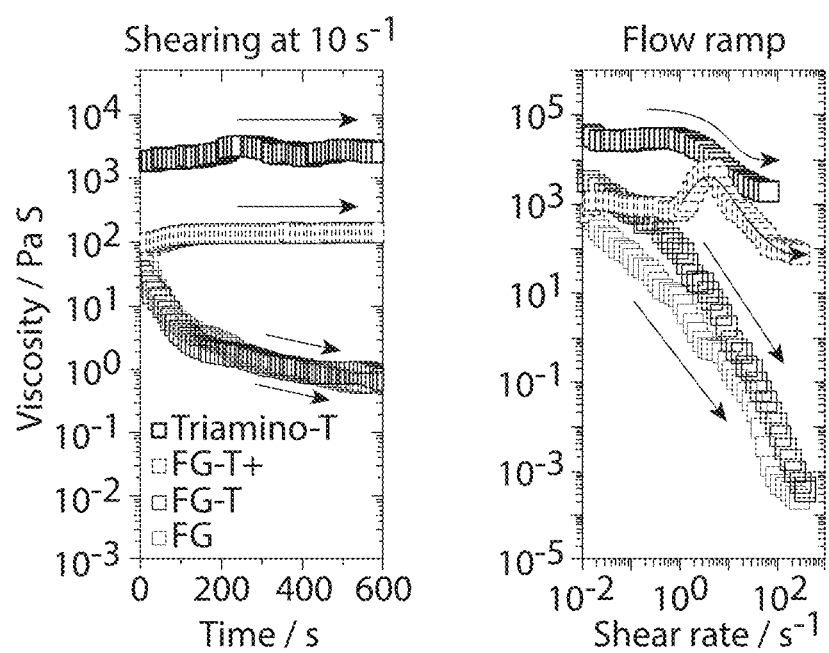
FIG. 18B is plots of viscosity vs. time (left) or shear rate (right) for FG (bottom), FG-T (second-from-bottom), triaminotriptycene (Triamino-T, top), and FG-T+(second-from-top), according to one set of embodiments.

The solid 3,5-dinitrophenyl functionalized graphene (FG) film showed transient shear thinning behavior (FIG. 18B). Conversely, dynamic linkages of FG-T+ led to Newtonian fluid-like behavior, perhaps promoted by the equilibrating Meisenheimer complexation and the associated changes in graphene structure (FIG. 18B). The addition of excess Triamino-T lowered the viscosity from the beginning shear rate of 5.0 s$^{-1}$, and this behavior for the FG-T+ films was consistent with energy dissipation as a result of dynamic rearrangement of the Meisenheimer complexes (FIG. 18B).

Figure 18C:
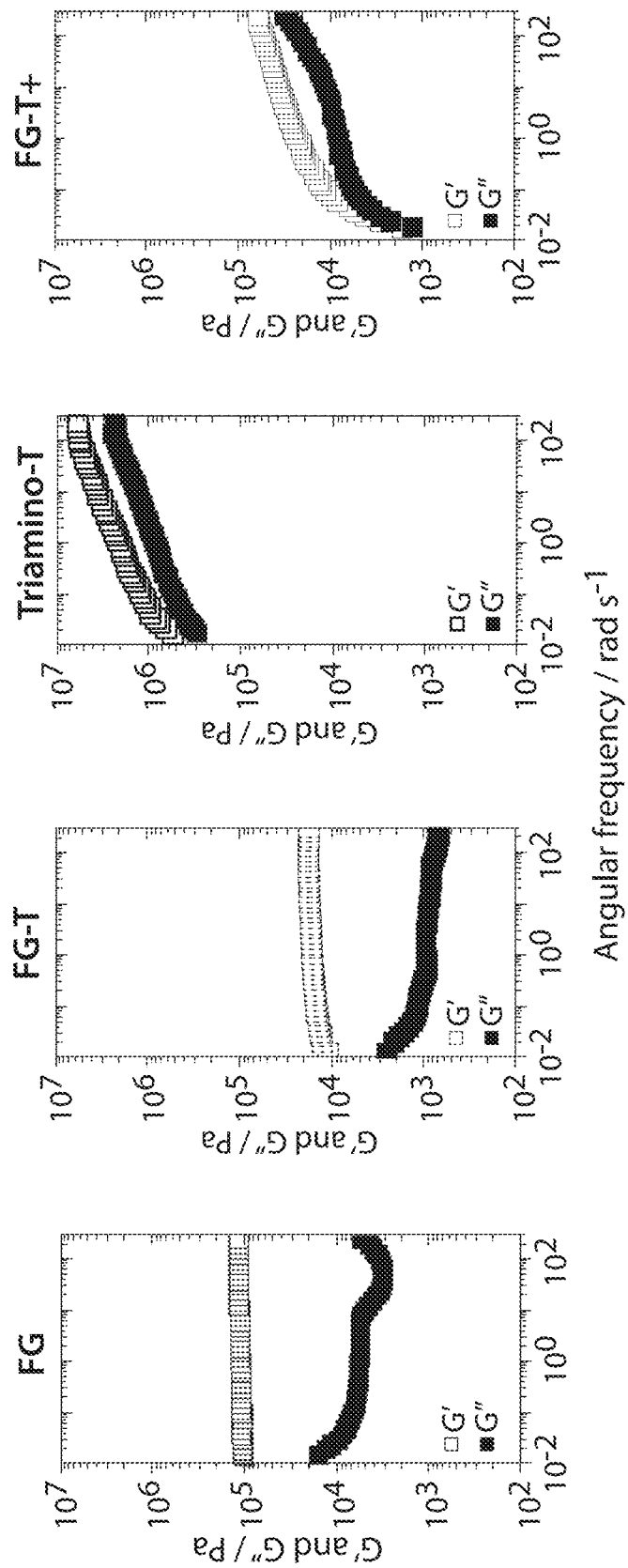
FIG. 18C is plots of storage (G') and loss (G") moduli versus angular frequency (w) for FG, FG-T, Triamino-T, and FG-T+, according to one set of embodiments.

To further probe viscoelastic properties of these reversible and reconfigurable complexes, this study determined the storage modulus (G') and loss modulus (G") at different frequencies of oscillating strain. FG showed a predominant elastic response over the entire frequency range, whereas the viscoelastic behavior of FG-T+ showed continuous changes over the frequency spectrum investigated (FIG. 18C). In case of FG, it was noted that the decrease in the loss modulus at 7 rad s$^{-1}$ was consistent with chemical degradation, wherein continuous shearing induced mechanochemical reactions on graphene. Subsequent mechanochemical damage or physical removal of material resulted in further change to the loss modulus contribution during shearing (vide infra). The gradual increases in the viscoelastic response of the FG-T+ film were consistent with the proposed chemical/structural evolution that occurred without chemical degradation. In total the rheological results were self-consistent with reversible Meisenheimer complex formation between the triptycenes and graphene to give a fluid-like matrix for reducing frictional behavior. These mechanical dynamics offer insights into the kinetics of the reconfigurable bonding in functional graphenes.

FIGS. 18A-18C depicts data including that for fluid-like reconfigurable graphene. (FIG. 18A) Synthesis and chemical structures of FG, FG-T, and FG-T+. FG-T was synthesized via Meisenheimer complexes reaction with Triamino-T. FG-T+ contained the additional concentration of Triamino-T such that there were free amine groups that were not covalently linked to the graphene. MeCN: acetonitrile, TBAP: tetrabutylammonium perchlorate and DMF: dimethylformamide. (FIG. 18B) Time-dependent viscoelastic behaviors of FG, FG-T, Triamino-T, and FG-T+: Shearing at the shear rate of 10 s$^{-1}$ for 10 mins. The FG and FG-T continuously decreased in viscosity with increased shear rate. The viscosity-shear strain rate curves: Triamino-T (top arrow) showed shear thinning behaviors. After reconfiguration (second-from-top arrow), the FG-T+ stabilized and approached a Newtonian behavior because the graphene matrix with triptycenes could rearrange to accommodate stress. (FIG. 18C) Linear viscoelastic behavior: Change in storage (G') and loss (G") moduli versus angular frequency (w) with the strain of γ=0.5% for FG, FG-T, FG-T+ and Triamino-T, demonstrating the reconfigurable viscoelastic mechanism of the FG-T+ matrix.

(FIG. 22A) Synthesis of Triamnio-T and (FIG. 22B) the FG-T from Hyper-3-Stage-1 graphite intercalation compound (GIC). The Hyper-3-Stage-1 GIC represents the expanded gallery with intercalated tetrabutylammonium ion (TBA+) domains between the basal planes of graphenes (TBAP=tetrabutylammonium perchlorate. (FIG. 22C) The optical micrograph of a graphene film on water surface. The graphene assembly on water surface is driven by Rayleigh-Bénard convection and Marangoni force.

Figures 3B, 3C, 3D:
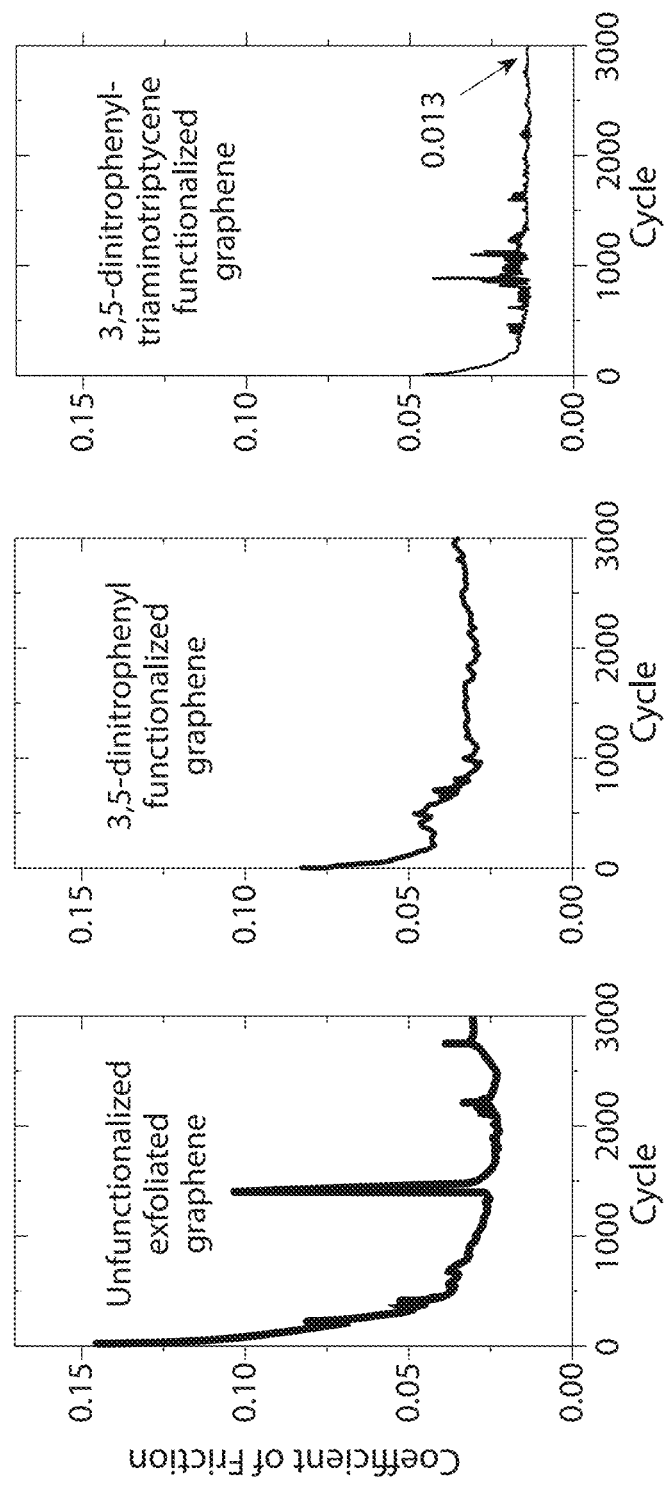
FIG. 3B is a plot of the COF for a DLC ball sliding against an unfunctionalized exfoliated graphene film on a stainless steel (SS) substrate in a $N_2$ environment, according to one set of embodiments.
FIG. 3C is a plot of the COF for a DLC ball sliding against a 3,5-dinitrophenyl functionalized graphene film on a stainless steel (SS) substrate in a $N_2$ environment, according to one set of embodiments.
FIG. 3D is a plot of the COF for a DLC ball sliding against a 3,5-dinitrophenyl-triaminotriptycene functionalized graphene film on a stainless steel (SS) substrate in a $N_2$ environment, according to one set of embodiments.
Figure 19A:
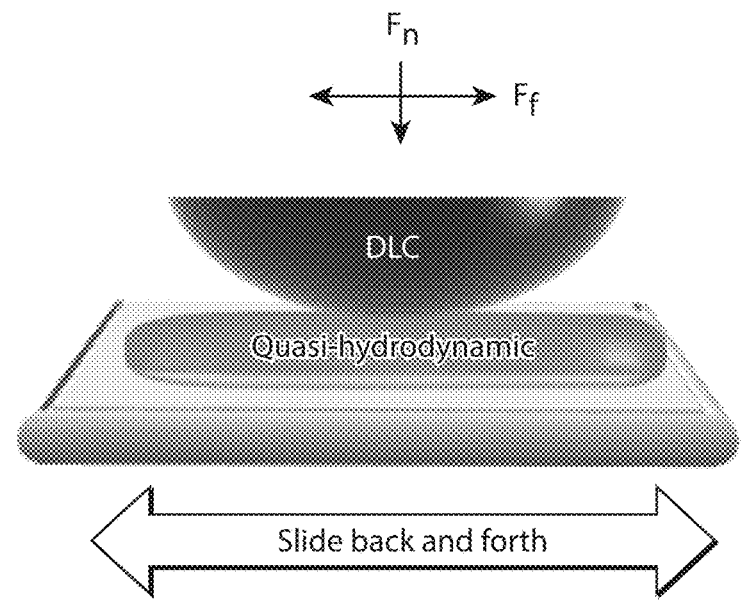
FIG. 19A is a schematic illustration of the geometry of a linear tribometer equipped with a DLC-coated stainless steel ball, according to one set of embodiments.
Figure 19B:
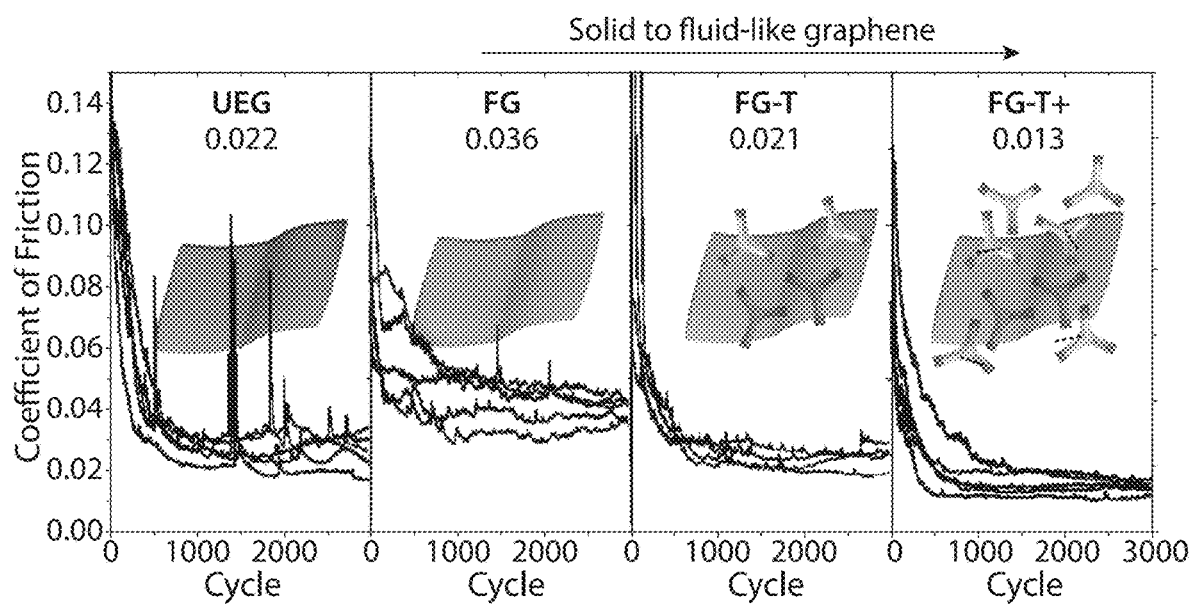
FIG. 19B is plots of the COF vs. cycle number for a DLC ball sliding against unfunctionalized exfoliated graphene (UEG), FG, FG-T, and FG-T+, according to one set of embodiments.
Figure 26:
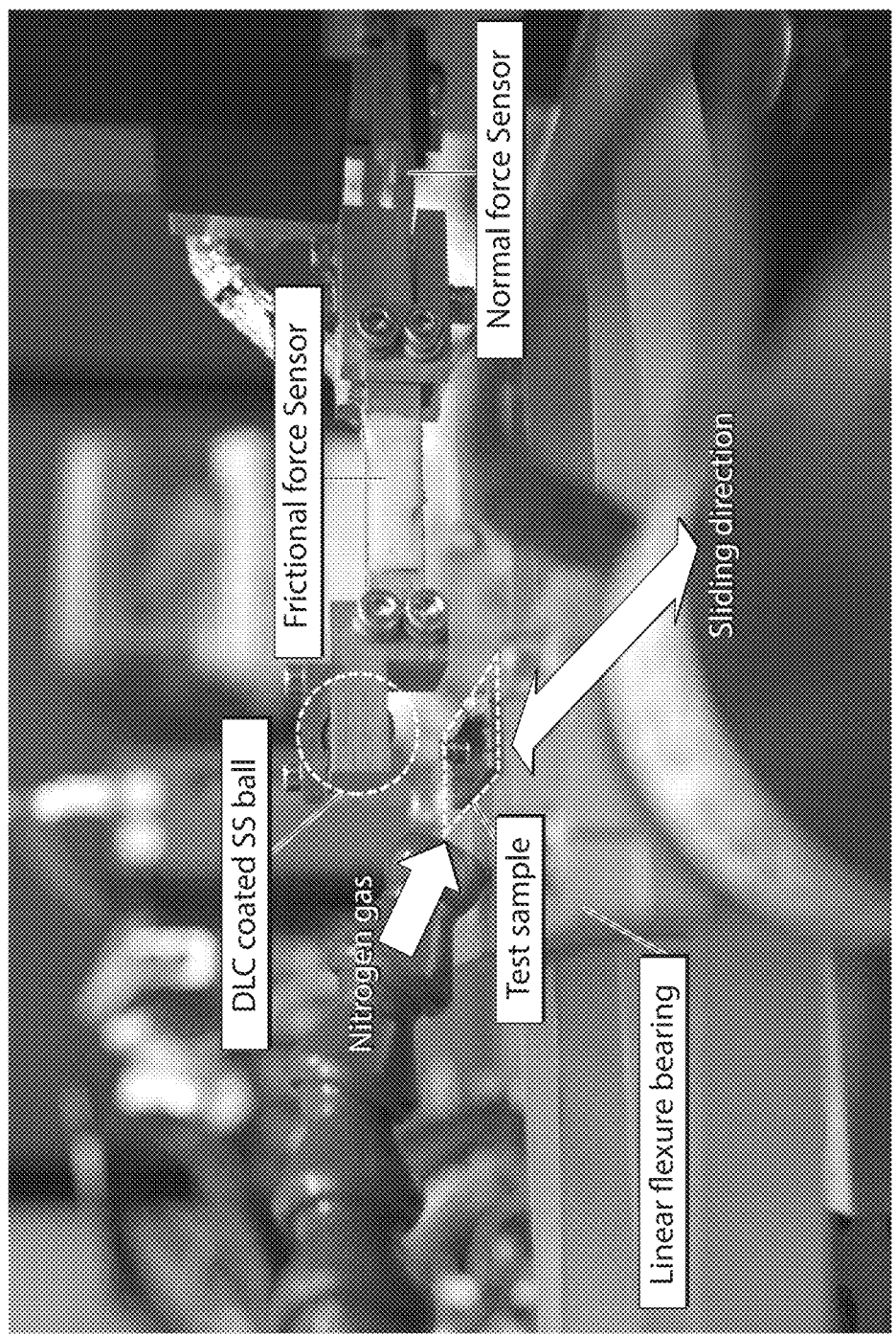
FIG. 26 is a photograph of a linear tribometer equipped with a DLC-coated stainless steel (SS) ball, according to one set of embodiments.
Figure 28A:
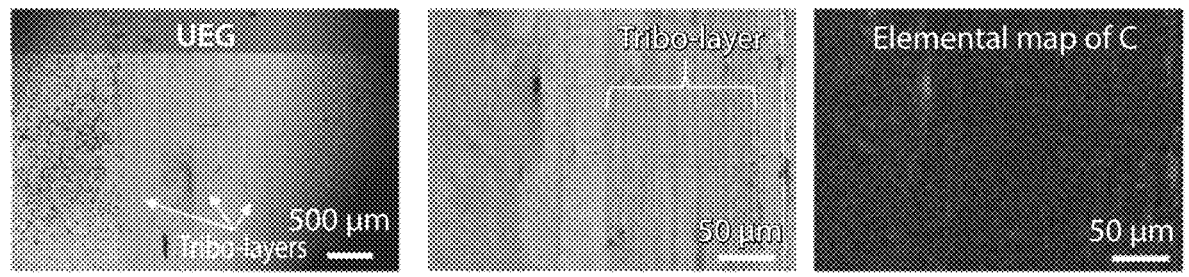
FIG. 28A is scanning electron microscope (SEM) images (left and center) with the corresponding energy dispersive X-ray spectroscopy (EDS) carbon mapping (right) of UEG after sliding, according to one set of embodiments.
Figure 28B:
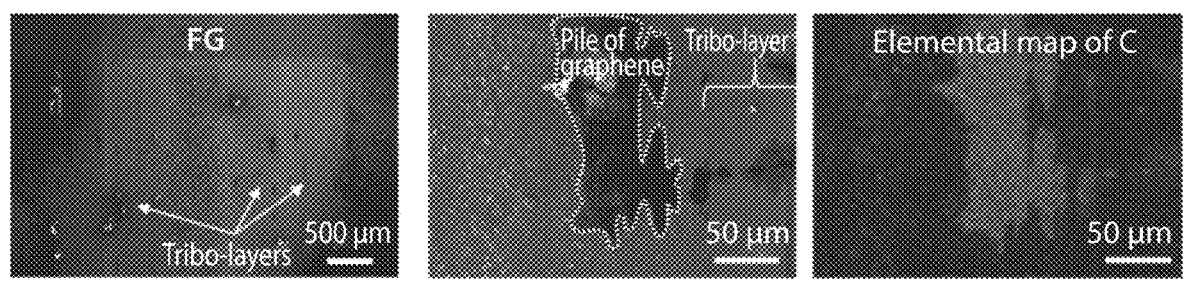
FIG. 28B is scanning electron microscope (SEM) images (left and center) with the corresponding energy dispersive X-ray spectroscopy (EDS) carbon mapping (right) of FG after sliding, according to one set of embodiments.
Figure 28C:
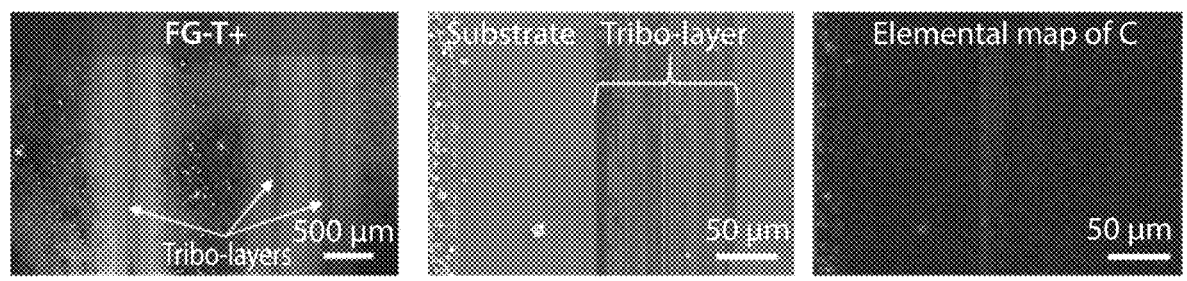
FIG. 28C is scanning electron microscope (SEM) images (left and center) with the corresponding energy dispersive X-ray spectroscopy (EDS) carbon mapping (right) of FG-T+ after sliding, according to one set of embodiments.
Figure 29A:
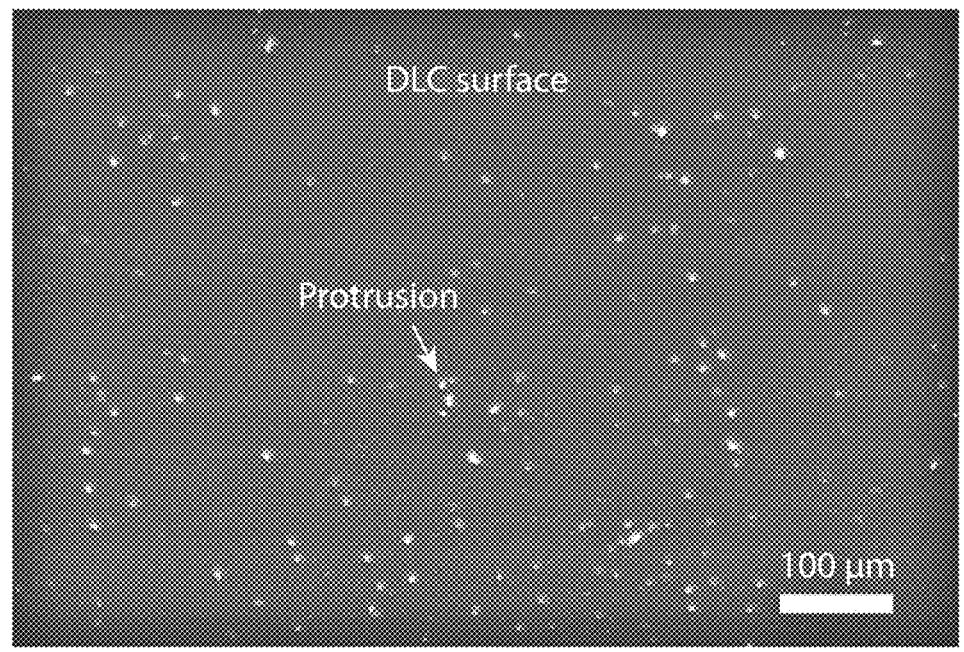
FIG. 29A is a SEM image of the surface of a diamond-like-carbon (DLC)-coated ball, according to one set of embodiments.
Figure 29B:
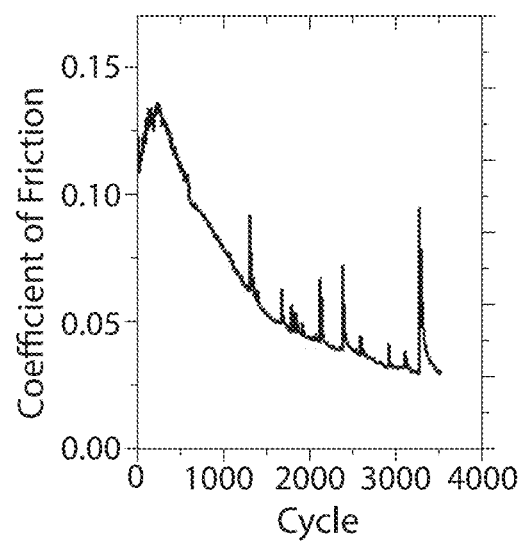
FIG. 29B is a plot of COF vs. cycle number for a DLC-coated ball sliding against UEG, according to one set of embodiments.

Friction tests were conducted by coating stainless steel (SS) with the different graphenes and sliding a diamond like carbon (DLC) coated SS ball, using a custom-built linear macro-tribometer (FIG. 19A and FIG. 26). To quantify COF (µ=F$_f$/F$_n$) the DLC ball slid back and forth (linear velocity: 16 mm s$^{-1}$) repeatedly along a horizontal line on a film, while simultaneously measuring fictional force (F$_f$) and normal force (F$_e$). Tribo-layers were observed in the period of sliding, in which the initial COF slowly decreased over multiple cycles (FIG. 3). Initially, the COF of unfunctionalized exfoliated low defect graphene (UEG) was ~0.021 or 0.022 (FIG. 19B), a value comparable to previously reported graphenes or graphene oxides (GOs), thereby confirming the system's performance (FIG. 27) and indicating that this method produced low frictional graphene sheets on a SS substrate. Although it was observed that the unfunctionalized exfoliated graphene (UEG), produced by DMF dispersion of Hyper-3-Stage-1 graphite intercalation compound (GIC), formed a low frictional tribo-layer, the long-term stability of the exfoliated graphene tribo-layer on the SS substrate was not satisfactory. To create a stable layer, the coating materials were improved to remain strongly associated with the surface during mechanical movement (FIGS. 28A-28C). There were tribological advantages to the coating materials remaining strongly associated with the surface without material losses during mechanical movement. In case of unfunctionalized exfoliated graphene coatings on the SS substrate, a large spike in the COF~0.1 appeared at around 1500 cycles, indicating removal of graphene tribo-layer as a result of weak adhesion to the substrate (FIG. 3B, FIG. 19A). Spikes may appear at random in these types of measurements, but the frequency and magnitude are dependent on how well graphenes are adhering to the SS surface. These spikes appear at random intervals, are frequency and magnitude dependent, and are a signature of insufficient adhesion to the SS surface (FIGS. 29A-29B). The high contact pressure along with linear motion induced a natural gradual loss of graphene coverage from the metallic substrates in macroscopic friction tests. This instability of the graphene tribo-layer and a high mechanical pressure could cause detrimental transformations on contacting objects over very short periods. These mechanical challenges are a reason that typical multilayer graphene systems, which are nominally expected to have the low frictional properties, fail to provide stable superlubricity. This process presents challenges in utilizing multilayer graphene systems, which are expected to have the lowest frictional properties. Similarly, graphene films on SiO$_2$ surfaces display a substantial amount of variance in the COF in sliding experiments against a DLC ball. This erratic nature of COF of pristine graphene coatings at macroscale levels may limit the operational lifespan of mechanical components and/or require frequent reapplication of the lubricant. Covalently functionalized graphene that has enhanced interactions with the contacting materials can therefore be used to increase the stability by forming a more stable graphene tribo-film (also referred to herein as a tribo-layer) (FIG. 19B, FIG. 3C). However, the high COF of the functionalized graphene is also attributed to the functional groups producing adhesive interactions between contacting materials. Consistent with previous AFM friction measurements on fluorinated graphene, functionalized graphene monolayers exhibited higher friction forces than pristine graphene. In short, without wishing to be bound by theory, the friction likely originated from basal plane functional groups that increased van der Waals interactions. To overcome these seemingly intrinsic limitations associated with functionalized graphene, this study targeted creating nanostructures to realize stable superlubricity (FIG. 3D). The less erratic COF trace for these functionalized graphenes indicated the formation of the stable tribo-layer.

FIG. 26 depicts an experimental demonstration and coefficient of friction (COF) results of graphene films. An image of the linear tribometer equipped with a DLC-coated SS ball. Tests were performed at room temperature (RT) under 3 N load (contact pressure: 0.3~0.4 GPa). Each sample was tested more than three times in order to ensure reliability.

(FIG. 28A) Scanning electron microscope (SEM) images with the corresponding energy dispersive X-ray spectroscopy (EDS) carbon mapping of UEG, (FIG. 28B) FG, and (FIG. 28C) FG-T+ after sliding.

(FIG. 29A) A SEM image of the surface of diamond-like-carbon (DLC)-coated ball. The sliding motions with the rough surface at contact edges caused the damages of coated materials. (FIG. 29B) The COF for DLC-coated ball sliding against UEG. Due to the unstable tribo-layer formation on the SS substrate, the COF increased at the beginning of sliding and many huge COF spikes appeared. Similarly, graphene films on $SiO_2$ surfaces displayed a substantial amount of variance in the COF in sliding experiments against a DLC ball. This erratic nature of COF of pristine graphene coatings at macroscale levels may limit the operational lifespan of mechanical components and/or require frequent reapplication of the lubricant.

Figure 19C:
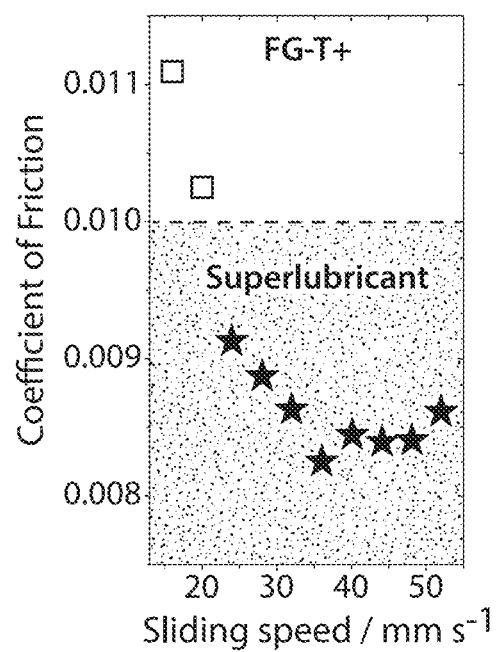
FIG. 19C is a plot of COF vs. sliding speed for FG-T+, according to one set of embodiments.
Figure 19D:
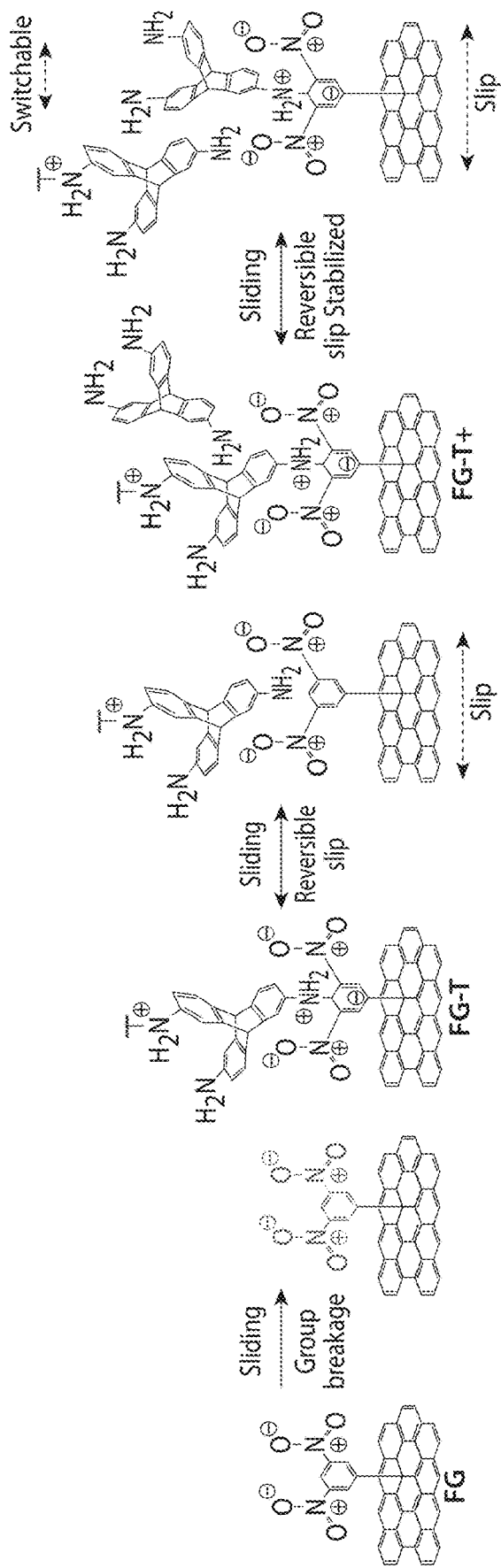
FIG. 19D is a schematic illustration of a proposed dynamic model of reversible Meisenheimer complexation of graphene with Triamino-Ts to create reconfigurable networks, according to one set of embodiments.
Figure 30A:
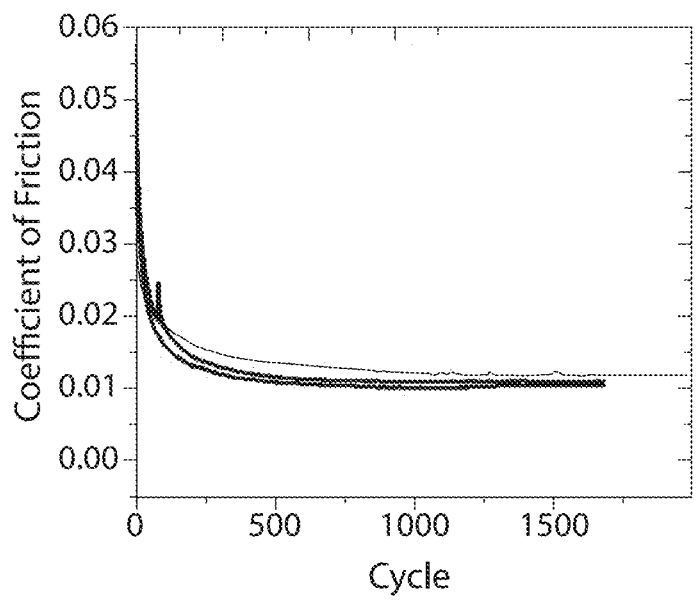
FIG. 30A is a plot of COF vs. cycle number for UEG-nanodiamond (5 nm in diameter) scrolls, according to one set of embodiments.
Figure 30B:
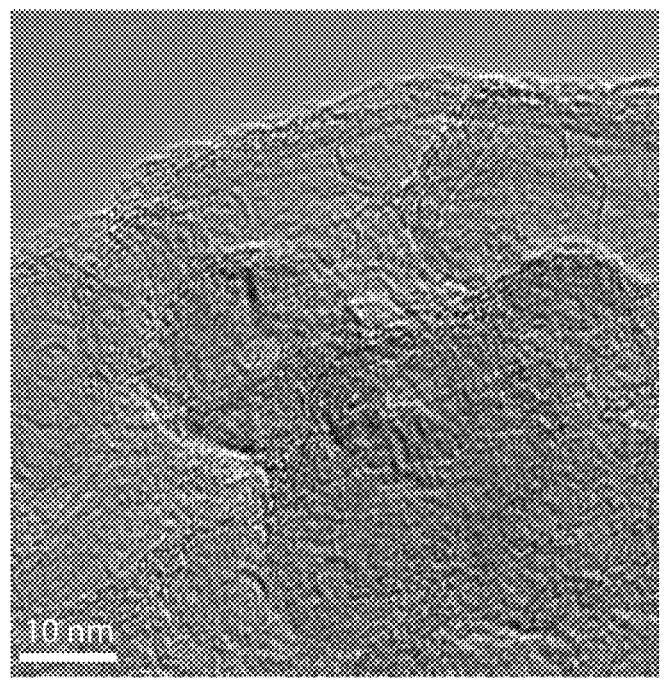
FIG. 30B is a transmission electron microscopy (TEM) image of UEG-nanodiamond scrolls, according to one set of embodiments.

The FG-T matrix dissipated applied stress through reversible chemical bonding events with Triamino-T. This study observed the further reduction in COFs with FG-T+, which produced a superlubric state (FIG. 19B and FIG. 19C) comparable to UEG-nanodiamond scrolls (FIGS. 30A-30B). The friction coefficient of FG-T+ stabilized at 0.011 at 16 mm s$^{-1}$ and dropped to 0.008 at 36 mm s$^{-1}$ (FIG. 19C). This result was attributed to the reconfiguration of the stable graphene matrix, wherein the molecular crosslinker connected graphene surfaces and stabilized bilayers and/or folded structures to create dynamic "nano-bearings" with mechanical stiffness and stability (FIG. 19D). This process gave a dense stable tribo-layer with liquid-like properties that allowed for self-leveling of surfaces to counteract the continuous mechanical removal caused by the sliding.

FIGS. 19A-19D illustrate COF and results for graphene films. (FIG. 19A) Schematic illustration showing the geometry of a linear tribometer equipped with a DLC-coated stainless steel ball. (FIG. 19B) The COF for a DLC ball sliding at 16 mm s$^{-1}$ and a contact pressure of 0.3~0.4 GPa, against UEG (COF~0.022±0.003), FG (COF~0.036±0.005), FG-T (COF~0.021±0.002) and FG-T+(COF~0.013±0.002) films on a SS substrate in $N_2$ environment (relative humidity: ~3%). Friction experiments were repeated four or more times for each sample (one cycle=two linear-sliding motions). (FIG. 19C) The FG-T+ friction with increasing sliding speed tests from 16 mm s$^{-1}$ to 52 mm s$^{-1}$ with ≈0.008 above a 36 mm s$^{-1}$ sliding speed in the quasi-hydrodynamic lubrication regime. (FIG. 19D) The proposed dynamic model of reversible Meisenheimer complexation of graphene with Triamino-Ts to create reconfigurable networks "bearing" behavior.

(FIG. 30A) The COF of UEG-nanodiamond (5 nm in diameter) scrolls in the present system. The average of COF was 0.011 that is comparable to the literature. (FIG. 30B) A transmission electron microscopy (TEM) image of UEG-nanodiamond scrolls.

Figure 20A:
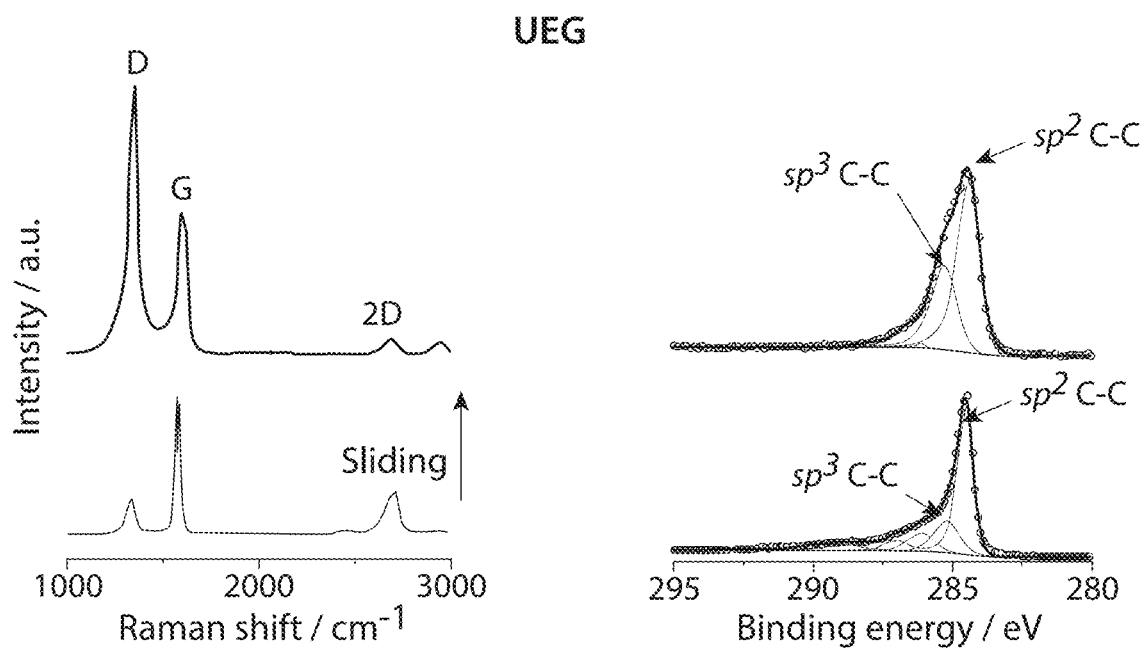
FIG. 20A is Raman (left) and XPS (right) spectra of UEG, according to one set of embodiments.
Figure 20B:
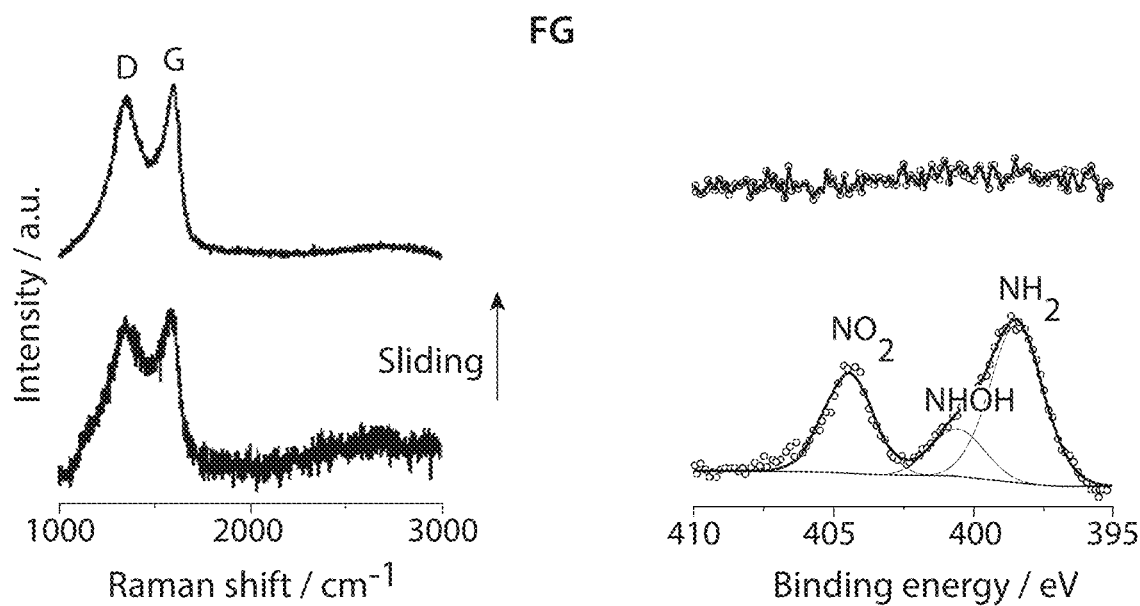
FIG. 20B is Raman (left) and XPS (right) spectra of FG, according to one set of embodiments.

To gain insight on the tribochemical reactions and how FG-T and FG-T+ promoted stable superlubric states, Raman and XPS analyses were conducted on the as-deposited materials and the mechanically produced tribo-layers (FIG. 20A). In general, graphenes slipped by each other and then evolved into graphene tribo-layers with the reduced COF against the DLC-coated ball. The final state of graphene on a SS substrate after sliding could have produced changes in the Raman 2D and D-bands, which were quantified by the D-band to the G-band ratio, $I_D/I_G$. An increasing $I_D/I_G$ indicated the introduction of defects in the graphene layers (FIG. 20A), and this was readily apparent for UEG. In addition, the G-band (1591 cm$^{-1}$) for the lubricated graphene shifted after sliding, compared with that of pristine graphene (1580 cm$^{-1}$), which also indicated changes in chemical or physical state. This was expected as the G-band was sensitive to strain within the graphene sheets. Additionally, XPS analysis revealed increases in the relative ratios of sp$^3$ C—C (285.5 eV) to sp$^2$ C—C peaks (284.5 eV), which were also an indication of mechanically induced chemistry (FIG. 20A).

FG initially had a high density of pendant groups (Raman $I_D/I_G$ ratio~0.93 in FIG. 20B) with a stronger interaction with the DLC surface and a higher frictional resistance toward sliding. The nitrogen-containing functional groups were removed with sliding (FIG. 20B) and the XPS N is signals associated with functional groups on the surface of graphene were not detectable after sliding. However, the XPS signals associated with sp$^3$ carbons (285.5 eV) and the Raman $I_D/I_G$ remained high (FIG. 20B and FIGS. 31A-31D). The fate of removed nitrogen containing functional groups and the nature of the sp$^3$ Cs are not known, however mechanochemical reactions are expected under the applied load.

FIGS. 31A-31D depicts optical images and high resolution X-ray photoelectron spectroscopy (XPS) C is spectra of (FIG. 31A) UEG (FIG. 31B) FG (FIG. 31C) FG-T, and (FIG. 31D) FG-T+ after sliding cycles.

Figure 20C:
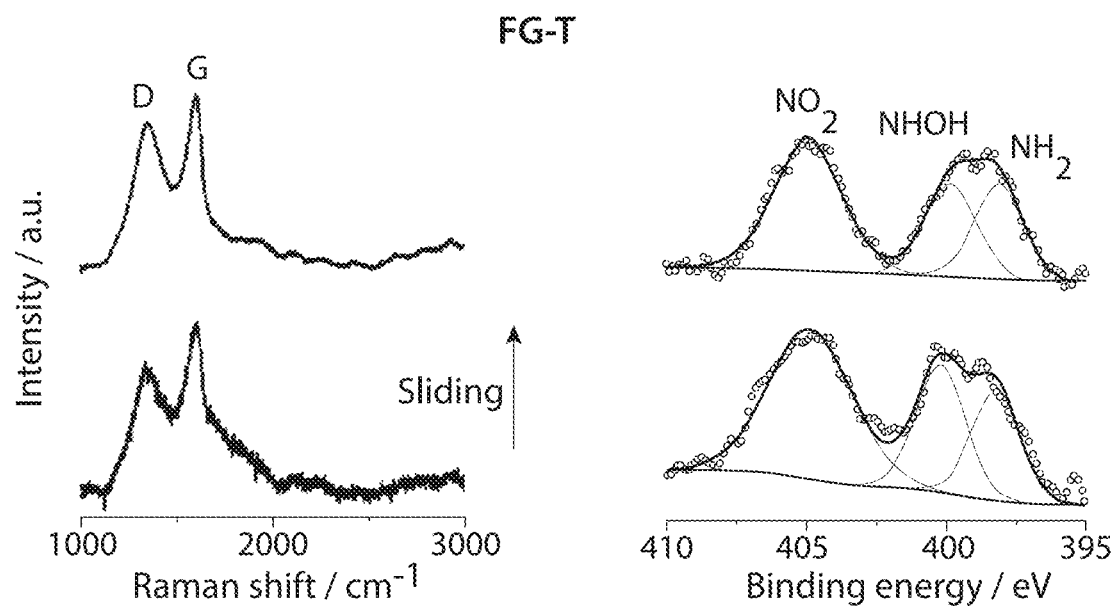
FIG. 20C is Raman (left) and XPS (right) spectra of FG-T, according to one set of embodiments.
Figure 20D:
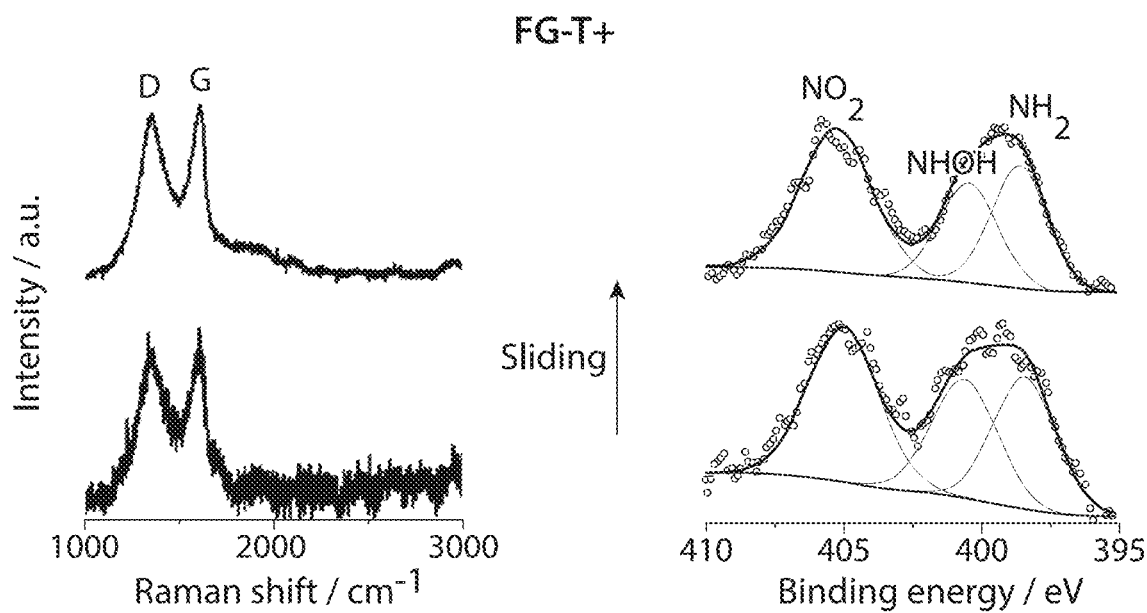
FIG. 20D is Raman (left) and XPS (right) spectra of FG-T+, according to one set of embodiments.
Figure 20E:
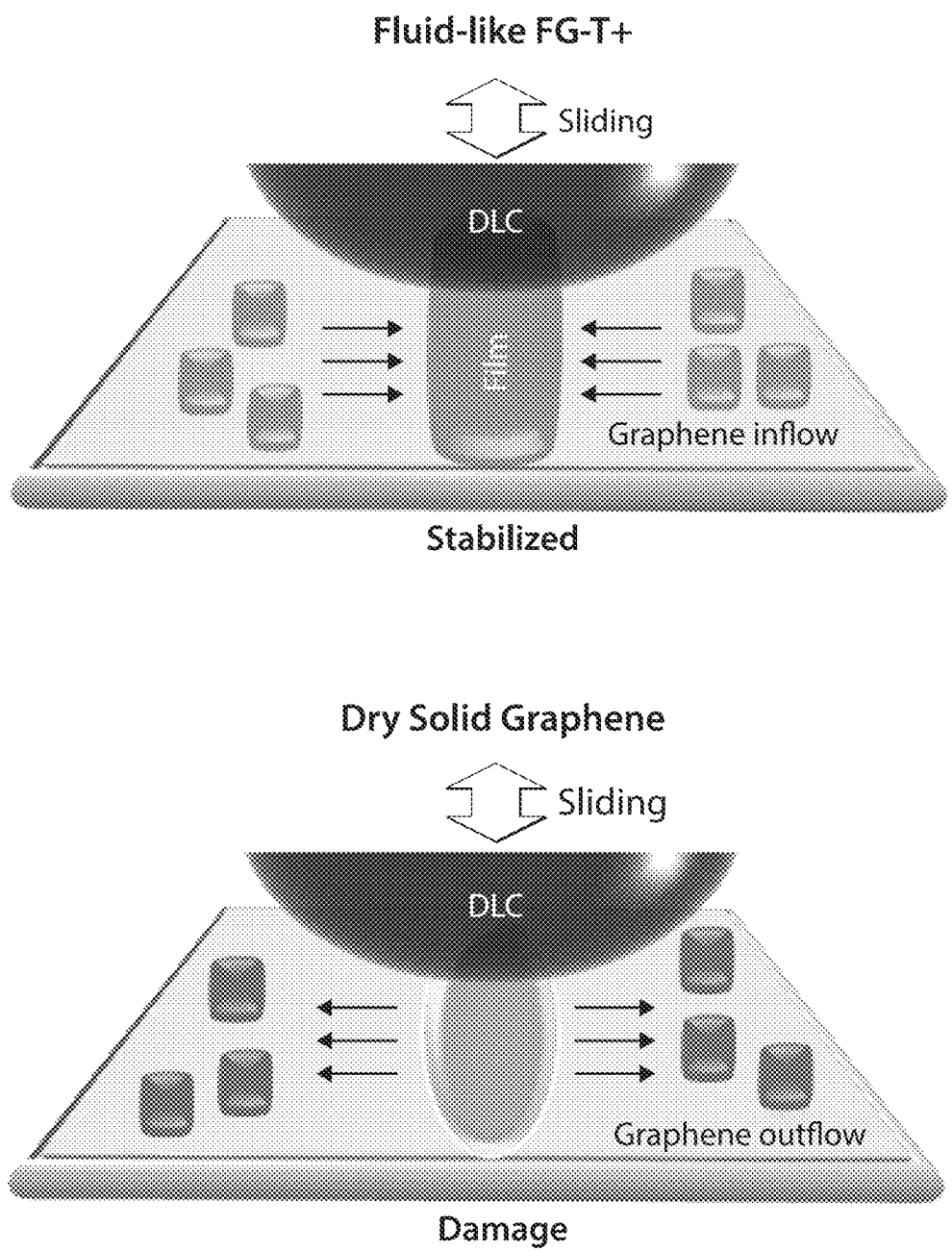
FIG. 20E is a schematic diagram of sliding DLC on FG-T+(left) and dry solid graphene (right), according to one set of embodiments.

The addition of the triptycene stabilized the 3,5-dinitrophenyl groups on the graphene and in contrast to FG the XPS N is signals associated with the 3,5-dinitrophenyl functional groups of FG-T and FG-T+ were retained after sliding (FIG. 20C and FIG. 20D). Although it was a challenge to experimentally probe the precise physical and chemical interior states of the graphene matrix, it would appear that FG-T+ was stabilized by the dynamic covalent chemically interlocking reactions within the material (FIG. 20E and FIG. 31D).

FIGS. 20A-20E depicts mechanically induced chemical transitions of graphene films. Raman and XPS spectra of (FIG. 20A) UEG, (FIG. 20B) FG, (FIG. 20C) FG-T, and (FIG. 20D) FG-T+ before and after sliding cycles that detail characteristic changes. (FIG. 20E) Left: The tribo-layer of fluid-like FG-T+ is stabilized during sliding motion due to the influx of FG-T+ into contacting edges and self-leveling. Right: The solid-like FG and UEG undergo tribo-chemically damage as evidenced by changes in their spectral properties.

Tribo-layers were produced after sliding tests as shown in FIGS. 21A-21E. Scanning electron microscope (SEM)

images (FIG. 21A and FIGS. 28A-28C) revealed that with frictional testing the graphene was partially removed and reconfigured. The formation of a stable surface-bonded tribo-layer at a contacting surface reduced wear by minimizing contact of material pairs. This lubricant with its quasi-hydrodynamic nature, was initially in a form that can be characterized as crumpled graphene nanoballs. The mechanical sliding under load then led to a coalescence of particles to produce continuous solid lubricant films. The very rigid framework within these films resulted from the interlinking of graphenes by Meisenheimer complexation.

Figure 21A:
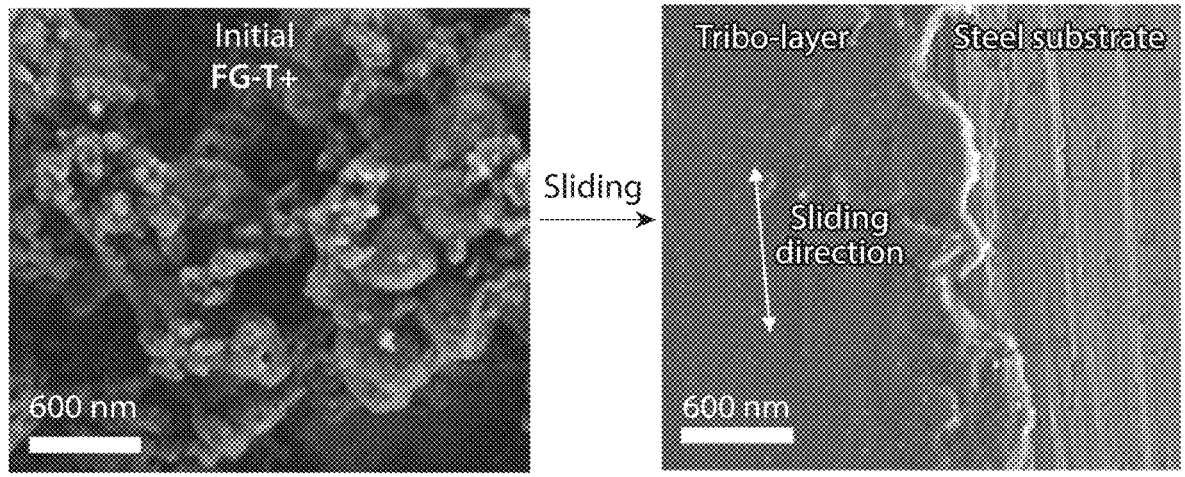
FIG. 21A is an SEM image of as-prepared FG-T+ before sliding (left) and an SEM image of the tribo-layer after sliding (right), according to one set of embodiments.
Figure 21B:
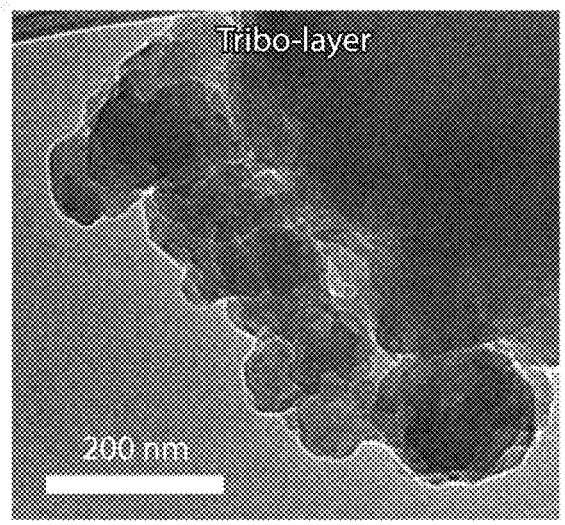
FIG. 21B is a TEM image of the tribo-layer of FG-T+, according to one set of embodiments.
Figure 21C:
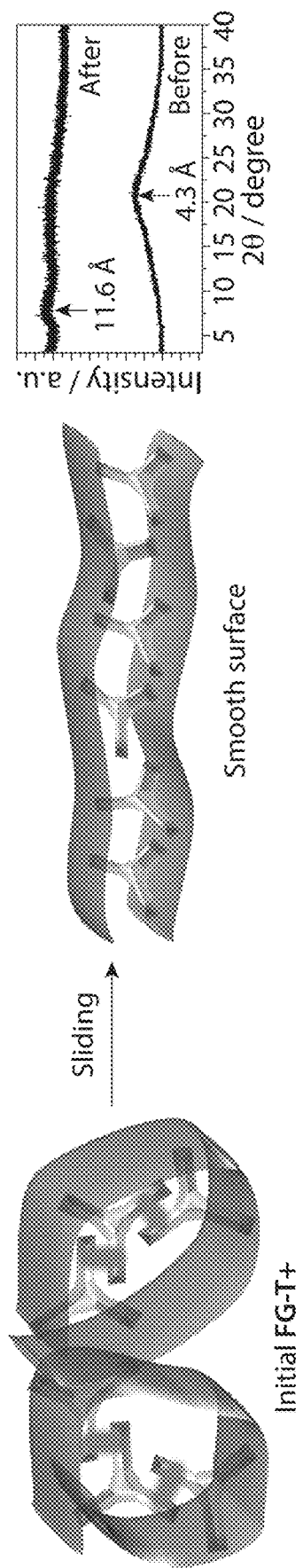
FIG. 21C is (left) a schematic illustration of as-prepared FG-T+ matrix, (center) a schematic illustration of FG-T+ matrix after its sliding test, and (right) X-ray diffraction data for FG-T+ matrix after its sliding test, according to one set of embodiments.
Figure 21D:
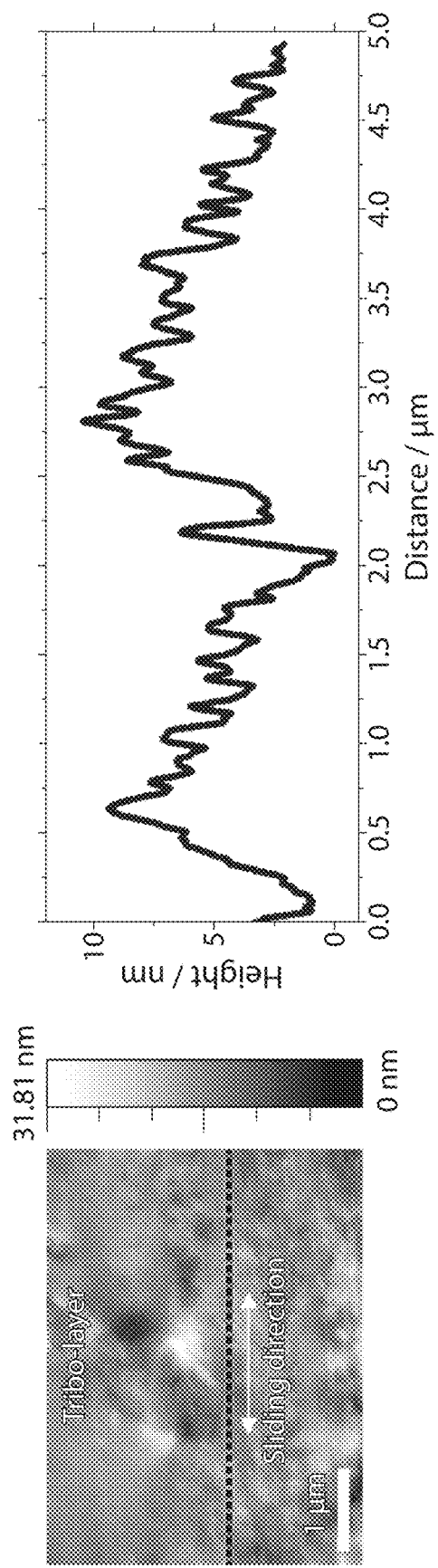
FIG. 21D is a tapping-mode AFM topology image (left) and plot (right) of the top-surface of a FG-T+ tribo-layer, according to one set of embodiments.
Figure 21E:
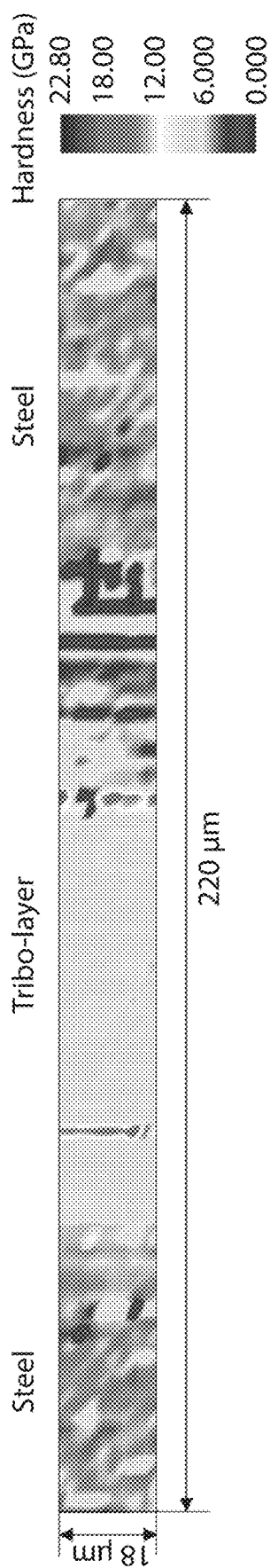
FIG. 21E is a nanoindentation map of a representative FG-T+ tribo-layer, according to one set of embodiments.

To observe the structural progression of this graphene lubricant, microstructure and surface analyses were performed for tribo-layers after sliding using transmission electron microscopy (TEM) and atomic force microscopy (AFM) (FIGS. 21A-21E and FIGS. 32A-32B). As shown in FIG. 21B, that graphenes initially appeared as a continuous interconnected material (FIG. 21B). During sliding at a stress of 0.4 GPa, the matrix underwent compression and structurally evolved from a spherical configuration to compressed interconnected layers that had a spacing of 11.6 Å, which was consistent with the interlayer organic linkages (FIG. 21C). The tribo-layer of FG-T+ produced by the sliding, was reasonably flat with ±5 nm surface features (FIG. 21D), which was also consistent with a compressed layered structure. This planar tribo-layer allowed DLC to slide and only encounter relatively small energetic barriers. The high out-of-plane rigidity of the FG-T+ tribo-layer was also advantageous and compared favorably to the bare SS (grade 316). Nanoindentation revealed a hardness with ~5.3 GPa for the SS 316 substrate and ~7.3 GPa for the tribo-layer of FG-T+(FIG. 21E). The higher value of hardness was also consistent with an anisotropic FG-T+ tribo-layer.

FIGS. 21A-21E demonstrates representative microstructure of FG-T+ matrix before and after sliding. (FIG. 21A) SEM image of as-prepared FG-T+ before sliding and the tribo-layer after sliding. (FIG. 21B) TEM image of the tribo-layer of FG-T+. The formation of continuous FG-T+ matrix is observed. (FIG. 21C) Left: as-prepared FG-T+ matrix is proposed to be in a compacted folded structure. Right: After its sliding test FG-T+ is expected to have more of a compressed bi/multi-layer structure, which is supported X-ray diffraction data. (FIG. 21D) Tapping-mode AFM topology image of the top-surface of the tribo-layer. The AFM height profile measured along the red dashed line. The tribo-layer of FG-T+ has a flattened surface. (FIG. 21E) A nanoindentation map displays the hardness of the representative FG-T+ tribo-layer, using a Berkovich diamond indenter.

Figure 32A:
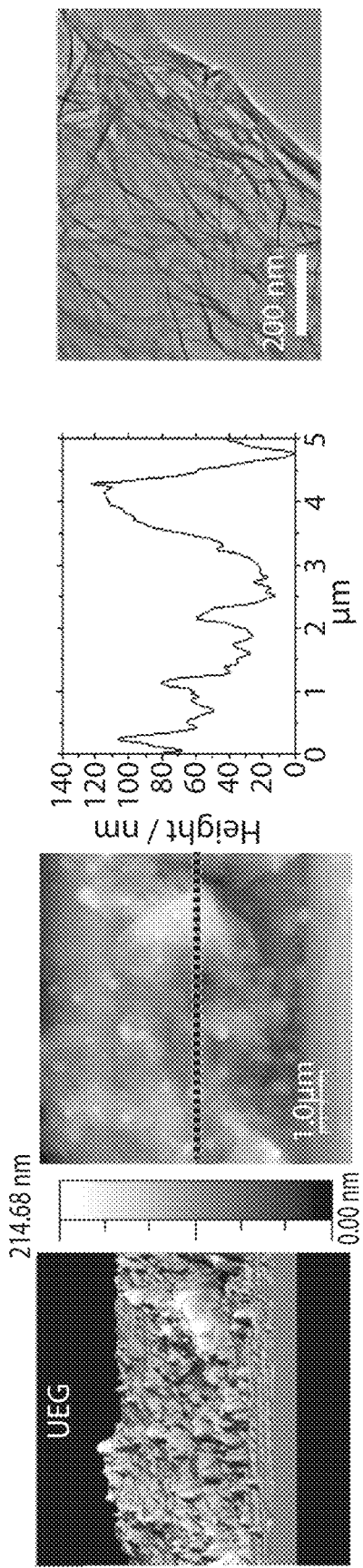
FIG. 32A is tapping-mode atomic force microscopy (AFM) surface scans as perspective view (left), top view (second from left) and plot (second from right), and TEM data (right) of a UEG tribo-layer, according to one set of embodiments.
Figure 32B:
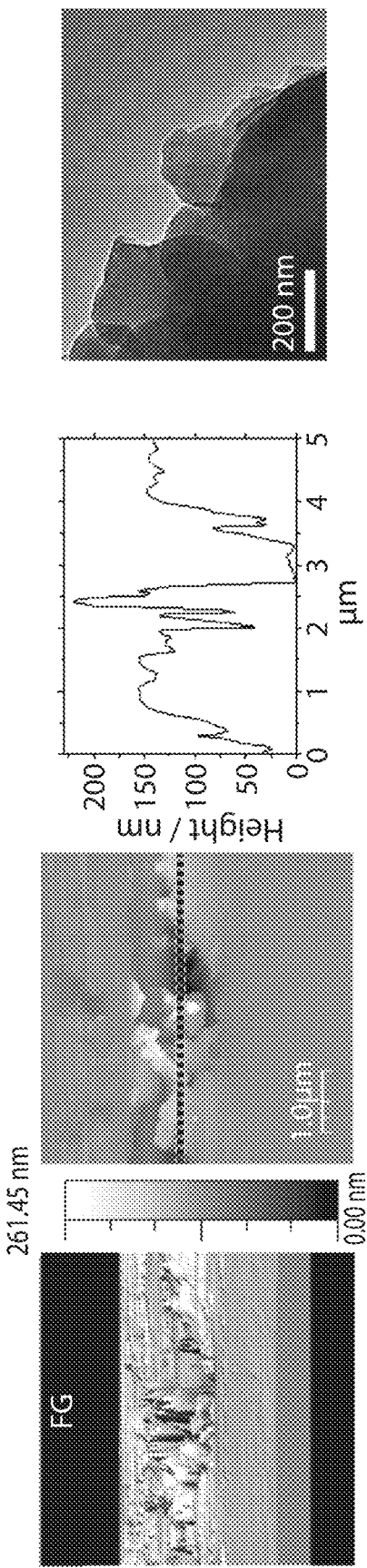
FIG. 32B is tapping-mode atomic force microscopy (AFM) surface scans as perspective view (left), top view (second from left) and plot (second from right), and TEM data (right) of an FG tribo-layer, according to one set of embodiments.

FIGS. 32A-32B depicts Tapping-mode atomic force microscopy (AFM) surface scans and TEM data of (FIG. 32A) UEG, and (FIG. 32B) FG tribo-layers.

FIGS. 3A-3D includes an experimental demonstration and COF results of graphene films. FIG. 3A is a schematic illustration showing the geometry of a linear tribometer equipped with a DLC-coated steel ball. Tests were performed at room temperature (RT) under 3 N load (contact pressure: 0.3~0.4 GPa) and with 16 mm s$^{-1}$ linear speed. Each sample was tested more than three times in order to ensure the reliability. The COF for a DLC ball sliding against (FIG. 3B) unfunctionalized exfoliated graphene (avg. of min. COF~0.021±0.004), (FIG. 3C) 3,5-dinitrophenyl functionalized graphene (avg. of min. COF~0.033±0.005), and (FIG. 3D) 3,5-dinitrophenyl-triaminotriptycene functionalized graphene (avg. of min. COF~0.014±0.004) films on a SS substrate in $N_2$ environment (relative humidity: ~3%).

Figure 7:
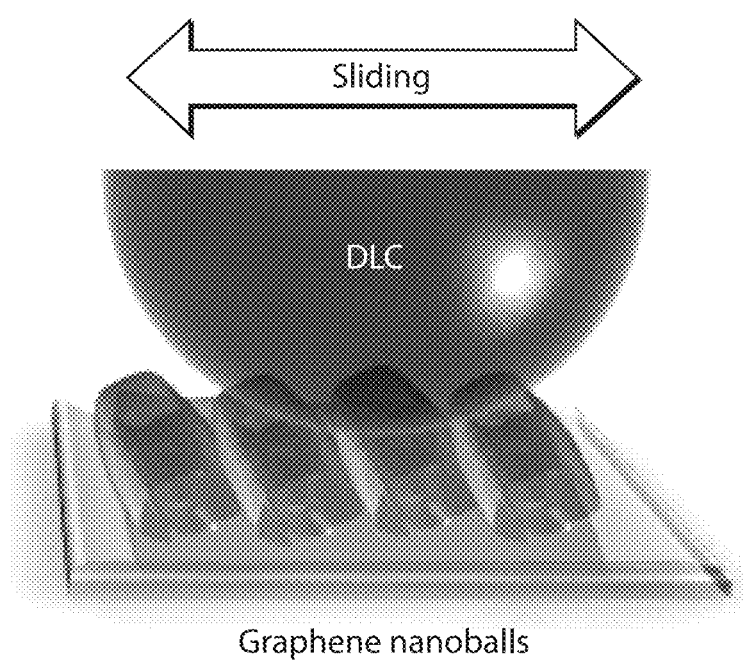
FIG. 7 is a schematic illustration showing the geometry of a linear tribometer equipped with a diamond-like carbon (DLC)-coated steel ball, according to one set of embodiments.

FIG. 7 is a schematic illustration showing the geometry of a linear tribometer equipped with a DLC-coated steel ball.

Figure 4A:
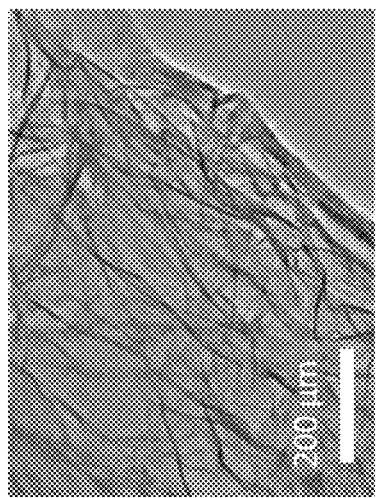
FIG. 4A is an optical microscopy image (left), Raman spectra (center), and a transmission electron microscopy (TEM) image (right) of wear tracks for unfunctionalized exfoliated graphene after sliding, according to one set of embodiments.
Figure 4A:
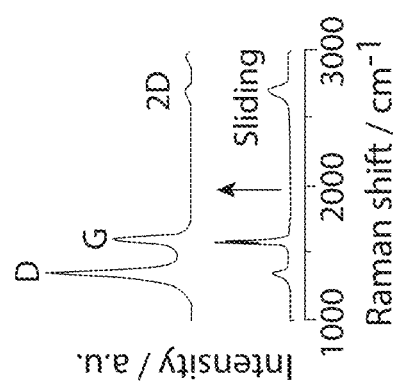
Figure 13A:
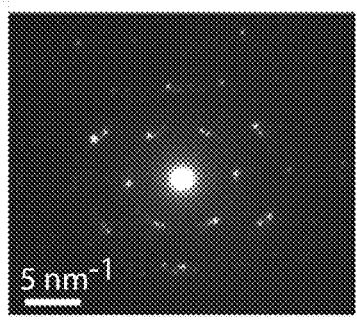
FIG. 13A is a selected area electron diffraction (SAED) pattern of unfunctionalized exfoliated graphene after sliding, according to one set of embodiments.
Figure 13B:
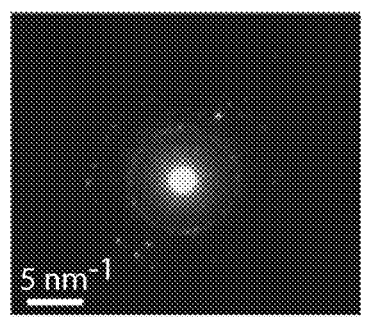
FIG. 13B is a SAED pattern of 3,5-dinitrophenyl functionalized graphene after sliding, according to one set of embodiments.
Figure 14:
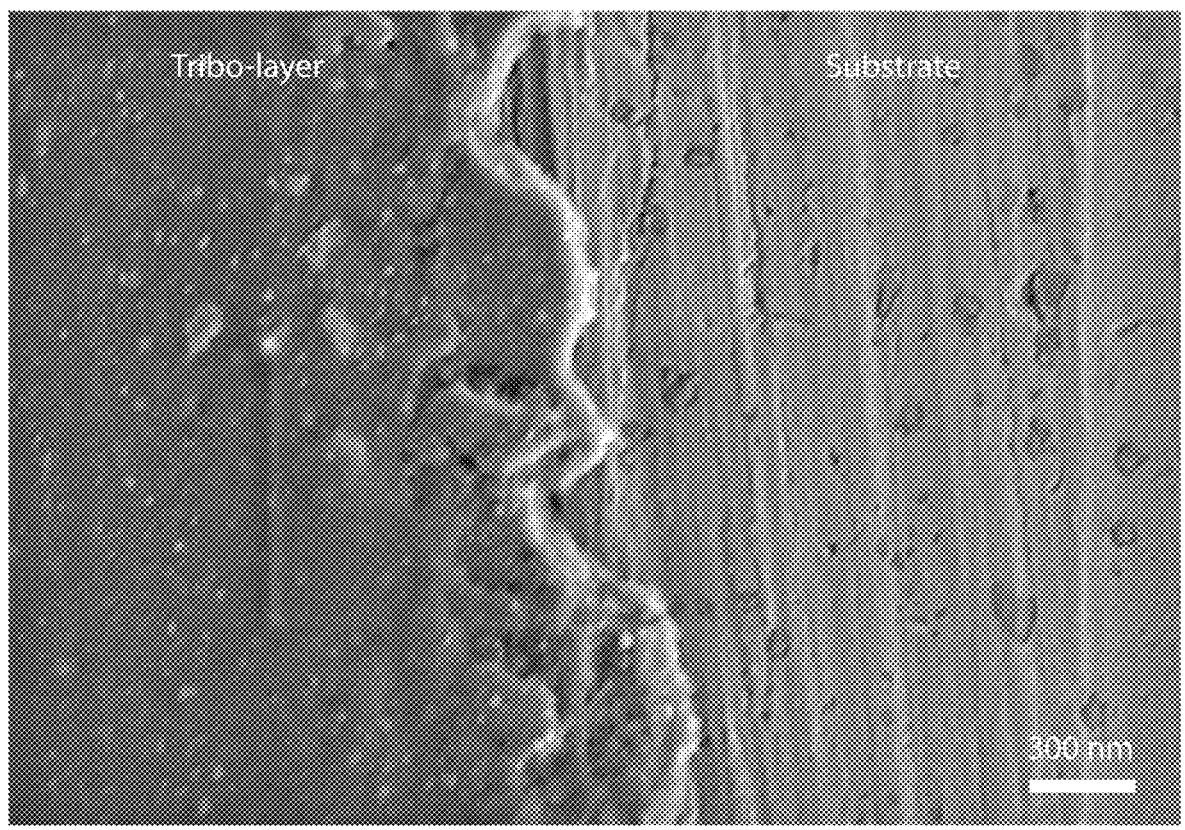
FIG. 14 is a SEM image of a rigid tribo-layer of 3,5-dinitrophenyl-triaminotriptycene functionalized graphene after sliding, according to one set of embodiments.

Macroscopic friction processes tend to stationary states, under the action of shear stress, and may be accompanied by chemical and physical transitions of lubricant layers at contacting interfaces. Observed wear tracks were produced by the contact of DLC after sliding tests in FIG. 4 (e.g., FIG. 4A) and FIG. 11. As shown from tribo-lines of the optical micrographs in FIG. 4, graphenes were partially removed, indicating that the films were thinner than those originally coated. This study carried out detailed microstructure and surface analyses of wear tracks for unfunctionalized exfoliated graphene, 3,5-dinitrophenyl functionalized graphene, and 3,5-dinitrophenyl-triaminotriptycene functionalized graphene after sliding using transmission electron microscopy (TEM) and Raman spectroscopy (FIG. 4). In general, graphenes slipped by each other and then evolved into graphene tribo-layers with the reduced COF against the DLC-coated ball. The final state of graphene on a SS substrate after sliding showed changes in the Raman 2D and D-bands, indicating a gradual increase in defects in the graphene layers (FIG. 4A). The G-band (1591 cm$^{-1}$) for the lubricated graphene shifted after sliding, compared with that of pristine graphene (1580 cm$^{-1}$), thereby indicating changes in chemical or physical state. Most importantly the Raman $I_D/I_G$ ratio of graphene increased notably. Small protrusions of DLC (FIG. 12) may have increased the possibility of intralayer wrinkles and damage (FIG. 4A), however after sliding studies the graphenes still displayed a six-fold symmetry (FIG. 13A). As expected, functionalized graphenes showed different chemical transitions during sliding. The 3,5-dinitrophenyl functionalized graphene had a high density of pendant groups (Raman $I_D/I_G$ ratio~0.93 in FIG. 4B) that could have led to a stronger intermolecular interaction with a DLC surface and a higher frictional resistance toward sliding (FIG. 3C). Selected area electron diffraction (SAED) on the functionalized graphene on wear track showed that the macroscopic friction disrupted the extended sp$^2$ network of the graphene hexagonal lattice (FIG. 13B). It appeared that the sp$^3$ C—C hybridization created a geometric distortion that led to the loss of tribological properties. This surface chemistry led this study to further explore new structures for superlubricity and use triaminotriptycene rigid molecular interlocks to create nanostructures from the 3,5-dinitrophenyl functionalized graphene (FIG. 4C and FIG. 14). Specifically, without wishing to be bound by theory, the mechanical shear crumpling of these materials created chemically bound folds in graphene structures (FIG. 4C) that in essence behaved as nanobearings. Hence, the transition from 2-D graphene to nanoballs reduced the energy barrier to slide and created a stable tribo-layer on a SS surface (FIG. 15).

Figure 4B:
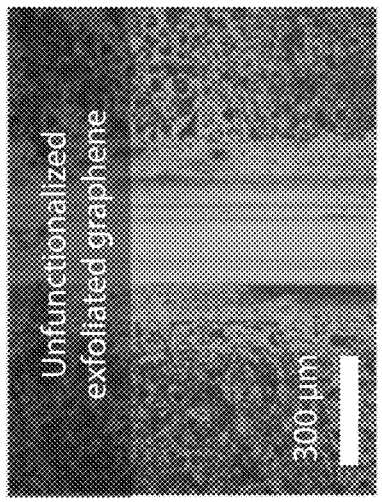
FIG. 4B is an optical microscopy image (left), Raman spectra (center), and a TEM image (right) of wear tracks for 3,5-dinitrophenyl functionalized graphene after sliding, according to one set of embodiments.
Figure 4B:
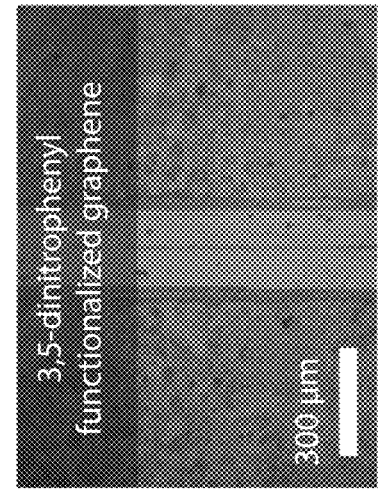
Figure 4C:
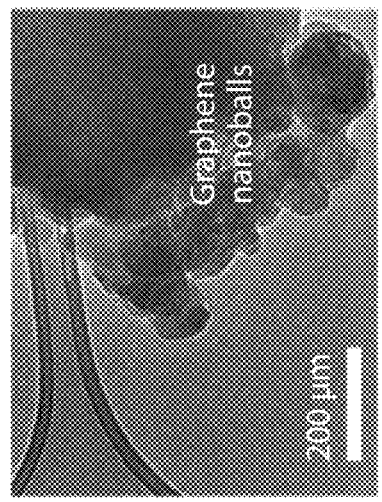
FIG. 4C is an optical microscopy image (left), Raman spectra (center), and a TEM image (right) of wear tracks for 3,5-dinitrophenyl-triaminotriptycene functionalized graphene after sliding, according to one set of embodiments.
Figure 4C:
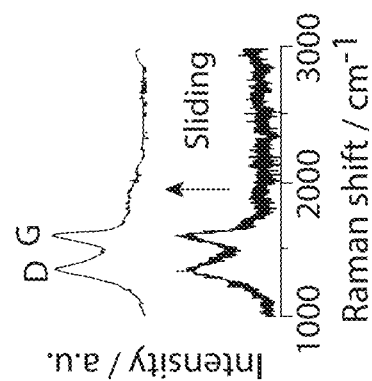
Figure 4C:
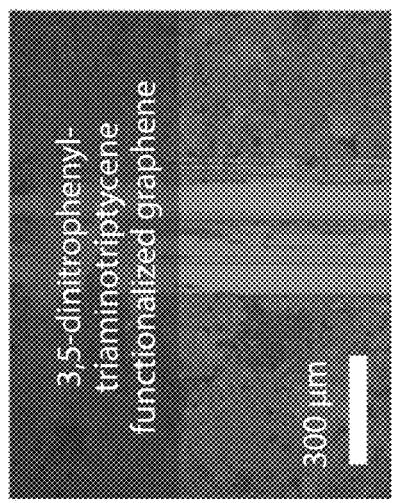

FIGS. 4A-4B depicts microscopy images and Raman spectra of observed linear wear marks from friction studies conducted on different graphene tribo-layers. Optical images, Raman and TEM data of the wear tracks for (FIG. 4A) unfunctionalized exfoliated graphene, (FIG. 4B) 3,5-dinitrophenyl functionalized graphene, and (FIG. 4C) 3,5-dinitrophenyl-triaminotriptycene functionalized graphene after sliding.

Figure 5:
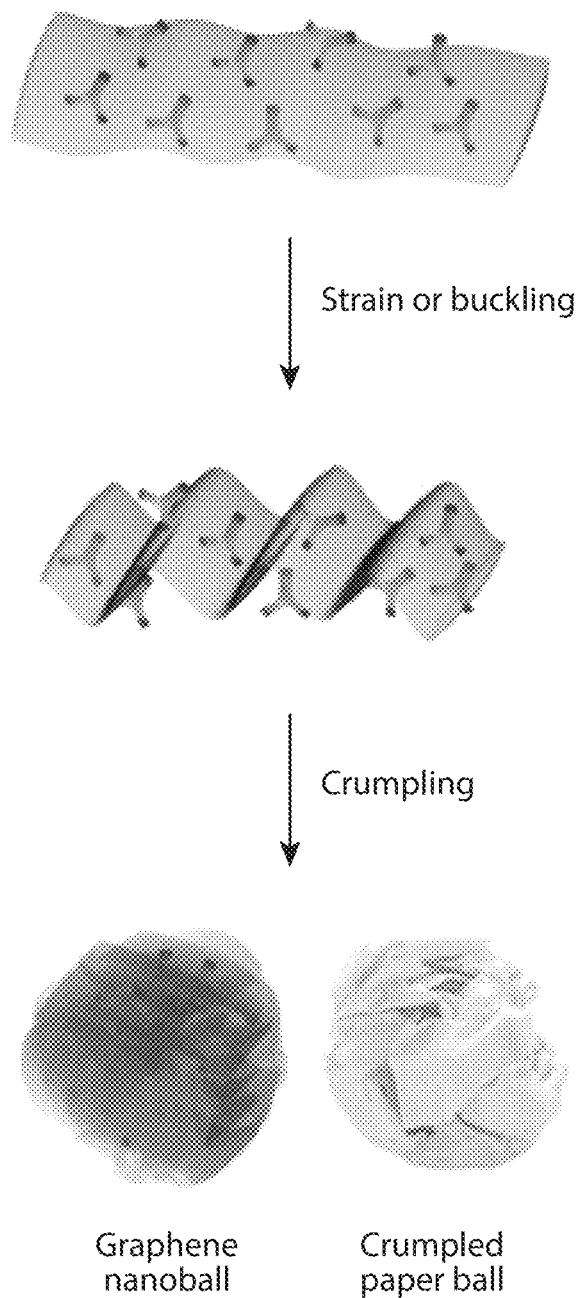
FIG. 5 is a schematic illustration of the formation of a crumpled graphene nanoball on a wear track, according to one set of embodiments.

The crumping of a 2-D graphene sheet into a three-dimensional sphere is in principle similar to the crumpling of a sheet of paper. Hence, without wishing to be bound by theory, this study proposes a simplistic mechanism of the formation of graphene nanoballs (FIG. 5), wherein the load on the ball induces strain or buckling in the graphene sheets and the rigid triptycene interlocks chemically link folded surfaces together. This process may continue until a dense nanoball is formed and hence the initial high friction rapidly drops to a COF~0.012. The scattered small spikes in COF likely indicate transitions in this process where there were also transient chemical configurations that caused interactions between the DLC and SS. (FIG. 3D). This formation of the graphene nanoball on sliding surfaces persisted and reduced friction to provide a chemical strategy with 2-D graphene for a high quality of the sliding contact. FIG. 5 is a schematic illustration for the formation of a crumpled graphene nanoball on a wear track. FIG. 5 illustrates the structural evolution of the graphene nanoball and the expected similarly to a crumpled paper ball.

Figure 6A:
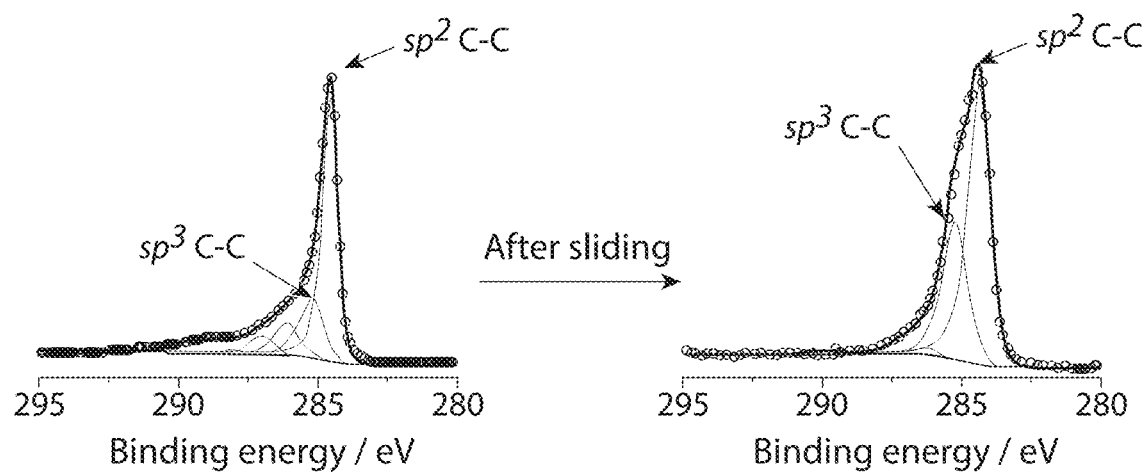
FIG. 6A is X-ray photoelectron spectroscopy (XPS) C is signatures of wear tracks of unfunctionalized exfoliated graphene on a SS substrate before (left) and after (right) sliding, according to one set of embodiments.
Figure 6B:
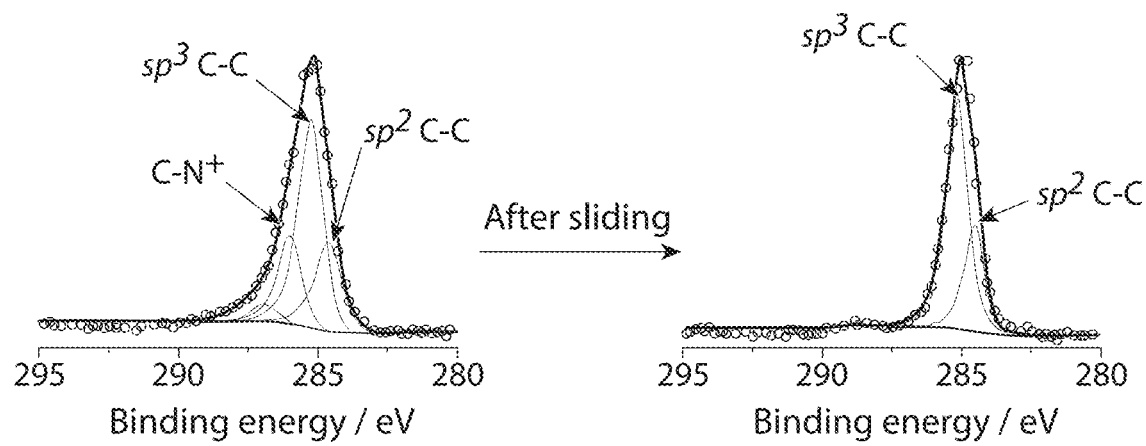
FIG. 6B is XPS C is signatures of wear tracks of 3,5-dinitrophenyl functionalized graphene on a SS substrate before (left) and after (right) sliding, according to one set of embodiments.
Figure 6C:
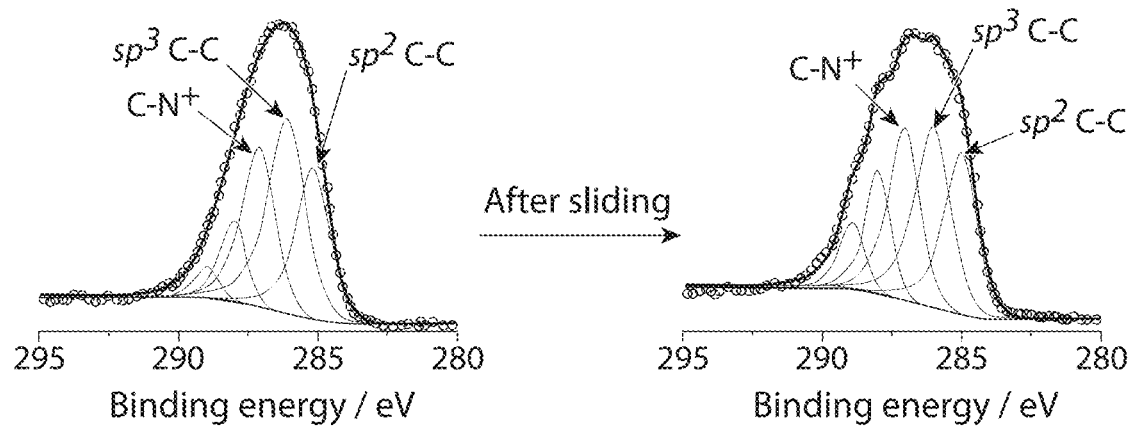
FIG. 6C is XPS C is signatures of wear tracks of 3,5-dinitrophenyl-triaminotriptycene functionalized graphene on a SS substrate before (left) and after (right) sliding, according to one set of embodiments.
Figure 16A:
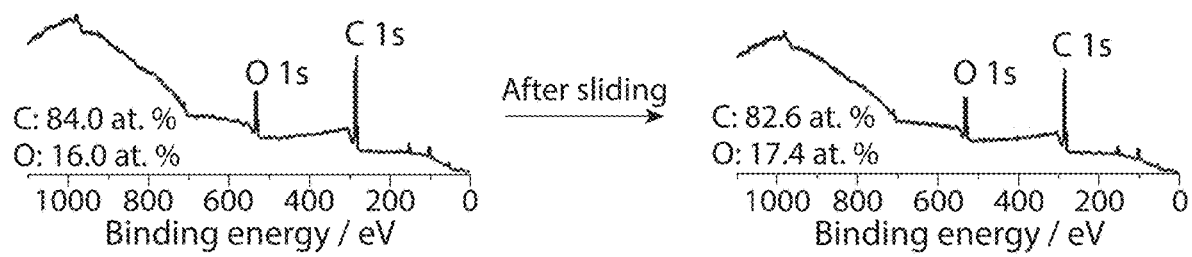
FIG. 16A is XPS survey scans of an unfunctionalized exfoliated graphene film before (left) and after (right) sliding cycles, according to one set of embodiments.
Figure 16B:
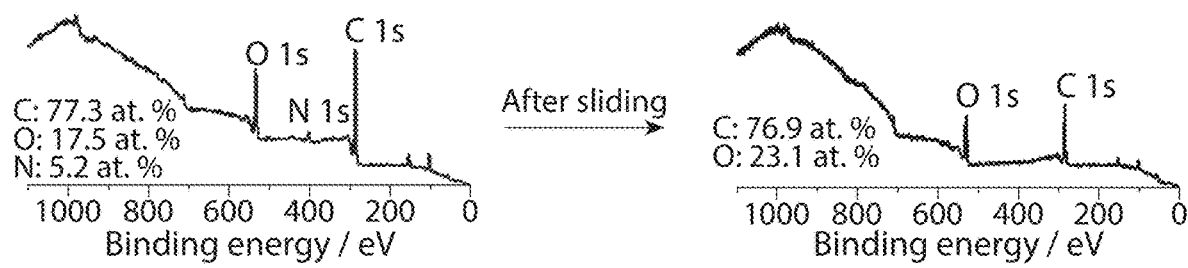
FIG. 16B is XPS survey scans of a 3,5-dinitrophenyl functionalized graphene film before (left) and after (right) sliding cycles, according to one set of embodiments.
Figure 16C:
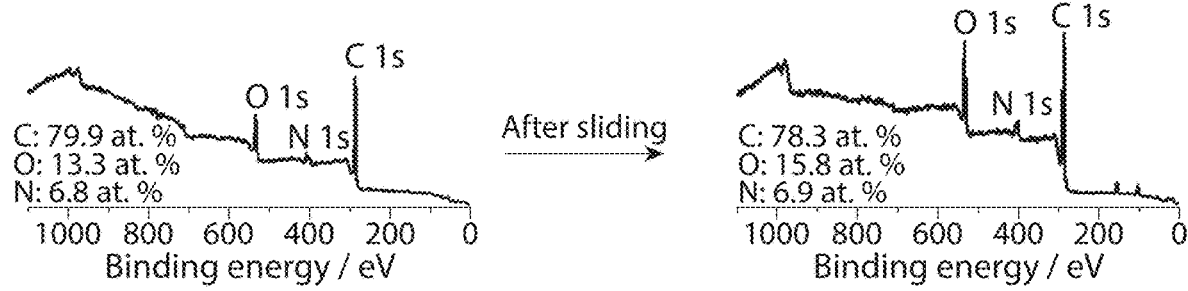
FIG. 16C is XPS survey scans of a 3,5-dinitrophenyl-triaminotriptycene functionalized graphene film before (left) and after (right) sliding cycles, according to one set of embodiments.
Figure 17A:
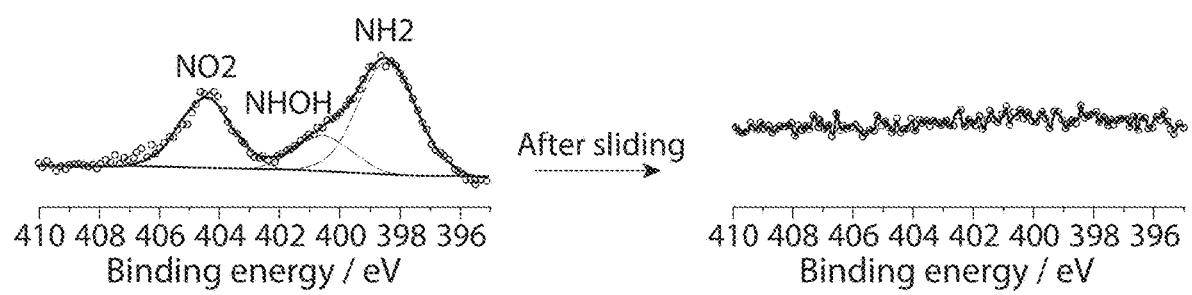
FIG. 17A is XPS N is signatures of a 3,5-dinitrophenyl functionalized graphene film before (left) and after (right) sliding cycles, according to one set of embodiments.
Figure 17B:
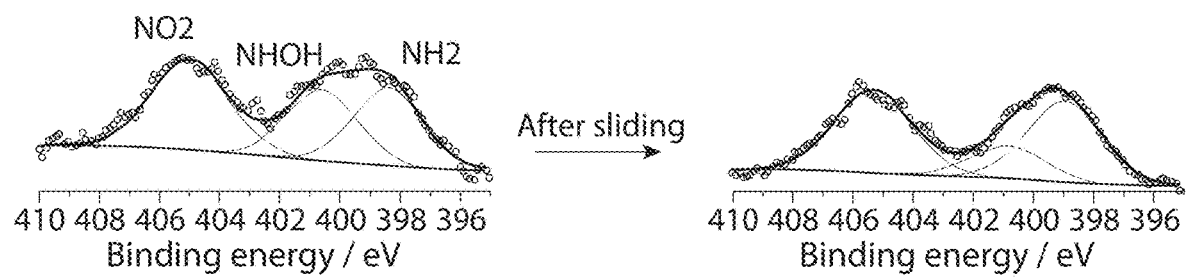
FIG. 17B is XPS N is signatures of a 3,5-dinitrophenyl-triaminotriptycene functionalized graphene film before (left) and after (right) sliding cycles, according to one set of embodiments.

Friction is closely related to the chemical and physical properties of a film and the contacting materials. Hence, the chemical analysis of the wear track was carried out by X-ray photoelectron spectroscopy (XPS) for better clarification. As revealed by Raman and XPS analyses (FIG. 4A and FIG. 6A), the tribo-layer of graphene on the wear track was composed of single layer graphene and damaged forms of graphene. The increased concentration of $sp^3$ C—C (285.5 eV) and the inherently high O 1 s peak (532.4 eV) suggests a mechanically induced reaction with molecular oxygen or water (FIG. 6A and FIG. 16A). The XPS and Raman signatures confirmed the presence of functionalized graphene in the wear track (FIG. 4B and FIG. 6B). During sliding, the functionalized graphene evolved from a disordered metastable layer to a tribo-layer. Considering that functionalized graphene is likely to be more strongly bound to the SS substrate than unfunctionalized exfoliated graphene, high frictional spikes were not observed during sliding cycles with functionalized graphene. Although the 3,5-dinitrophenyl groups helped graphenes bond to a SS surface, the enhanced interaction between functional groups and the DLC surface also increased COF during sliding (FIG. 3C). Interestingly, for 3,5-dinitrophenyl functionalized graphene it was observed that the nitrogen-containing functional groups were removed with sliding (FIG. 6B and FIG. 16B). In high resolution XPS on N1s the functional groups on the surface of graphene also were not detectable after sliding (FIG. 17A). However, the $sp^3$ C—C bond (285.5 eV) and the Raman D-band on graphene still remained as a large signal (FIG. 6B and FIG. 4B). It was not clear exactly how the nitrogen containing functional groups on graphene were removed and the nature of the $sp^3$ C—C groups in the graphene that remained, but the applied load was hypothesized to induce mechanochemical reactions. Nevertheless, the new defects appeared to contribute to the higher COF than observed for unfunctionalized exfoliated graphene. This result is consistent with the frictional behavior of graphenes with additional surface covalent bonds such as C—X (X=F and H) graphenes and GO, both of which have high energy barriers to slide in atomic experiments. It was of interest to gain insight on how the tribochemical reactions of 3,5-dinitrophenyl-triaminotriptycene functionalized graphene promoted the structural reconstruction to reach a superlubric state. Before sliding, the relative ratio of $sp^3$ C—C (285.5 eV) and $sp^2$ C—C peaks (284.5 eV) represented a fraction of $sp^a$ bonded carbon owing to the presence of the 3,5-dinitrophenyl functionalized graphene and triptycene (FIG. 6C). It was observed that the formation of crumpled graphene nanoball reduced the loss of 3,5-dinitrophenyl functional groups on graphene during sliding. In specific contrast to the behavior of parent functionalized graphenes, the addition of the triptycene stabilized the density of 3,5-dinitrophenyl groups on the graphene. Specifically the signals associated with these groups remained essentially unchanged before and after sliding experiments (FIG. 16C and FIG. 17B). Although it was a challenge to experimentally probe the physical and chemical interiors of the graphene nanoball, 3,5-dinitrophenyl-triaminotriptycene functionalized graphene spontaneously developed structural rigidity by crumpling. This rigidity, which was attributed to the formation of the graphene nanoball structure with surfaces folded on each other being chemically bound by the triaminotriptycenes. These stable rigid structures then reduced the friction force against an external force.

FIGS. 6A-6C illustrate a chemical characterization of graphene tribo-layers. XPS C is signatures of the wear tracks of (FIG. 6A) unfunctionalized exfoliated graphene, (FIG. 6B) 3,5-dinitrophenyl functionalized graphene, and (FIG. 6C) 3,5-dinitrophenyl-triaminotriptycene functionalized graphene on a SS substrate before and after sliding.

CONCLUSION

In summary, it was here demonstrated that FG-T+ formed a fluid-like graphene matrix that produced stable tribo-layers and a low frictional force against DLC (COF~0.008). The dynamic reactivity and flexibility of functional graphene and the rigid frame of triptycene combined to produce structures under compressive mechanical sliding deformation.

This study demonstrated macroscopic superlubricity of graphene nanoballs originating from the structural transformation of 3,5-dinitrophenyl-triptycene functionalized graphene. Through the reactivity and flexibility of functional graphene and the rigid frame of triptycene, graphene nanoballs were formed during macroscopic sliding. The tribo-formation of graphene nanoballs produced incommensurate contact and low frictional force against DLC of COF~0.013. This methodology to attain a superlubric state presents an important step in understanding and controlling friction in the macroscale. Additionally, imposing friction on the unfunctionalized exfoliated graphene and 3,5-dinitrophenyl functionalized graphene induced mechanochemical reactions and/or bond cleavages during the formation of the tribo-layer. These results suggest a general means for controlling friction of 2-D graphenes via surface chemistry and design of structures and nano-carbon engineering.

This example demonstrates the formation and use of superlubricant graphene nanoballs. The macroscopic lubricity evolved through the formation of rigid crumpled graphene nanoballs, that provided a coefficient of friction (COF)~0.013. Sliding-induced crumpling produced the graphene nanoballs in situ and complex pattern folds in the graphene of the graphene nanoballs were stabilized by chemical linkages such that they were rigid and stable in macroscopic friction tests.

SUMMARY

This study identified a new composition that created superlubricity between two rubbing surfaces. Reducing friction by this method could reduce wear and lower energy costs for mechanical devices. There are also prospects to use these lubricants as conductors, and there are many interfaces involve moving parts and maintain electrical conductivity across them. The present technology builds upon the preparation of functionalized graphene. The concept of using a multi-point reactive core species to reactively roll the graphene onto itself is very new. In some embodiments, the reaction used to roll the graphene onto itself is reversible. This reversible feature may be advantageous, e.g., towards facilitating an equilibration of structures generated until more densely crosslinked graphene nanoballs are created.

Methods

Synthesis of 3,5-Dinitrophenyl Functionalized Graphene (FG)

Highly oriented pyrolytic graphite (HOPG) was used as the cathode in a three-electrodes electrochemical cell, containing 1.5 M tetrabutylammonium perchlorate (TBAP), acetonitrile (MeCN, 2 mL) and dimethylformamide (DMF, 2 mL) (Ag/Ag$^+$ as reference electrode and graphite as counter electrode). The application of a continuous voltage ramp (−3.05 to −3.25 V as ~2 µV s$^{-1}$) induced the intercalation of tetrabutylammonium cations (TBA$^+$) into graphene interlayers, resulting in Hyper-3-stage-1 graphite intercalation compound (GIC). Graphene and functionalized graphene dispersions were obtained by the following methods: (i) The Hyperstage-1 GIC was sonicated in DMF for exfoliation and then removal of the intercalated TBA's was achieved by washing with MeCN and DMF. (ii) For covalent functionalization, the Hyper-3-Stage-1 GIC was added carefully to an electrochemical cell, containing 0.1 M 3,5-dinitrobenzenediazonium tetrafluoroborate, 1 M TBAP and 4 mL MeCN solution. Again, a continuous voltage ramp (−1.20 to −1.80 V as −4 µV s$^{-1}$; −1.40 to −1.80 V as −2 µV s$^{-1}$) was passed through the Hyper-3-Stage-1 GIC. 3,5-dinitrophenyl functionalized graphenes were spontaneously exfoliated from the Hyper-3-Stage-1 GIC. Then the functionalized graphene sheets were collected through vacuum filtration and thoroughly washed with MeCN and DMF.

Synthesis of Trinitrotriptycenes a and b. (FIG. 8, FIG. 22)

Triptycene (2.0 g, 8 mmol) and concentrated HNO$_3$ (80 mL) were added in a round flask. The mixture was heated to 75° C. for 24 h. After cooling down to room temperature, the solution was poured into ice water. The precipitate was filtered, washed with ice water and dried. The product was further purified by column chromatography to afford a and b as white solids (a/b=2.9/1, 1.3 g, 42% yield). Compound a (major): $^1$H NMR (600 MHz, CDCl$_3$): δ 8.35-8.32 (m, 3H), 8.07-8.04 (m, 3H), 7.64-7.63 (m, 3H), 5.83 (s, 1H), 5.81 (s, 1H).

Synthesis of Triaminotriptycenes (Triamino-T) c and d. (FIG. 8, FIG. 22)

Tinitrotriptycenes a, b (1 g, 2.5 mmol) and MeOH (40 mL) were added in a flame-dried Schlenk flask. Palladium on activated charcoal was added to the solution, bubbling with hydrogen for 10 h. The mixture was then filtered through a pad of Celite®. The solvent was evaporated to give triaminotriptycene as yellow solids (c/d=3.0/1, 0.73 g, 95% yield). Compound c (major): $^1$H NMR (600 MHz, CDCl$_3$): δ 7.07-7.04 (m, 3H), 6.73-6.71 (m, 3H), 6.27-6.22 (m, 3H), 5.04 (s, 1H), 5.02 (s, 1H), 3.49 (s, 6H) (or 3.43 (br.s, 6H)).

3,5-dinitrophenyl-triaminotriptycene functionalized graphene (FG-T

FIG. 22 illustrates the synthesis of functionalized graphene with 3,5-dinitrophenyl groups anchoring triaminotriptycene groups. Meisenheimer complexes formed by the addition of Triamino-T to the FG (50 mg:4 mg weight ratio) in DMF. Then, FG-T was collected through a polytetrafluoroethylene (PTFE) filter membrane with 0.1 µm pore size by vacuum filtration. FG-T+: 4 mg of Triamino-T was added to the above FG-T.

FIG. 8 is a schematic illustration of (FIG. 8A) Synthesis of trinitrotriptycenes and triaminotriptycenes. (FIG. 8B) 3,5-dinitrophenyl functionalized graphene (4 mg) and triaminotriptycene (2 mg) were mixed to form 3,5-dinitrophenyl-triaminotriptycene functionalized graphene via a Meisenheimer complexes reaction.

Rheometric Measurements of Graphenes:

Graphene dispersions were deposited on a substrate and cut them to the appropriate size for rheometric tests. Graphenes were measured on a TA AR2000 rheometer in a 25-mm-diameter plate-plate geometry at 25° C. Frequency sweeps were performed by applying a sinusoidal strain, $\gamma=\gamma_0 \sin(\omega t)$, with $\gamma_0=0.5\%$, within the linear viscoelastic range.

Graphene Assembly:

Graphene solutions were dispersed into DMF with the aid of sonication to generate a uniform and stable graphene solution. The 3,5-dinitrophenyl functionalized graphene and 3,5-dinitrophenyl-triaminotriptycene functionalized graphene solutions were dispersed in DMF. The FG and FG-T+ solutions were dispersed in DMF. These graphenes assembled into uniform films on the surface of water when several drops of ethyl acetate were added to the dispersion in dimethylformamide (DMF) that had been added to water (FIG. 22). In this process the graphene moved to the water-air surface by Rayleigh-Benard convection and then simultaneously assembled into an interconnected film driven by Marangoni forces. The film was then transferred onto a stainless steel (SS) substrate (FIG. 22). After transfer, solvent was removed by vacuum evaporation at room temperature for 30 min. The SS plate samples were cleaned by sonication in acetone and isopropanol alcohol to remove any organic contaminants and then kept in a dry chamber. Films were fabricated on a SS by Marangoni force and Rayleigh-Benard convection method using a dispersion of unfunctionalized exfoliated graphene, 3,5-dinitrophenyl functionalized graphene, and 3,5-dinitrophenyl-triaminotriptycene functionalized graphene in DMF and water. The graphene films were then transferred from the liquid surface onto a stainless steel (grade 316) substrate. This densely covered surface prevented the DLC from directly contacting the SS (grade 316) substrate.

Figure 9:
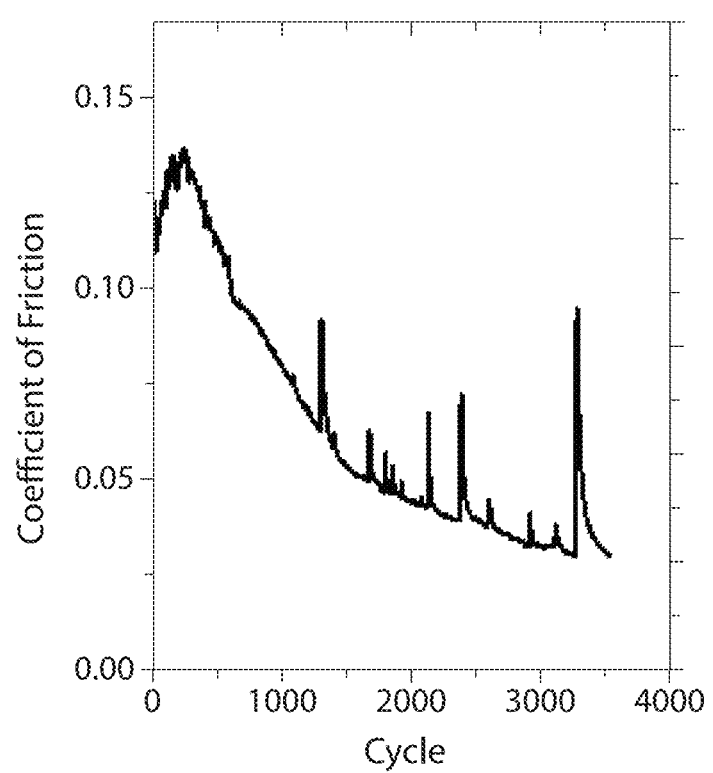
FIG. 9 is a plot of COF for a DLC ball sliding against unfunctionalized exfoliated graphene on a SS substrate, according to one set of embodiments.

FIG. 9 is a plot of the coefficient of friction (COF) for diamond-like-carbon (DLC) ball sliding against unfunctionalized exfoliated graphene. Due to the unstable tribo-layer formation on the stainless steel (SS) substrate, the COF increased at the beginning of sliding and many huge COF spikes appeared.

Friction Characterization:

The friction measurement system, shown in FIG. 10 and FIG. 26, comprised a linear flexure bearing stage driven linearly back and forth by a custom built Lorenz force motor, two load cells connected in series and perpendicularly to each other, a stepper motor driving the sensor assembly up and down, and an environmental chamber in which the measurement system was enclosed. A reconfigurable input-output (cRIO) system (cRIO-9024, National Instruments) was used to control the velocity of the bearing stage and the normal force applied on the sample. To quantify COF ($\mu=F_f/F_n$) the DLC ball slid back and forth (linear velocity: 16 to 52 mm s$^{-1}$) repeatedly along a horizontal line on a film, while simultaneously measuring fictional force ($F_f$) and normal force ($F_e$). The resolutions of each load cell were 5 mN (normal) and 0.5 mN (lateral), and forces were sampled at 1 kHz. 3 N of normal force was applied to the SS plate by moving the DLC-coated (a-C:H, Richter Precision, Inc.) stainless steel ball (grade 440C, diameter of 9.5 mm), attached at the tip of the sensor assembly, down to the sample on the moving bearing stage. The sample on the bearing stage slid 4 mm backward and forward against the DLC-coated stainless steel ball and the linear velocity was maintained constant as 16 mm s$^{-1}$ during the measurement. In some cases, dry nitrogen gas was blown to reduce humidity. All measurements were conducted at room temperature. The COF was calculated by dividing the measured frictional force by normal force and averaged over each backward and forward cycle to generate one data point on the COF plot. The first and the last 5% of the measured COFs in each cycle were omitted as they reflected the static friction of the materials. Friction experiments were repeated more than three times for each sample in order to ensure the reliability. After the friction test, the tribo-layer on the wear track were collected to investigate the structure of films.

Figure 27:
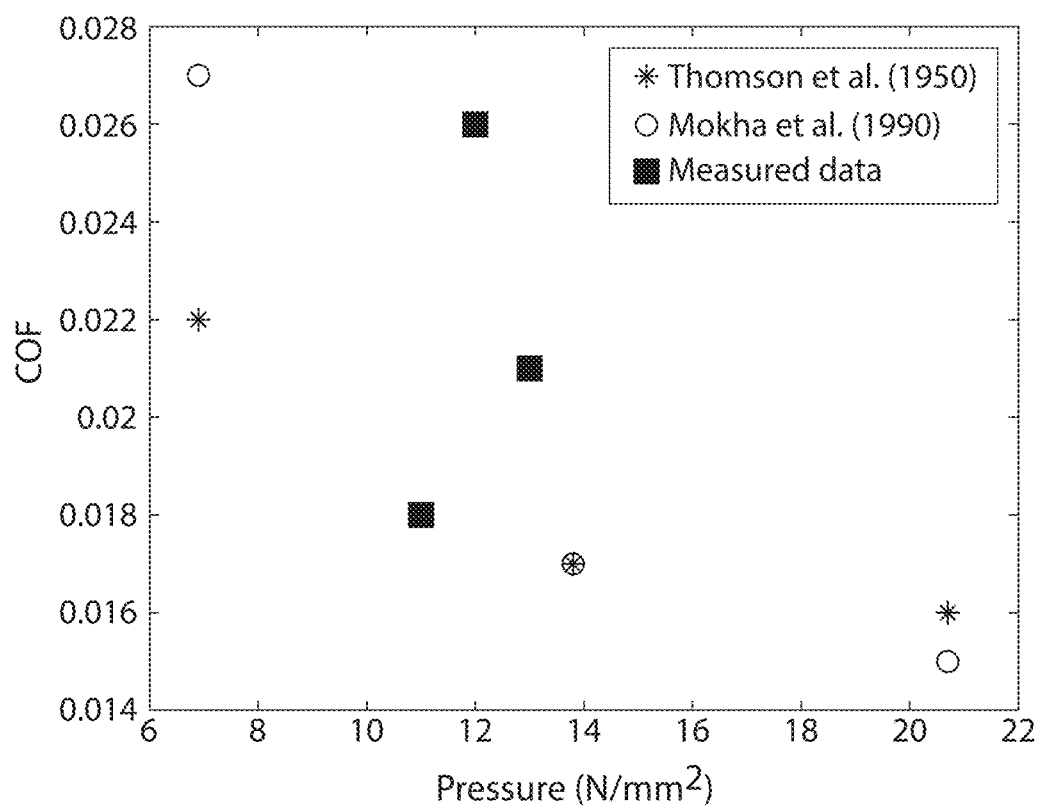
FIG. 27 is a plot of COF vs. pressure between stainless steel balls and Teflon sheets measured by a custom-built linear macro tribometer and data from literatures, according to one set of embodiments.

To validate the accuracy of the custom built friction measurement setup, the friction coefficient of stainless steel ball (grade 440C, diameter of 9.5 mm) against a Teflon sheet (thickness of 0.9 mm) was measured and compared to data presented in other literatures (see FIG. 27). The sliding speed of the experiments was 2.5 mm s$^{-1}$ and normal force of 1.5 N, 3 N and 6 N were used to vary the normal pressure of the contact. The contact areas were approximated based on the optical and SEM images of the Teflon sheet after the experiments. As is shown, the measured COFs were ranging in between 0.018 and 0.026, comparable to the data reported by Thompson et al. and Mokha et al. However, in the present results, the trend of lower COFs with higher normal pressures was not observed. This could be attributed to the difference in calculating the normal pressure of the contact: the contact area was assumed to be held constant with different normal forces in the literature whereas it was observed to change as the Teflon sheet at the contact deformed.

FIG. 27 shows a comparison of COF between stainless steel balls and Teflon sheets measured by the custom-built linear macro tribometer and the data from literatures. The ball diameter of 9.5 mm is used to slide at the linear speed of 2.5 mm s$^{-1}$ on the Teflon sheet of 0.9 mm thickness. The contact pressures for the normal force of 1.5 N, 3 N and 6 N were estimated to be 12 N mm$^{-2}$, 13 N mm$^{-2}$, and 11 N mm$^{-2}$, respectively.

FIG. 10 is a labeled photograph of a linear tribometer equipped with a DLC-coated steel ball.

Figure 11A:
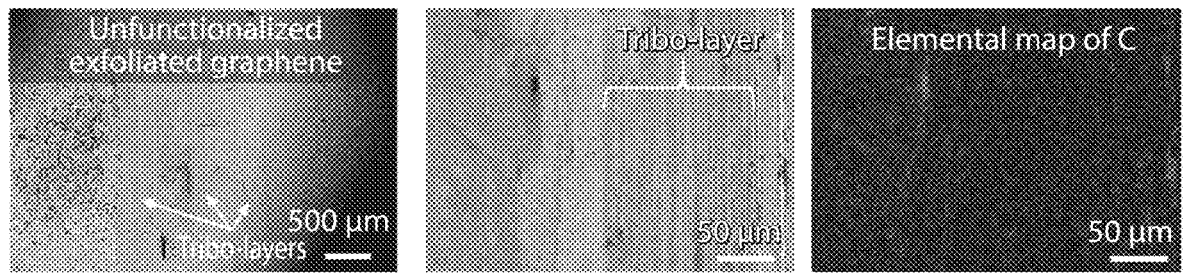
FIG. 11A is scanning electron microscope (SEM) images (left, center) with the corresponding energy dispersive X-ray spectroscopy (EDS) carbon mapping (right) of unfunctionalized exfoliated graphene after sliding, according to one set of embodiments.
Figure 11B:
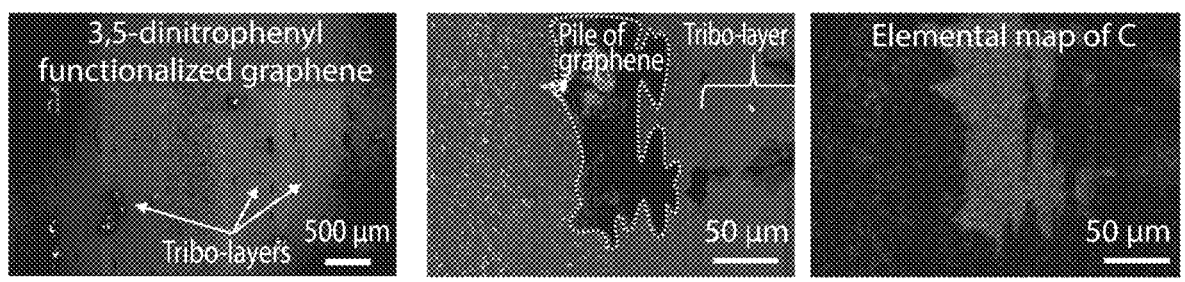
FIG. 11B is scanning electron microscope (SEM) images (left, center) with the corresponding energy dispersive X-ray spectroscopy (EDS) carbon mapping (right) of 3,5-dinitrophenyl functionalized graphene after sliding, according to one set of embodiments.
Figure 11C:
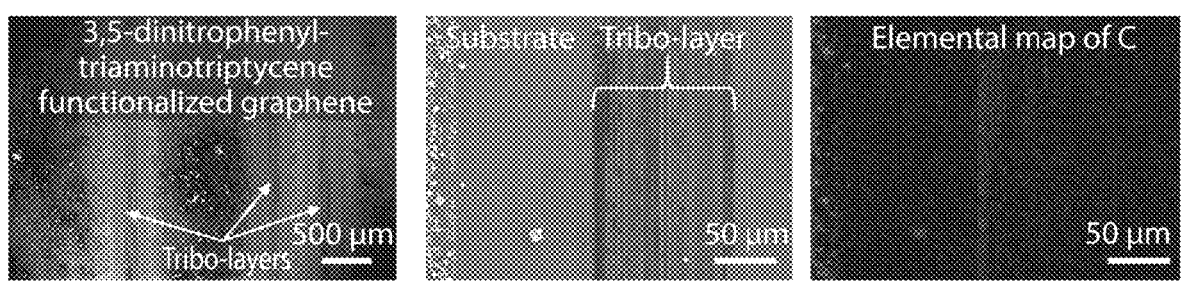
FIG. 11C is scanning electron microscope (SEM) images (left, center) with the corresponding energy dispersive X-ray spectroscopy (EDS) carbon mapping (right) of 3,5-dinitrophenyl-triaminotriptycene functionalized graphene after sliding, according to one set of embodiments.

FIGS. 11A-11C show (FIG. 11A) Scanning electron microscope (SEM) images (left, center) with the corresponding energy dispersive X-ray spectroscopy (EDS) carbon mapping (right) of unfunctionalized exfoliated graphene, (FIG. 11B) 3,5-dinitrophenyl functionalized graphene, and (FIG. 11C) 3,5-dinitrophenyl-triaminotriptycene functionalized graphene after sliding.

Figure 12:
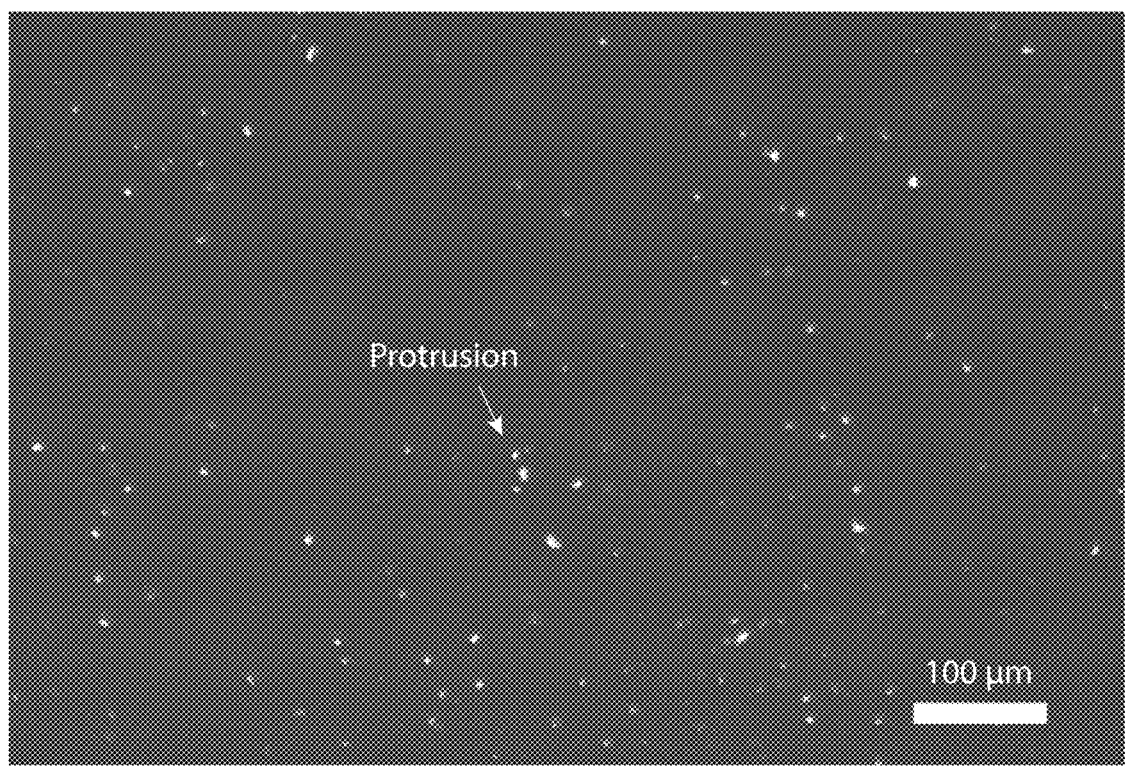
FIG. 12 is a SEM image of a diamond-like-carbon (DLC) surface, according to one set of embodiments.

FIG. 12 is a SEM image of a diamond-like-carbon (DLC) surface.

Figure 13C:
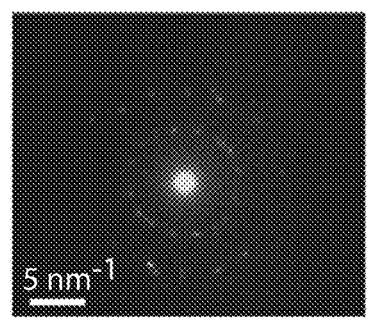
FIG. 13C is a SAED pattern of 3,5-dinitrophenyl-triaminotriptycene functionalized graphene after sliding, according to one set of embodiments.

FIGS. 13A-13B show selected area electron diffraction (SAED) patterns showing (FIG. 13A) unfunctionalized exfoliated graphene, (FIG. 13B) 3,5-dinitrophenyl functionalized graphene, and (FIG. 13C) 3,5-dinitrophenyl-triaminotriptycene functionalized graphene after sliding.

FIG. 14 is a SEM image of a rigid tribo-layer of 3,5-dinitrophenyl-triaminotriptycene functionalized graphene after sliding.

Figure 15A:
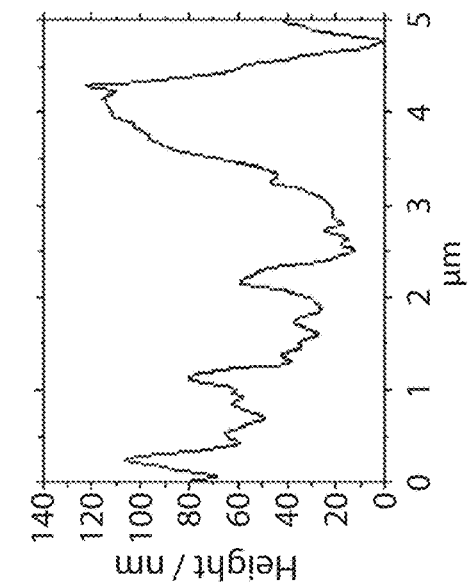
FIG. 15A is atomic force microscopy (AFM) surface scans of unfunctionalized exfoliated graphene after sliding cycles, according to one set of embodiments.
Figure 15A:
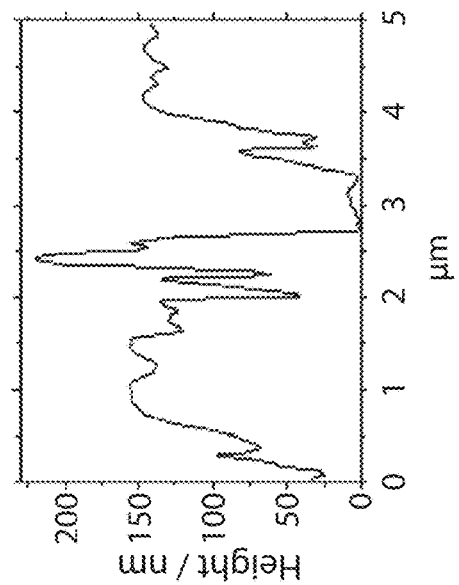
Figure 15B:
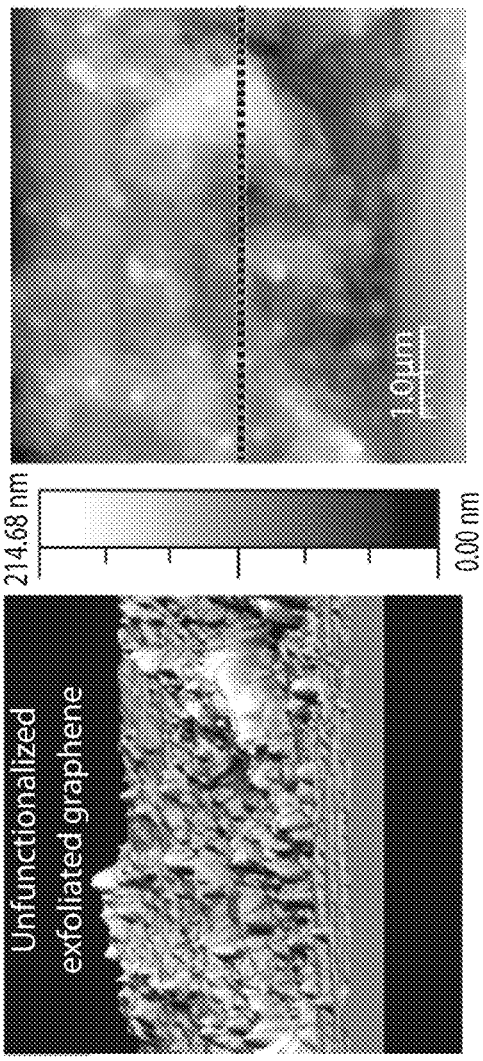
FIG. 15B is AFM surface scans of 3,5-dinitrophenyl functionalized graphene after sliding cycles, according to one set of embodiments.
Figure 15B:
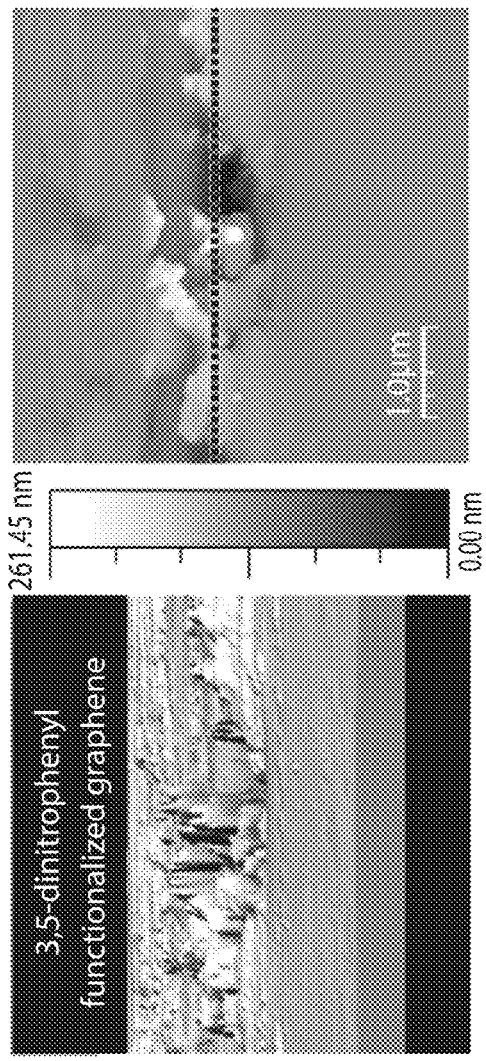
Figure 15C:
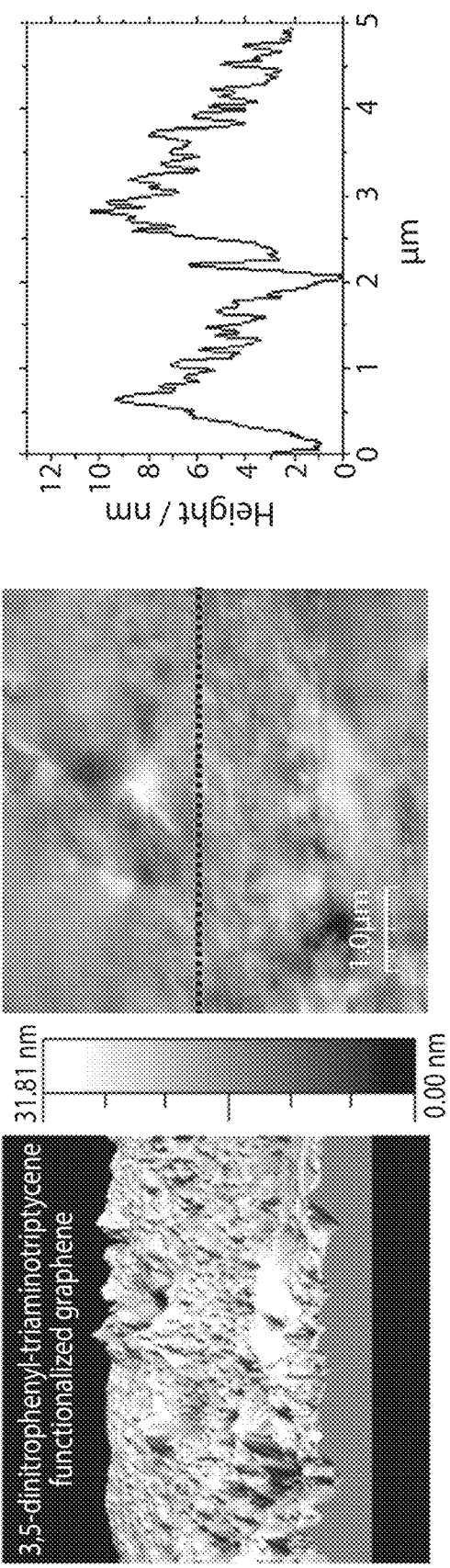
FIG. 15C is AFM surface scans of 3,5-dinitrophenyl-triaminotriptycene functionalized graphene after sliding cycles, according to one set of embodiments.

FIGS. 15A-15C shows atomic force microscopy (AFM) surface scans of (FIG. 15A) unfunctionalized exfoliated graphene, (FIG. 15B) 3,5-dinitrophenyl functionalized graphene, and (FIG. 15C) 3,5-dinitrophenyl-triaminotriptycene functionalized graphene after sliding cycles. Each height profile was measured along the dashed line. The tribo-layer of 3,5-dinitrophenyl-triaminotriptycene functionalized graphene had a wavy surface.

FIGS. 16A-16C shows X-ray photoelectron spectroscopy (XPS) survey scans of (FIG. 16A) unfunctionalized exfoliated graphene, (FIG. 16B) 3,5-dinitrophenyl functionalized graphene, and (FIG. 16C) 3,5-dinitrophenyl-triaminotriptycene functionalized graphene films before and after sliding cycles.

FIGS. 17A-17B shows XPS N is signatures of (FIG. 17A) 3,5-dinitrophenyl functionalized graphene, and (FIG. 17B) 3,5-dinitrophenyl-triaminotriptycene functionalized graphene films before and after sliding cycles.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Any terms as used herein related to shape, orientation, alignment, and/or geometric relationship of or between, for example, one or more articles, structures, forces, fields, flows, directions/trajectories, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, and/or geometric relationship include, but are not limited to terms descriptive of: shape—such as, round, square, circular/circle, rectangular/rectangle, triangular/triangle, cylindrical/cylinder, elliptical/ellipse, (n)polygonal/(n)polygon, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; direction—such as, north, south, east, west, etc.; surface and/or bulk material properties and/or spatial/temporal resolution and/or distribution—such as, smooth, reflective, transparent, clear, opaque, rigid, impermeable, uniform(ly), inert, non-wettable, insoluble, steady, invariant, constant, homogeneous, etc.; as well as many others that would be apparent to those skilled in the relevant arts. As one example, a fabricated article that would described herein as being "square" would not require such article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, to an extent typically achievable and achieved for the recited fabrication technique as would be understood by those skilled in the art or as specifically described. As another example, two or more fabricated articles that would described herein as being "aligned" would not require such articles to have faces or sides that are perfectly aligned (indeed, such an article can only exist as a mathematical abstraction), but rather, the arrangement of such articles should be interpreted as approximating "aligned," as defined mathematically, to an extent typically achievable and achieved for the recited fabrication technique as would be understood by those skilled in the art or as specifically described.

What is claimed is:

1. A composition, comprising:
   a plurality of discrete nanostructures, each nanostructure comprising a functionalized graphene layer and a core species bound to the functionalized graphene layer;
   wherein the composition has a coefficient of friction of less than or equal to 0.02, as determined using a linear tribometer equipped with a diamond-like carbon coated stainless steel ball, and
   wherein the functionalized graphene layer has an average surface area of greater than or equal to 0.01 microns$^2$ and less than or equal to 40 microns$^2$.

2. A composition, comprising:
   a plurality of discrete nanostructures, each nanostructure comprising a functionalized graphene layer and a core species bound to the functionalized graphene layer;
   wherein the plurality of discrete nanostructures have a substantially non-planar configuration, and
   wherein the functionalized graphene layer has an average surface area of greater than or equal to 0.01 microns$^2$ and less than or equal to 40 microns$^2$.

3. A composition, comprising:
   a plurality of discrete nanostructures, each nanostructure comprising a functionalized graphene layer and a core species bound to the functionalized graphene layer;
   wherein the core species reversibly covalently binds a first portion of the functionalized graphene layer to a second portion of the functionalized graphene layer, and
   wherein the functionalized graphene layer has an average surface area of greater than or equal to 0.01 microns$^2$ and less than or equal to 40 microns$^2$.

4. A composition as in claim 1, wherein the plurality of discrete nanostructures have a crumpled configuration.

5. A composition as in claim 1, wherein at least some of the plurality of discrete nanostructures comprise a chemically reversible linkage.

6. A composition as in claim 1, wherein at least some of the plurality of discrete nanostructures has a chemical bond for mechanical energy dissipation.

7. A composition as in claim 1, wherein at least some of the plurality of discrete nanostructures form and/or are formed from a molecular bearing.

8. A composition as in claim 1, wherein the composition has a fluid-like property.

9. A composition as in claim 1, wherein the composition is configured, upon application of a mechanical force to the composition, to maintain a coefficient of friction of less than or equal to 0.02.

10. A composition as in claim 1, wherein the plurality of discrete nanostructures is configured such that, under the application of mechanical force, at least a portion of the plurality of discrete nanostructures obtain a substantially non-planar configuration.

11. A composition as in claim 1, wherein the core species is configured to maintain the plurality of discrete nanostructures in a substantially non-planar configuration.

12. A composition as in claim 1, wherein the composition exhibits superlubricity.

13. A composition as in claim 1, wherein the composition is configured for use as a tribo-layer.

14. A composition as in claim 1, wherein the composition is bound to a surface comprising a metal, diamond-like carbon, an alloy, a mineral, a glass, a ceramic, a diamond, a form of carbon, and/or a plastic.

15. A composition as in claim 1, wherein the functionalized graphene layers are functionalized with 3,5-dinitrophenyl groups.

16. A composition as in claim 1, wherein the functionalized graphene layers comprise graphene oxide.

17. A composition as in claim 1, wherein the core species is configured to bind to a metal surface.

18. A composition as in claim 1, wherein the core species comprises an amine.

19. A composition as in claim 1, wherein the core species comprises a triptycene.

20. A composition as in claim 1, wherein the core species comprises an alcohol.

21. A composition as in claim 1, wherein the core species comprises a phosphorus compound.

22. A composition as in claim 1, wherein the functionalized graphene layer is at least partially wrapped around the core species.

23. A composition as in claim 1, wherein the composition has a coefficient of friction of less than or equal to 0.015.

* * * * *